(12) United States Patent
Li et al.

(10) Patent No.: US 11,628,560 B2
(45) Date of Patent: Apr. 18, 2023

(54) PROGRAMMABLE MULTI-SCALE FLUIDIC ARTIFICIAL MUSCLES AND PISTONS

(71) Applicants: President and Fellows of Harvard College, Cambridge, MA (US); Massachusetts Institute of Technology, Cambridge, MA (US)

(72) Inventors: Shuguang Li, Cambridge, MA (US); Robert J. Wood, Cambridge, MA (US); Daniela Rus, Weston, MA (US); Daniel M. Vogt, Cambridge, MA (US); Nicholas W. Bartlett, Somerville, MA (US)

(73) Assignees: President and Fellows of Harvard College, Cambridge, MA (US); Massachusetts Institute of Technology, Cambridge, MA (US)

( * ) Notice: Subject to any disclaimer, the term of this patent is extended or adjusted under 35 U.S.C. 154(b) by 544 days.

(21) Appl. No.: 16/494,291

(22) PCT Filed: Mar. 22, 2018

(86) PCT No.: PCT/US2018/023801
§ 371 (c)(1),
(2) Date: Sep. 14, 2019

(87) PCT Pub. No.: WO2018/175744
PCT Pub. Date: Sep. 27, 2018

(65) Prior Publication Data
US 2020/0130175 A1      Apr. 30, 2020

Related U.S. Application Data

(60) Provisional application No. 62/590,620, filed on Nov. 26, 2017, provisional application No. 62/474,853, filed on Mar. 22, 2017.

(51) Int. Cl.
*B25J 9/14*       (2006.01)
*B25J 11/00*     (2006.01)
(Continued)

(52) U.S. Cl.
CPC .................. *B25J 9/14* (2013.01); *B25J 9/142* (2013.01); *B25J 11/00* (2013.01); *F15B 15/10* (2013.01); *F16J 3/00* (2013.01); *B25J 9/1075* (2013.01)

(58) Field of Classification Search
CPC ... B25J 9/14; B25J 9/142; B25J 9/1075; B25J 11/00; B25J 18/06; F15B 15/10; F15B 15/103; F16J 3/00; F16J 3/06
See application file for complete search history.

(56) References Cited

U.S. PATENT DOCUMENTS 884,694 A * 4/1908 Weant .................. F15B 15/103
                                                                    92/92
2,642,091 A    6/1953 Morin
(Continued)

OTHER PUBLICATIONS

J. Whitney, et al., "A Low-Friction Passive Fluid Transmission and Fluid-Tendon Soft Actuator," 2014 IEEE/RSJ International Conference on Intelligent Robots and Systems (IROS 2014) 2801-2808 (2014).

(Continued)

*Primary Examiner* — Dustin T Nguyen
(74) *Attorney, Agent, or Firm* — Modern Times Legal; Robert J. Sayre

(57) ABSTRACT

An artificial muscle system includes a collapsible skeleton, a flexible skin, and a muscle actuation mechanism. The collapsible skeleton is contained inside a volume defined, at least in part, by the flexible skin. The flexible skin and the collapsible skeleton are configured for the flexible skin to provide a pulling force on the collapsible skeleton when a pressure difference exists between the inside of the sealed (Continued)

volume and a surrounding environment to change at least one of the dimensions and thus geometry of the collapsible skeleton. The muscle actuation mechanism includes at least one of the following to deploy or contract the collapsible skeleton: (a) a fluid displacing, releasing, or capturing mechanism configured to increase or decrease fluid pressure inside the sealed volume; and (b) a heating or cooling element configured to change the temperature of fluid in the sealed volume.

17 Claims, 43 Drawing Sheets

(51) Int. Cl.
*F15B 15/10* (2006.01)
*F16J 3/00* (2006.01)
*B25J 9/10* (2006.01)

(56) References Cited

U.S. PATENT DOCUMENTS

| | | | |
|---|---|---|---|
| 3,250,225 A | 5/1966 | Taplin | |
| 3,375,759 A | 4/1968 | Smith | |
| 3,969,991 A | 7/1976 | Comstock et al. | |
| 4,712,776 A | 12/1987 | Geno et al. | |
| 4,939,982 A * | 7/1990 | Immega | F15B 15/103 92/92 |
| 4,976,191 A * | 12/1990 | Suzumori | F01B 19/00 92/48 |
| 7,086,322 B2 * | 8/2006 | Schulz | F15B 15/103 92/45 |
| 9,790,968 B2 * | 10/2017 | Yang | F15B 15/103 |
| 9,850,922 B2 * | 12/2017 | Yang | F15B 15/10 |
| 2002/0157388 A1 * | 10/2002 | Seto | F15B 15/103 60/325 |
| 2019/0192821 A1 * | 6/2019 | Nakata | A61B 1/0057 |

OTHER PUBLICATIONS

F. Daerden, et al., "Pneumatic artificial muscles: actuators for robotics and automation," 47 European Journal of Mechanical and Environmental Engineering 11-21 (2002).

A. Palko, et al., "The use of pneumatic artificial muscles in robot construction," 38 Industrial Robot: an International Journal 11-19 (2011).

X. Yang, et al., "Micro Bellow Actuators," International Conference on Solid State Sensors and Actuators, 1997, 45-48 (1997).

* cited by examiner

PROGRAMMABLE MULTI-SCALE FLUIDIC ARTIFICIAL MUSCLES AND PISTONS

GOVERNMENT SUPPORT

This invention was made with government support under Grant No. FA8650-15-C-7548 awarded by the Department of Defense, Defense Advanced Research Projects Agency; under Grant No. N00014-17-1-2063 awarded by the U.S. Department of Defense/Office of Naval Research; and under Grant Nos. 1226075, 1240383, and 1556164 awarded by the National Science Foundation. The US Government has certain rights in the invention.

BACKGROUND

Artificial muscles are a long-sought class of actuators for applications in industrial robots, wearable devices, and medical instruments. Numerous transduction methods have been proposed including thermal stimulus, electric fields, and pressurized fluids. Shape-memory alloys (SMAs) can generate a large contractile stress (>200 MPa) when they are heated above their (solid-state) phase transition temperature, but at the cost of hysteresis and slow cycle times. Low-cost polymer fibers, such as twisted fishing line and sewing thread, have been demonstrated to generate impressively large stresses up to 140 MPa (4.5% stroke) and significant tensile strokes up to 49% (1 MPa load). Similar to SMA, this twisted-fiber based muscle is thermally driven, thus its energy conversion efficiency is low (<2%) relative to natural muscle (40%). Electroactive polymers (EAPs), either ionic or dielectric are widely investigated materials for building artificial muscles due to their relatively high efficiency (~30%), light weight, and structural compliance (elastic modulus <1 MPa). Polymer-based actuators have material properties that closely mimick muscle and that can produce substantial deformations in the presence of an external electric field, though they often require extremely high voltages (typically >1 kV for dielectric elastomer actuators) or hermetic encapsulation (in the case of ionic polymer-metal composites), posing barriers to practical applications. Electrically driven hydrogels are able to produce various reversible actuations at small scales; however, their responses are relatively slow (from seconds to hours) compared to other artificial muscles.

Fluid-driven actuators are the most widely used artificial muscles due to their simplicity, large actuation stresses and deformations, high energy efficiency, and low cost. The McKibben actuator is one of the most popular fluidic artificial muscles. A linear contraction and large force can be produced when a positive fluidic pressure is applied to a bladder inside an anisotropic outer mesh. This kind of artificial muscle can be driven either pneumatically or hydraulically. However, a high-pressure (>100 kPa) fluid is needed where the pressure is determined by the constituent material properties and desired force and displacement. Related actuators, such as pouch motors and Peano muscles, have a simple planar architecture compared to the standard McKibben actuator. These artificial muscles can generate both linear contraction and torsional motion at a relatively low air pressure (10 kPa). The contraction ratios of these muscles are limited to approximately 36% due to the cylindrical geometry of their inflated membranes. Vacuum-actuated muscle-inspired pneumatic structures (VAMPs) are elastomeric actuators that exhibit similar reversible behaviors and mechanical performances as those of natural skeletal muscle. Planar linear contraction and torsional motion can be generated by VAMPs though the buckling of their elastomeric beams caused by negative pressure (relative to ambient). Negative-pressure operation offers greater safety, compactness, and robustness compared to other fluidic artificial muscles driven by positive pressure, yet the maximum actuation stress (65 kPa) and contraction (45%) that VAMPs can typically generate are limited by the negative pressure (vacuum) and the buckling strength of their elastomeric structures.

Although significant progress has been achieved in studying muscle-like actuators, there remains a long-standing scientific challenge for developing high-performance artificial muscles with low-cost fabrication, complex actuation, easy operation, and scalable implementation.

SUMMARY

An architecture for fluidic artificial muscles (actuators) and methods for their fabrication and use are described herein, where various embodiments of the apparatus and methods may include some or all of the elements, features and steps described below.

An artificial muscle system includes a collapsible skeleton; the flexible skin [e.g., with a flexural modulus in a range from 100,000 to 400,000 pounds per square inch (psi)] in which the collapsible skeleton is contained and that, at least in part, defines a sealed volume in which the collapsible skeleton is contained, wherein the flexible skin and skeleton are configured for the flexible skin to provide a pulling force on the collapsible skeleton with a pressure change in the sealed volume to deploy (e.g., extend or expand) or contract the collapsible skeleton and a fluid displacing, releasing, or capturing mechanism (including, e.g., a pump or fan or a source of vaporized combustion products or a source or sink of other vaporized chemical products or reactants) configured to increase or decrease fluid pressure inside the sealed volume via at least one of displacing, releasing or capturing a fluid. In other embodiments, cooling or heating a fluid in the muscle system can also create a pressure difference between the volumes inside and outside of the skin. These temperature changes, which increase or decrease the pressure of the internal fluid in the sealed volume, can be achieved through both physical methods (e.g., liquid nitrogen or solid carbon dioxide can be supplied as a cooling agent—for example, pumped through a conduit passing through the sealed volume—to extract heat via thermal conduction; or an electrical heating system can be used to increase the temperature via, e.g., resistive heating) and chemical methods (e.g., exothermic or endothermic reactions). Furthermore, phase changes between solid, liquid, and gas of the fluid can also be used to produce pressure changes via, for example, condensation, solidification, and deposition, etc.

In particular embodiments, the artificial muscle system includes a port providing fluid communication between the sealed volume and the fluid displacing, releasing, or capturing mechanism such that fluid can be displaced into or out of the sealed volume to expand or contract the flexible skin. In alternative embodiments, the fluid displacing, releasing or capturing mechanism is contained inside the sealed volume and is configured to achieve at least one of releasing and capturing a gas with a confined structure (e.g., a structure that can chemically bond with or release the gas) inside the sealed volume. In embodiments where the fluid is heated or cooled to change its pressure and volume, the fluid need not be displaced into/from the sealed volume or captured or released in the volume.

The collapsible skeleton can take any of a variety of forms. In particular embodiments, the collapsible skeleton comprises rigid segments linked with flexures (e.g., hinges or bending segments with very small bending radii), wherein the rigid segments are more rigid than the flexures such that the rigid segments can pivot relative to one another at the flexures to change at least one of the dimensions and thus shape/configuration of the collapsible skeleton. In other embodiments, the collapsible skeleton comprises a coil spring or parallel plates mounted to the flexible skin.

A method for actuated movement using the artificial muscle includes creating a pressure differential between the fluid in the sealed volume and the environment surrounding the flexible skin, wherein the flexible skin deploys or collapses with the creation of the pressure differential and causes the collapsible skeleton to undergo a change in at least one of the dimensions and thus geometry.

Displacement, release or capture of fluid changes the pressure in the sealed volume, producing a volume change due to expansion or contraction of the flexible skin to establish a pressure equilibrium with a surrounding environment. The artificial muscle can be used, e.g., to actuate a robotic appendage to manipulate or displace an object.

Also described herein is a tension piston system that includes a chamber and a piston contained in the chamber. The piston includes a collapsible skeleton and a flexible skin in which the collapsible skeleton is contained and that, at least in part, defines (i) a volume inside the piston in which the collapsible skeleton is contained and (ii) a volume outside the piston yet inside the chamber. The flexible skin seals the volume inside the piston from the volume outside the piston, and the flexible skin and the collapsible skeleton are configured for the flexible skin to provide a pulling force on the collapsible skeleton with a pressure difference between the volume inside the piston and the volume outside the piston to change at least one of the dimensions and thus geometry of the collapsible skeleton. The piston also includes a connector mounted to the collapsible skeleton or to the flexible skin and configured to be displaced or rotated when the size or geometry of the skeleton changes and to convey that displacement or rotation outside the chamber. The chamber includes at least two fluid ports, one in fluid communication with the volume inside the piston and another in fluid communication with volume outside the piston.

This new architecture allows one to program artificial muscles and pistons with multi-axial complex motions as well as controllable sequential motions. These artificial muscles can be fast, powerful, and energy efficient, and they can be fabricated at multiple scales using a variety of materials at very low costs. Moreover, 3D laminate pop-up structures, as described, e.g., in U.S. Pat. No. 8,834,666 can be used as the skeleton.

Figure 19:
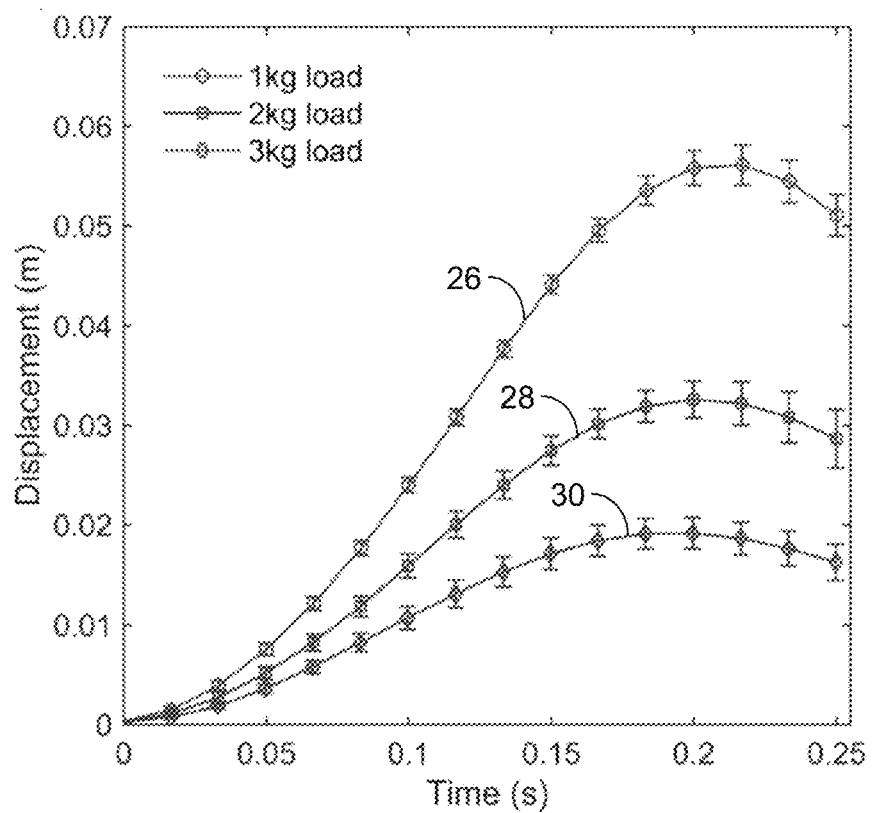
Figure 20:
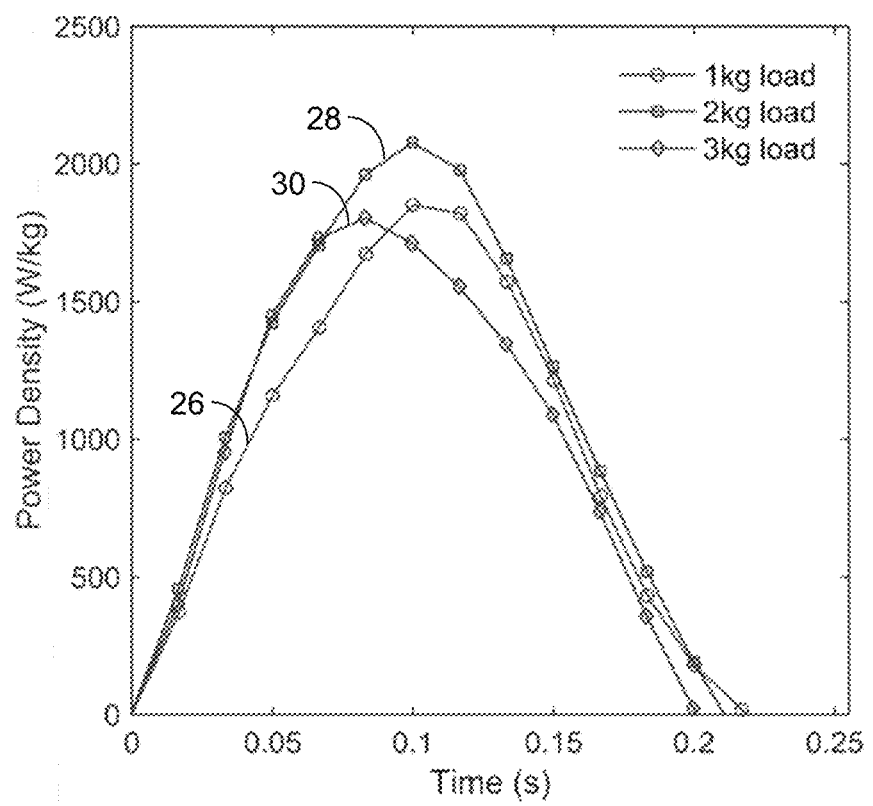

The plots of FIGS. 19 and 20 demonstrate the dynamic performance of the actuator in load-lifting tests for a 1-kg load 26, 2-kg load 28, and a 3-kg load 30. The actuator can lift the 1-kg load 26 to 5.5 cm within 0.2 seconds, as shown in FIG. 19. This performance indicates an average power density of approximately 1.04 kW/kg. A peak power density over 2 kW/kg was obtained during the 2-kg load-lifting tests, as shown in FIG. 20.

Figure 21:
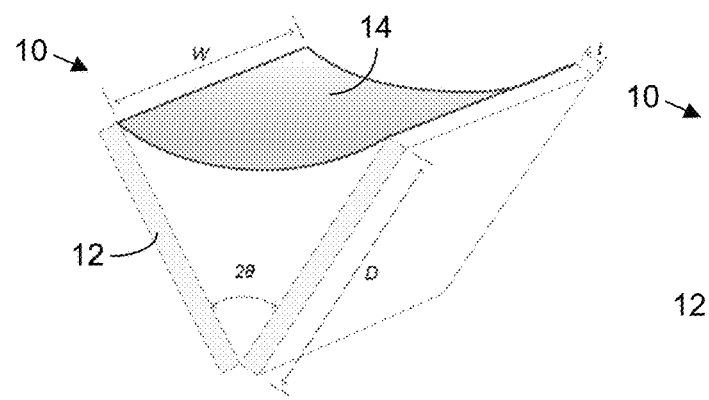

FIG. 21 illustrates a mechanical model of a hinged-plates actuator 10.

Figure 22:
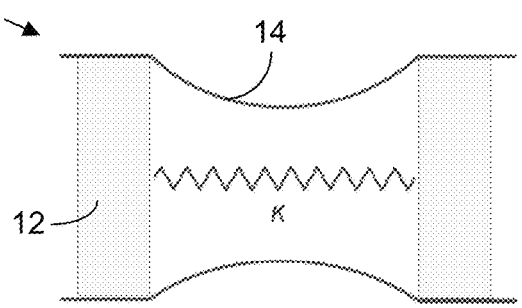

FIG. 22 illustrates a parallel-plates model of an actuator.

Figure 23:
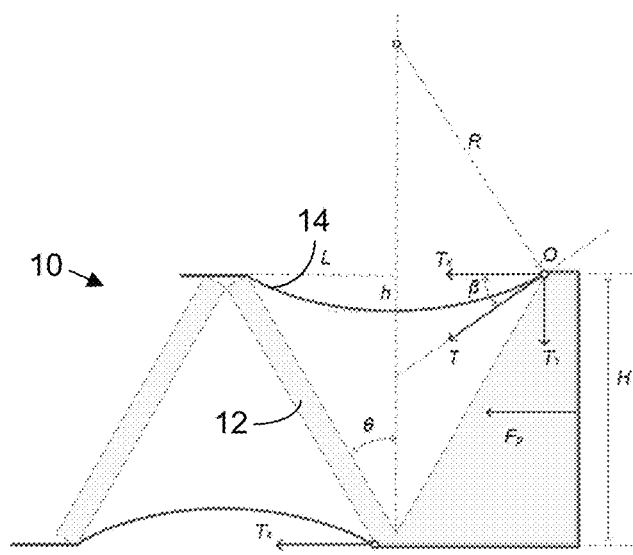

FIG. 23 illustrates a force-balancing model for the blocked-force estimation.

Figure 24:
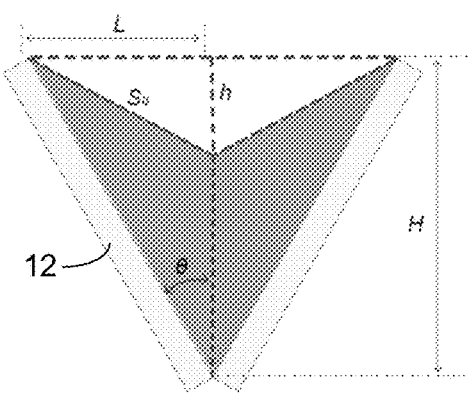

FIG. 24 illustrates a triangle approximation for the fluid-work estimation.

Figure 25:
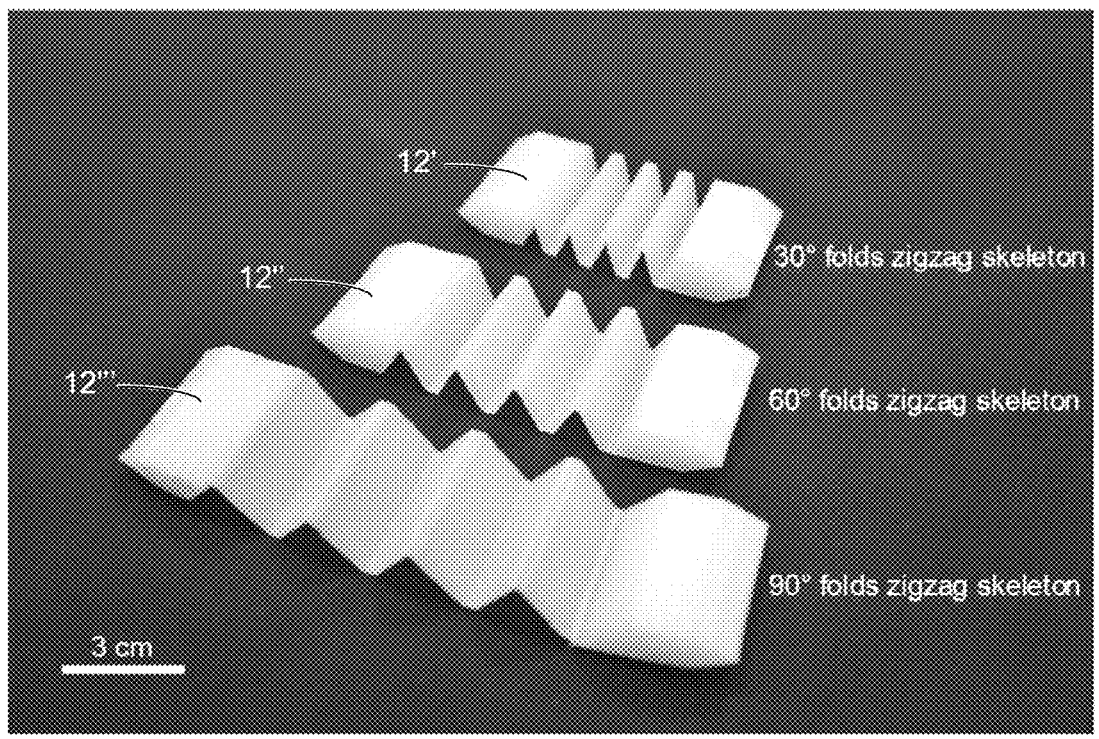

FIG. 25 shows 3D-printed nylon zigzag skeletons with 30° folds 12', 60° folds 12", and 90° folds 12'" for model validation.

Figure 26:
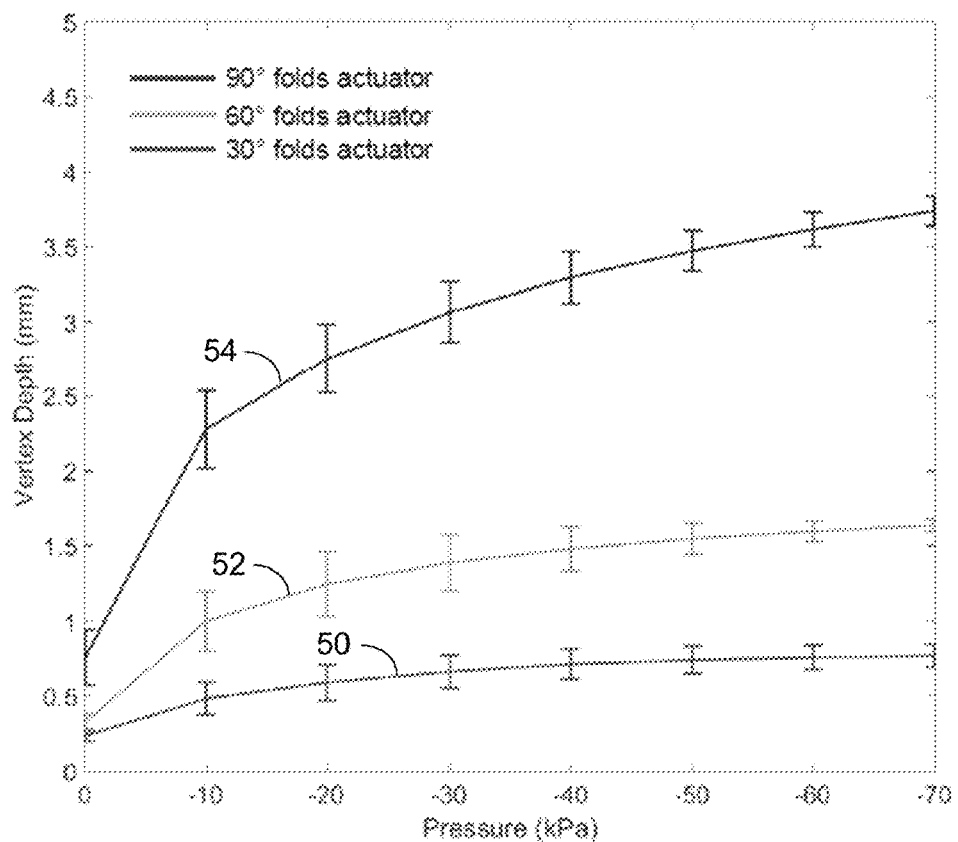

FIG. 26 plots measured skin deformation, wherein the mean is plotted along with error bars representing the standard deviation from five trials.

Figure 27:
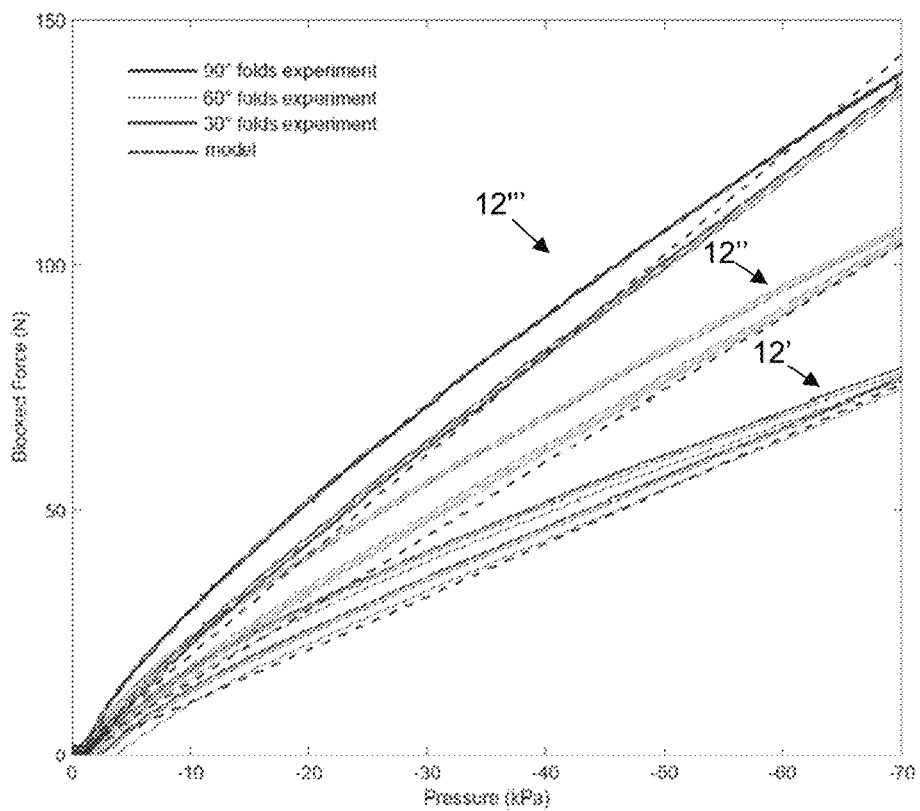

FIG. 27 is a plot providing a blocked-force comparison between the model estimation and experimental data.

Figure 28:
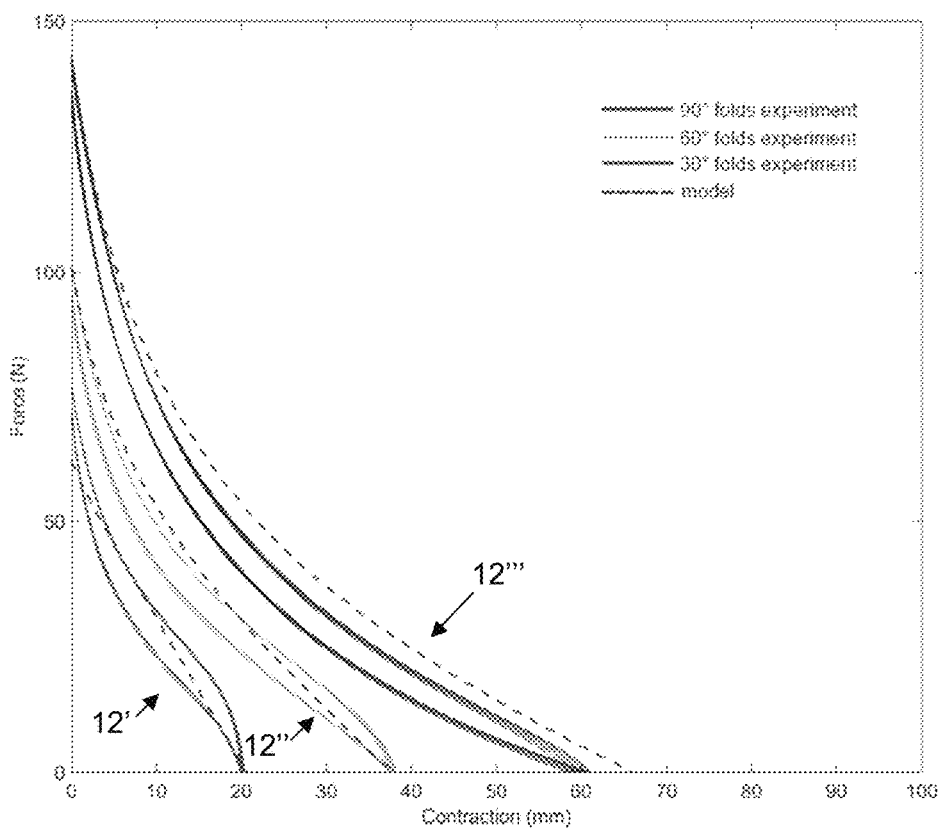

FIG. 28 is a plot providing a force-contraction comparison between the model estimation and experimental data.

Figure 29:
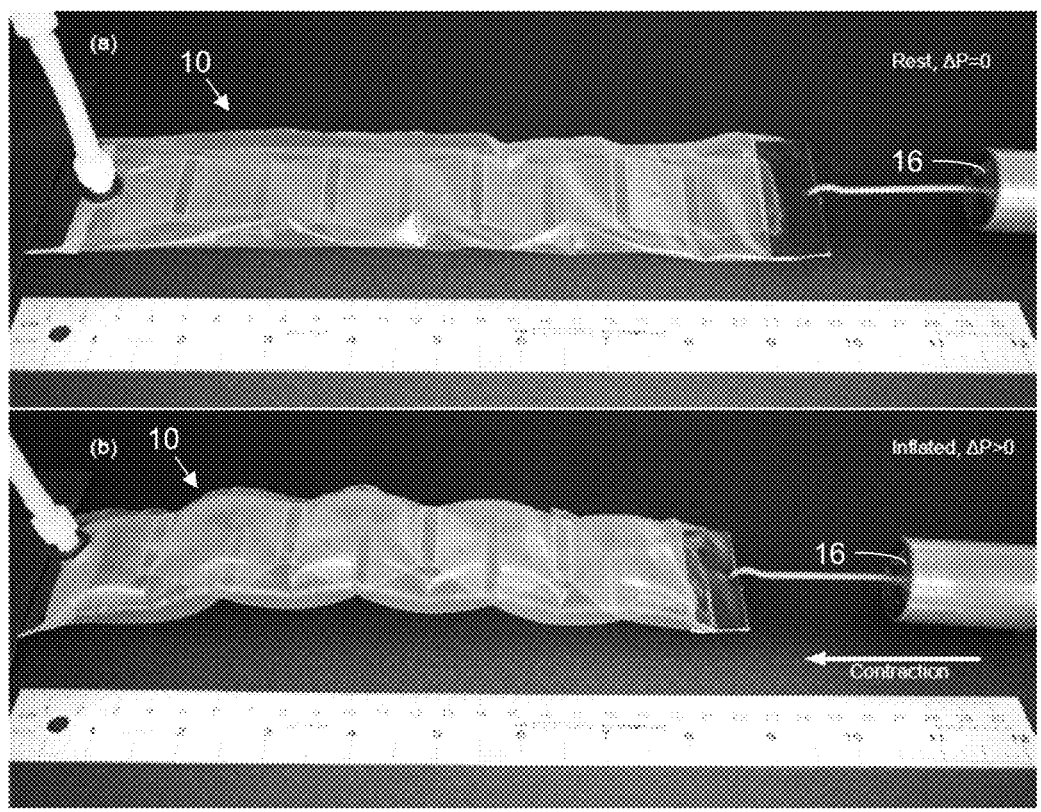

FIG. 29 includes photographic images of a demonstration of positive-pressure-driven contraction.

Figure 30:
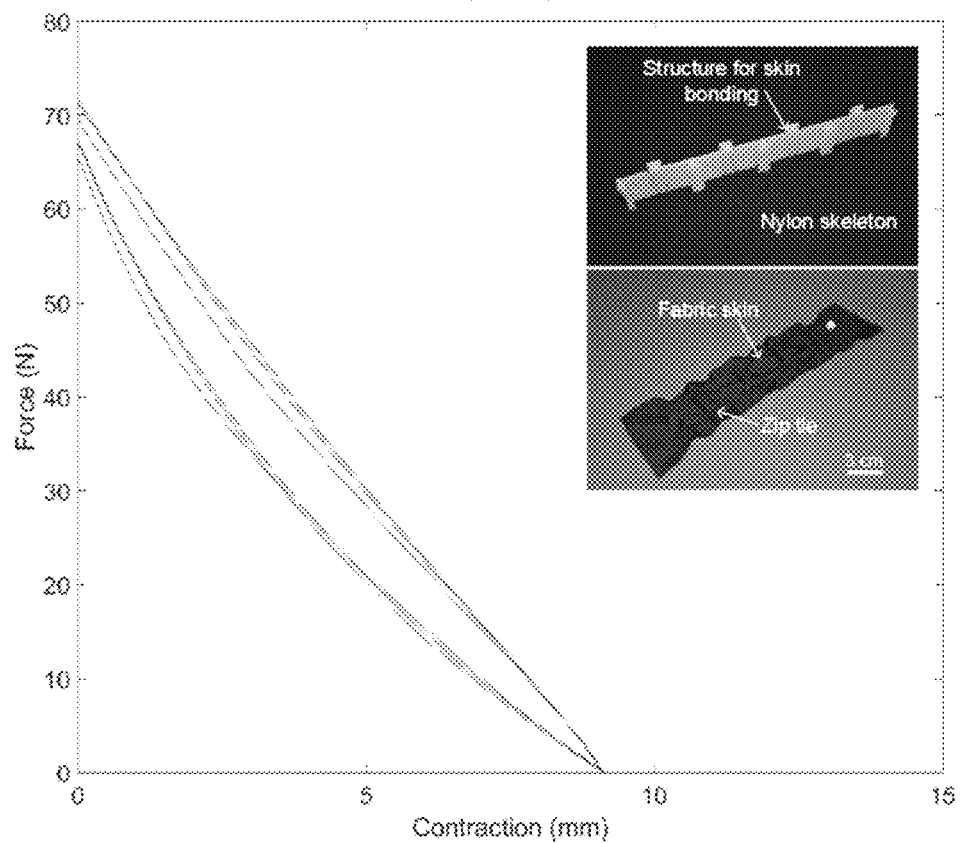

FIG. 30 plots force versus contraction from a force-contraction experiment on a positive-pressure-driven actuator.

Figure 31:
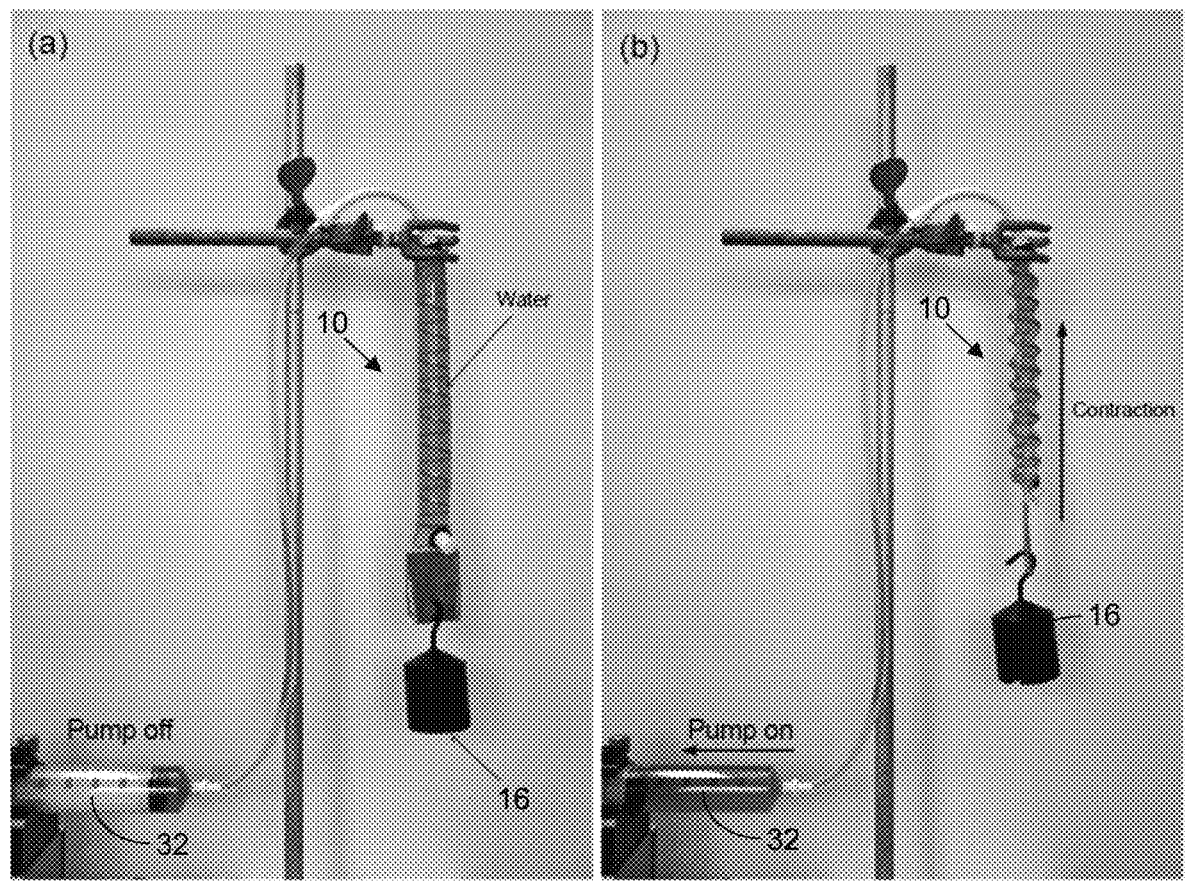

FIG. 31 includes photographic images of a water-driven load lifting test with a 1-kg load 16 and an embodiment of the actuator 10 and pump 32 for the fluid (water) actuation.

Figure 32:
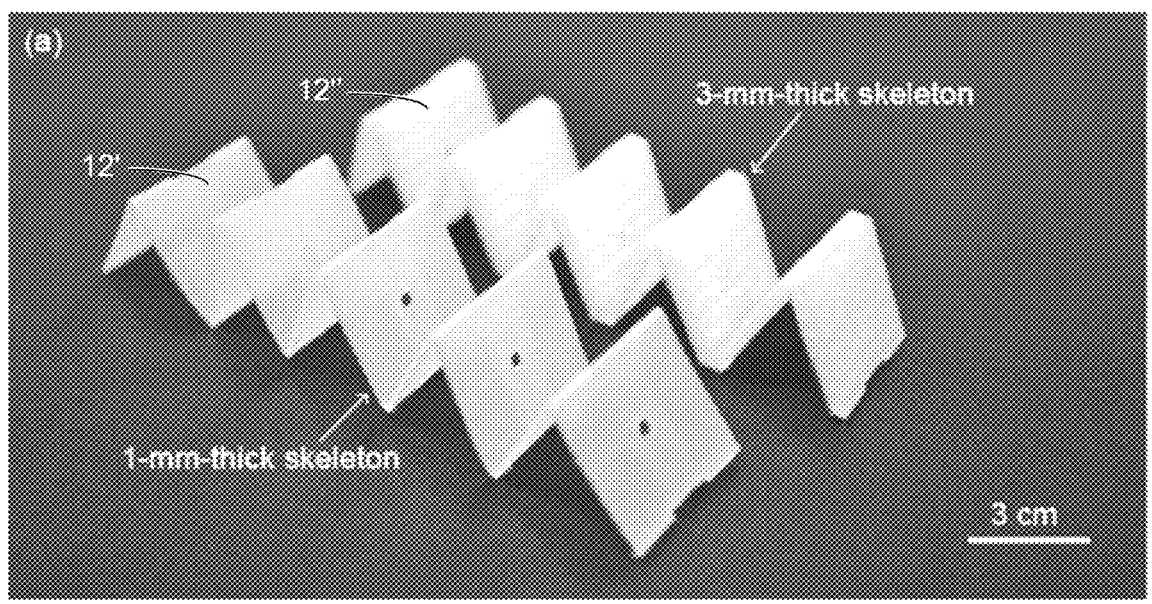

FIG. 32 is a photographic image of two skeletons 12 with different wall thicknesses [1 mm (12') and 3 mm (12")].

Figures 33, 34:
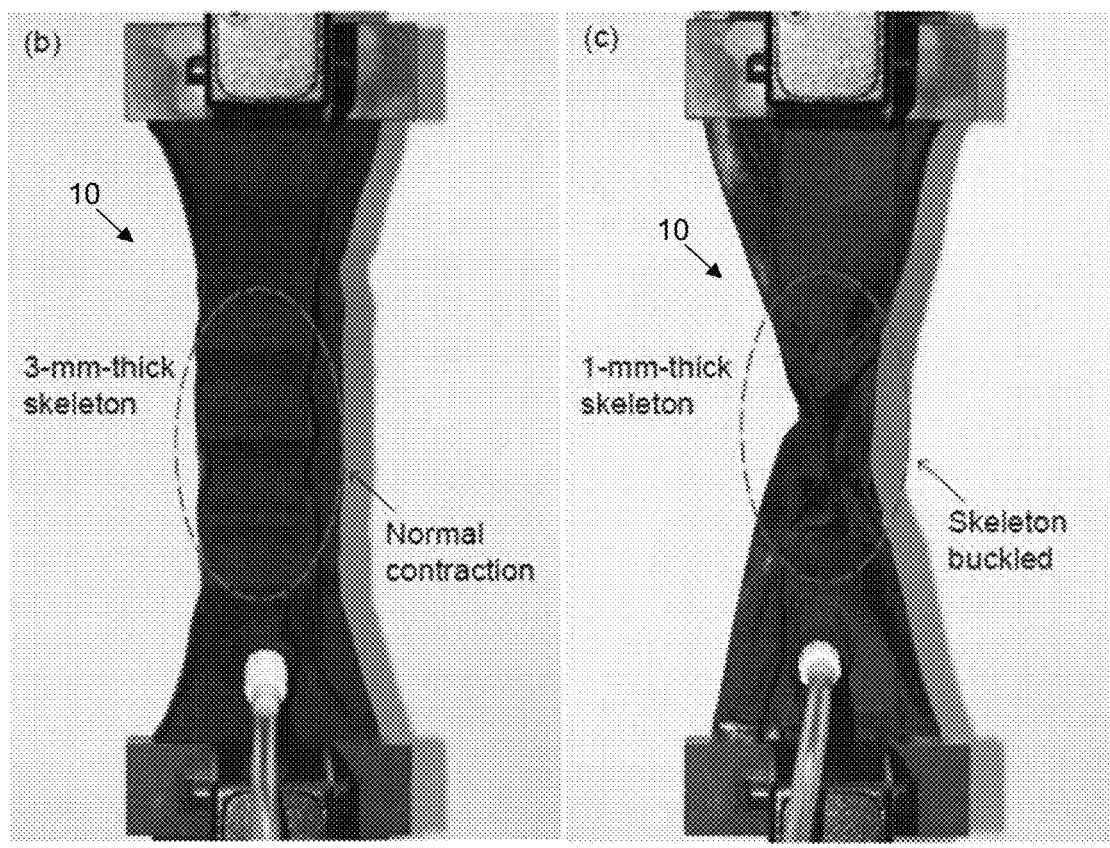

FIG. 33 shows the thick-wall (3-mm) skeleton of FIG. 32 contracting normally.

FIG. 34 shows the thin-wall (1-mm) skeleton of FIG. 32 buckling.

Figure 35:
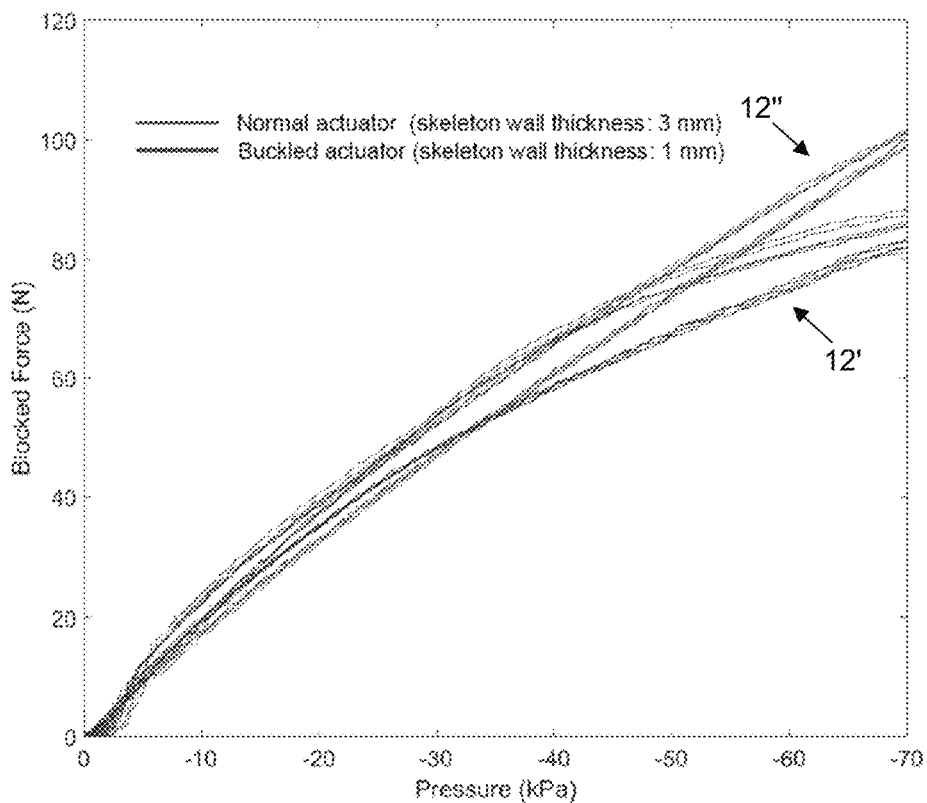

FIG. 35 plots an experimental comparison of blocked force as a function of pressure using the two skeletons of FIG. 32.

Figure 36:
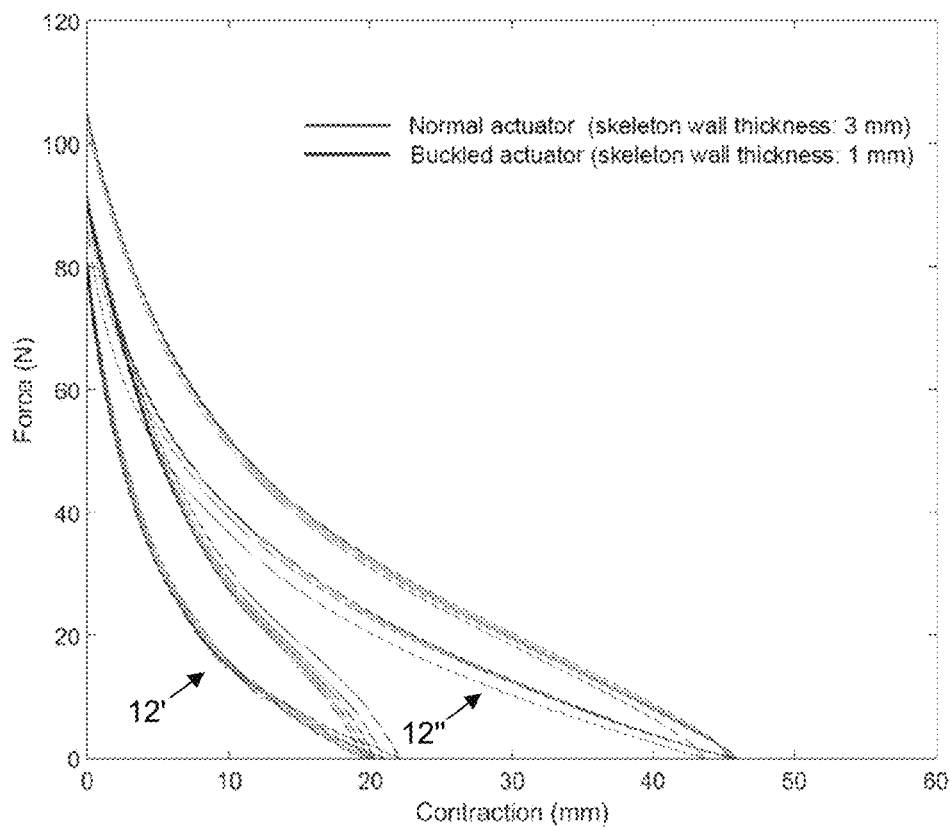

FIG. 36 shows the experimental force-contraction relationship of the skeletons of FIG. 32 (ΔP=−70 kPa).

Figure 37:
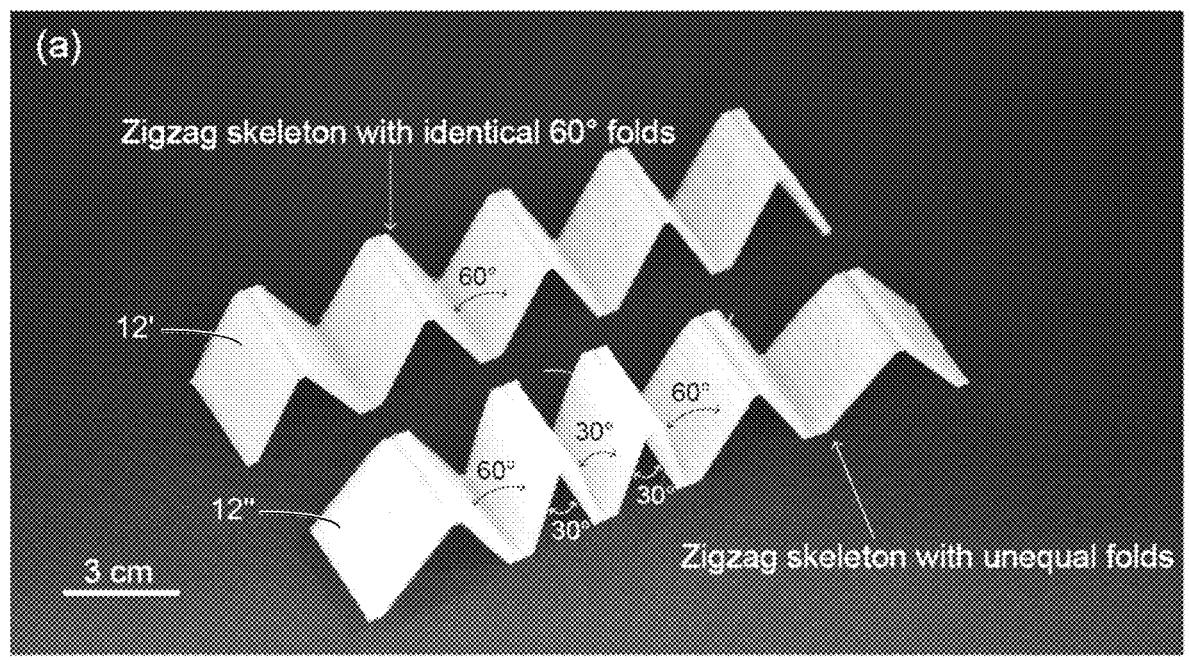

FIG. 37 shows two skeletons with different geometries, one skeleton 12' with identical 60° folds and the other skeleton 12" with unequal folds.

Figure 38:
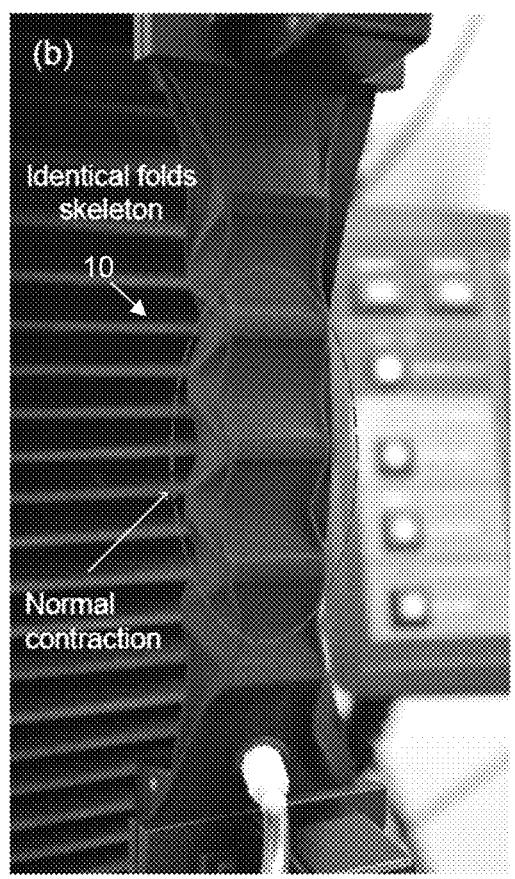

FIG. 38 shows the skeleton with identical folds (from FIG. 37) contracting normally.

Figure 39:
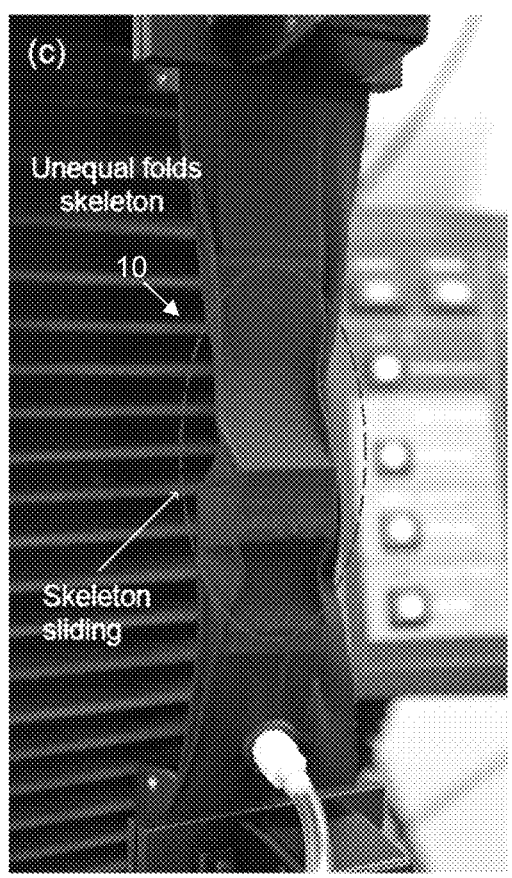

FIG. 39 shows the skeleton with unequal folds (from FIG. 37) exhibiting sliding.

Figure 40:
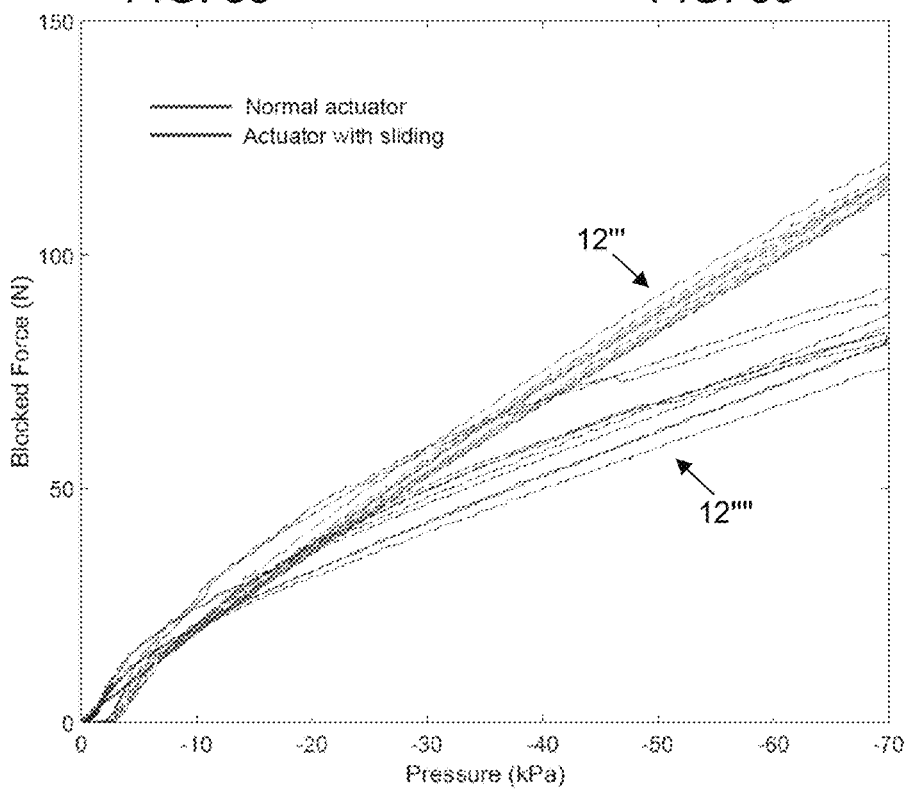

FIG. 40 plots blocked force as a function of pressure in an experimental comparison of actuators using the identical-folds skeleton 12' and the unequal-folds skeleton 12" of FIG. 37.

Figure 41:
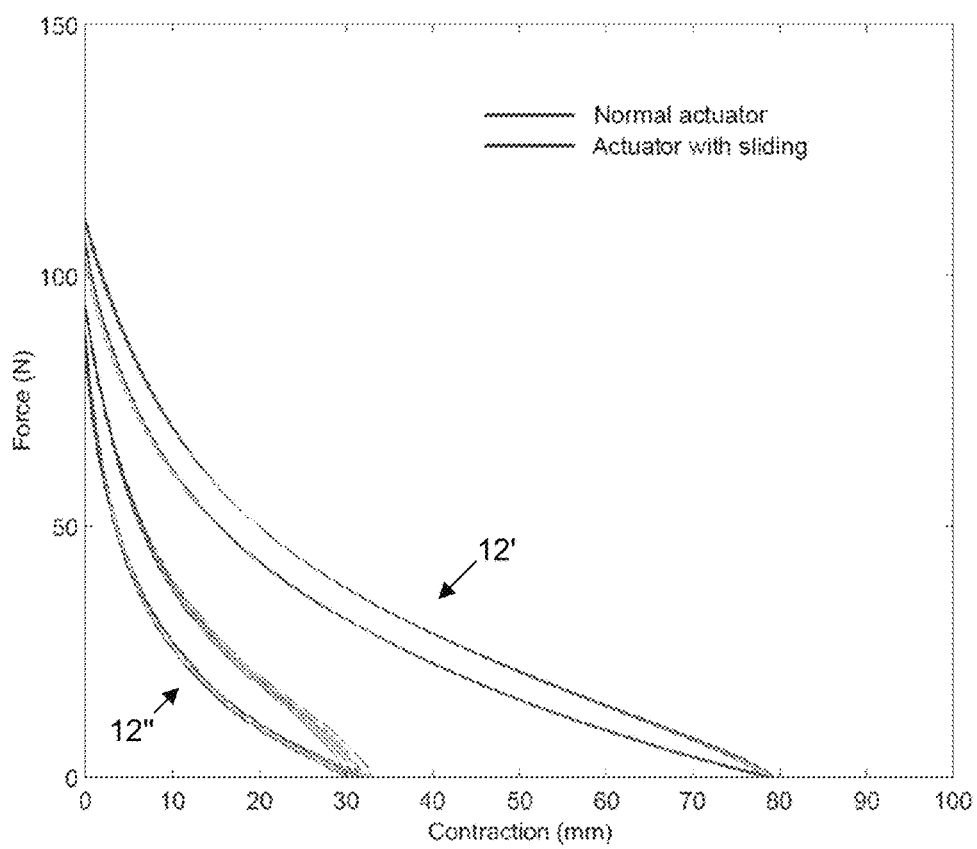

FIG. 41 shows the force-contraction relationship in the experimental comparison of actuators using the identical-folds skeleton 12' and the unequal-folds skeleton 12" of FIG. 37 (ΔP=−70 kPa).

Figure 42:
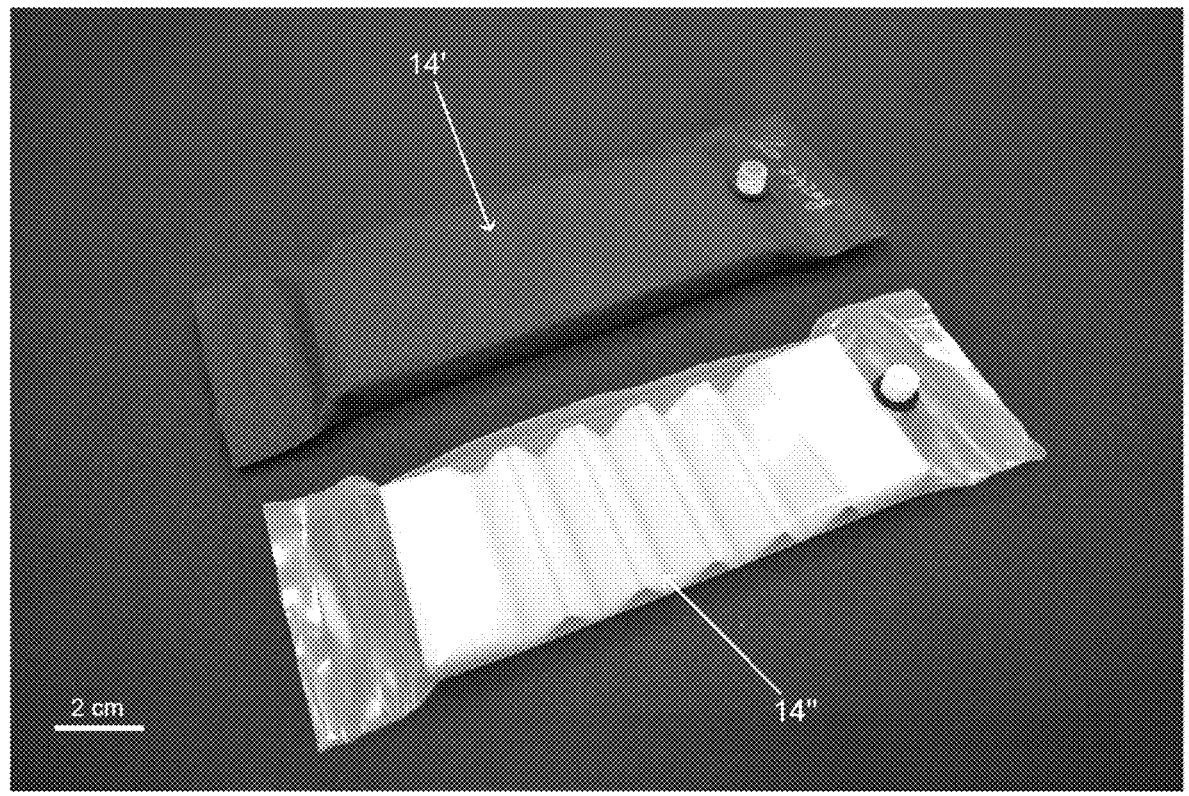

FIG. 42 is a photographic image of two similar actuators using different skin materials [nylon fabric skin 14' and thermoplastic urethane (TPU) skin 14"].

Figure 43:
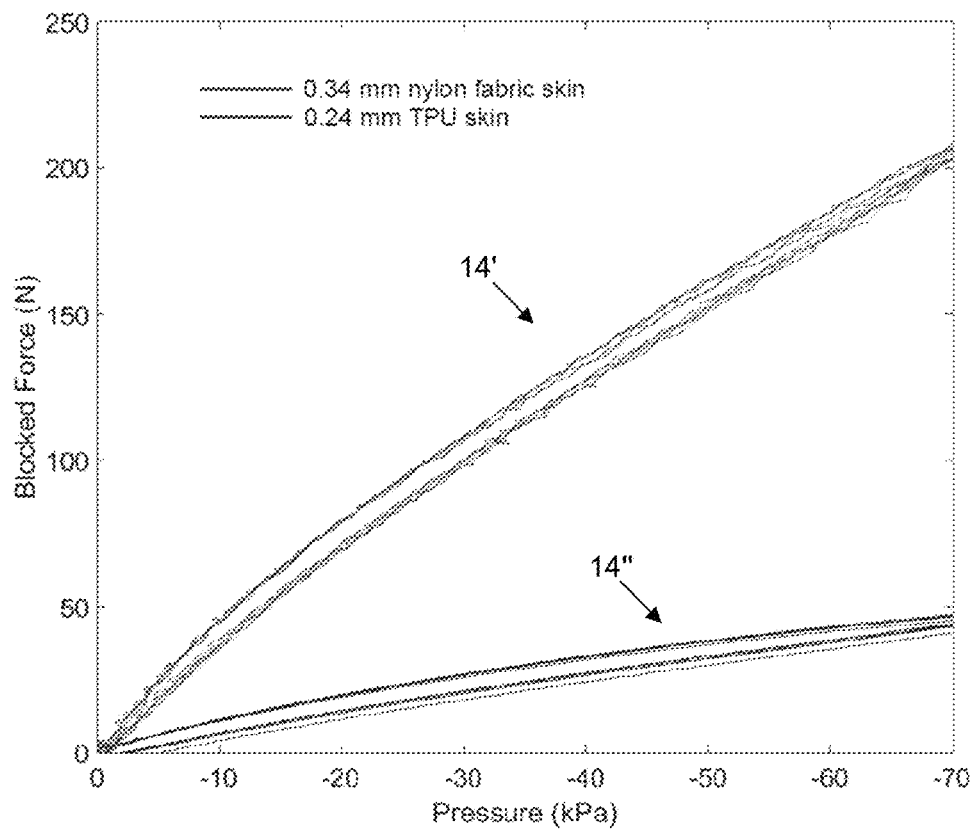

FIG. 43 plots an experimental comparison of blocked force as a function of pressure for the actuators of FIG. 42 using nylon skin 14' and TPU skin 14".

Figure 44:
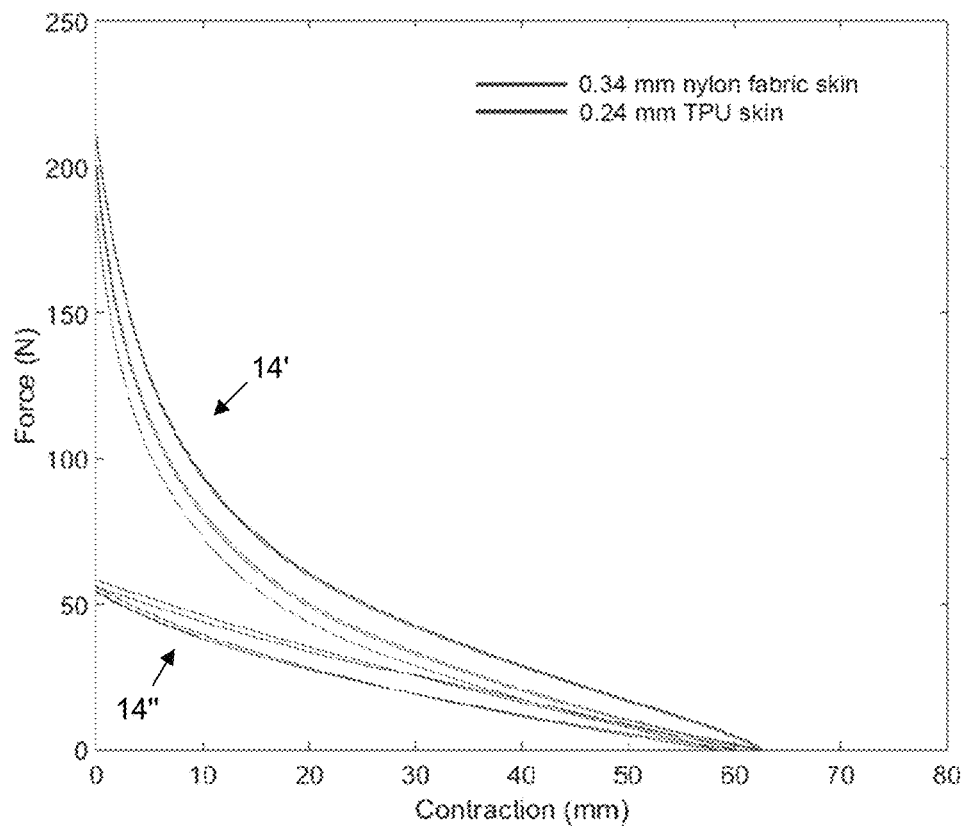

FIG. 44 shows an experimental comparison of the force-contraction relationship for the actuators of FIG. 42 using nylon skin 14' and TPU skin 14" (ΔP=−70 kPa).

Figure 45:
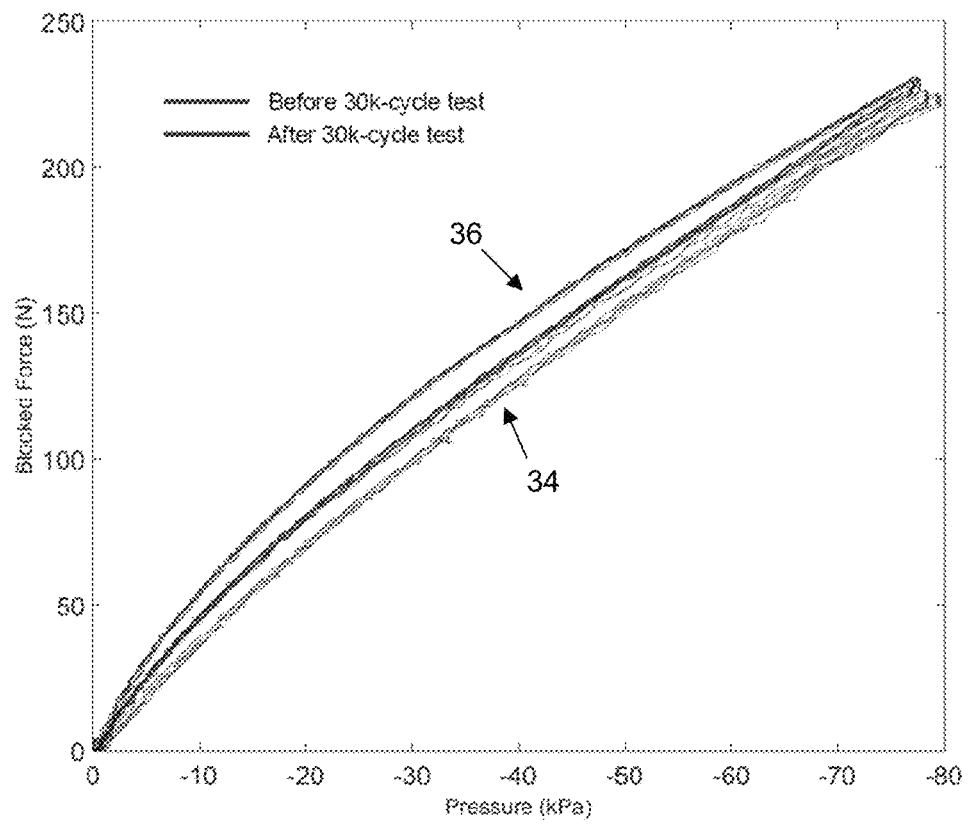

FIG. 45 plots blocked force as a function of pressure for an experimental comparison of an actuator before 30,000 cycle runs 34 and after 30,000 cycle runs 36.

Figure 46:
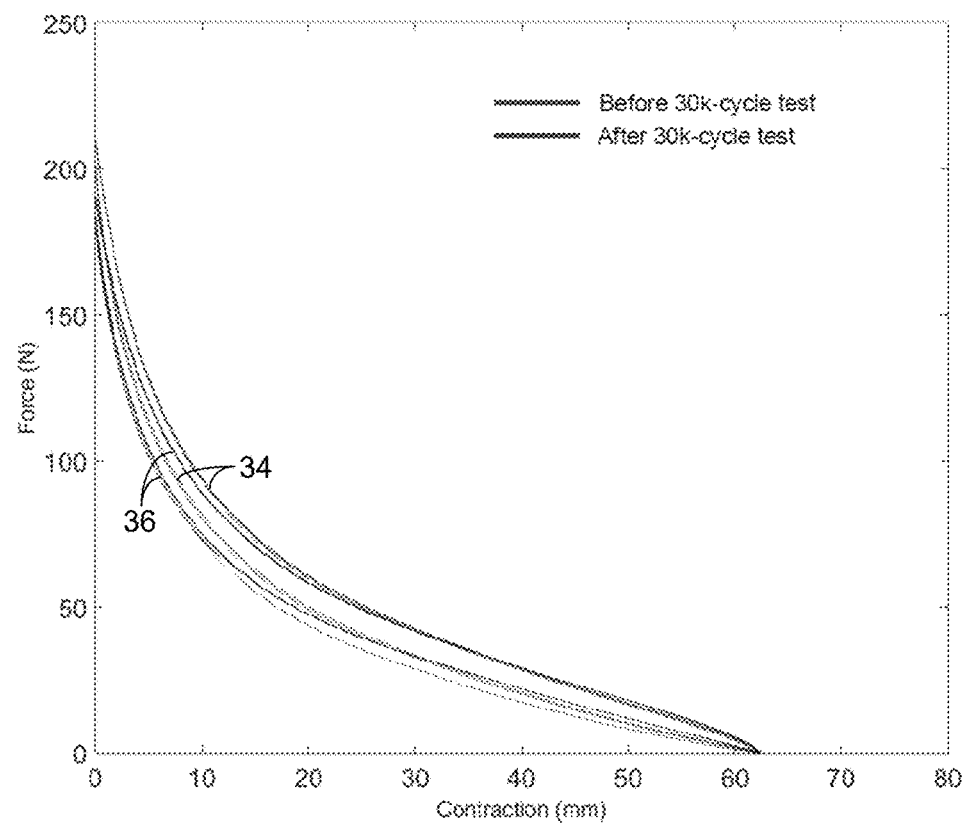

FIG. 46 shows the force-contraction relationship for the experimental comparison of the actuator before and after 30,000 cycle runs (ΔP=−70 kPa).

Figure 47:
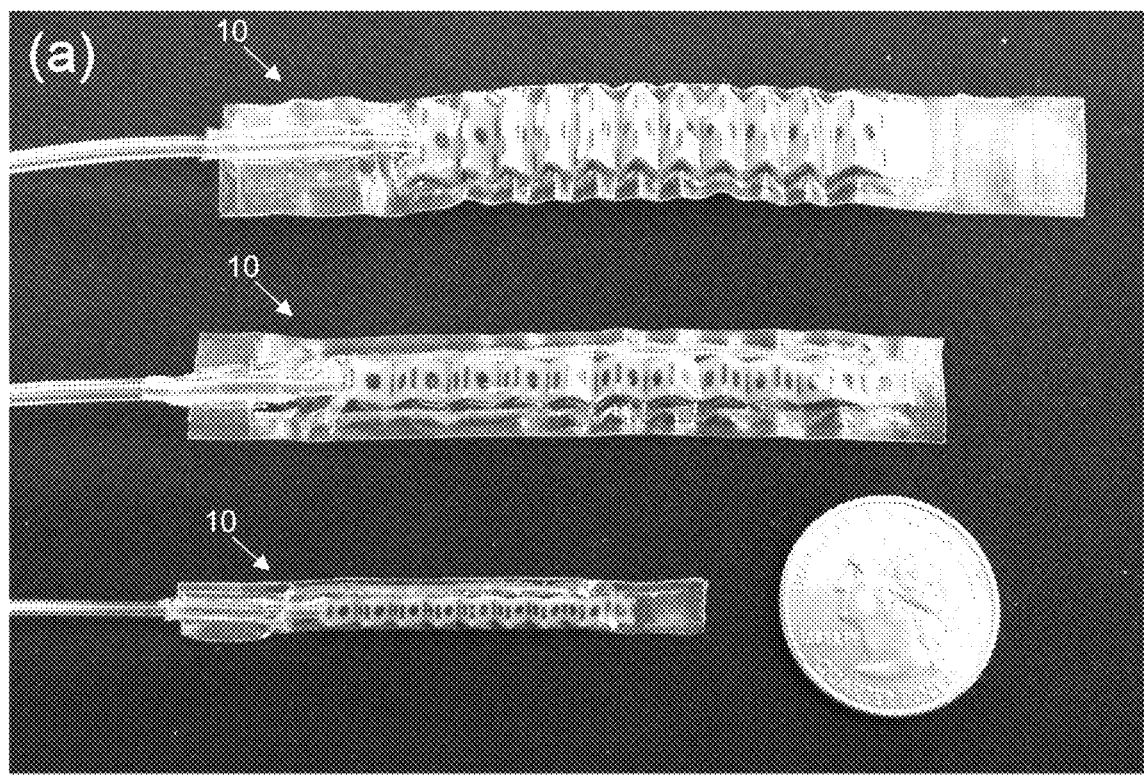

FIG. 47 shows millimeter-scale linear zigzag actuators 10 made from bio-compatible materials.

Figure 48:
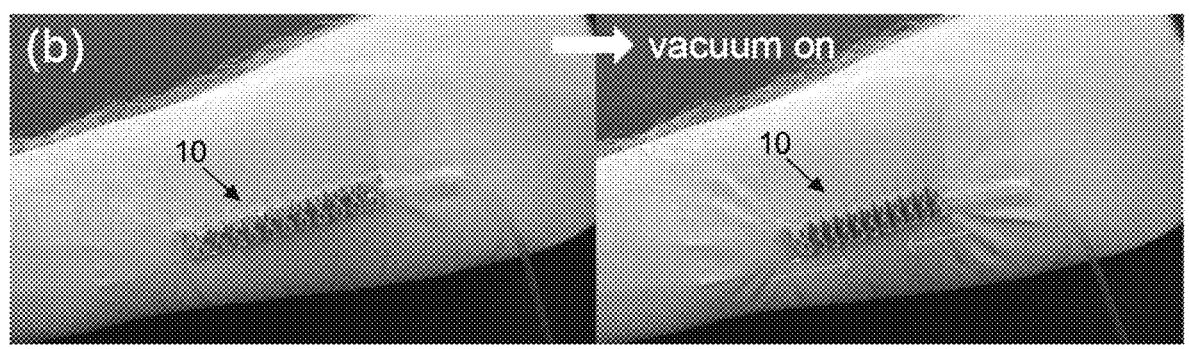

FIG. 48 shows that the miniature actuators 10 of FIG. 47 can be used for medical applications, such as for skin tensioning (shown) or for wearable assistive devices.

Figure 49:
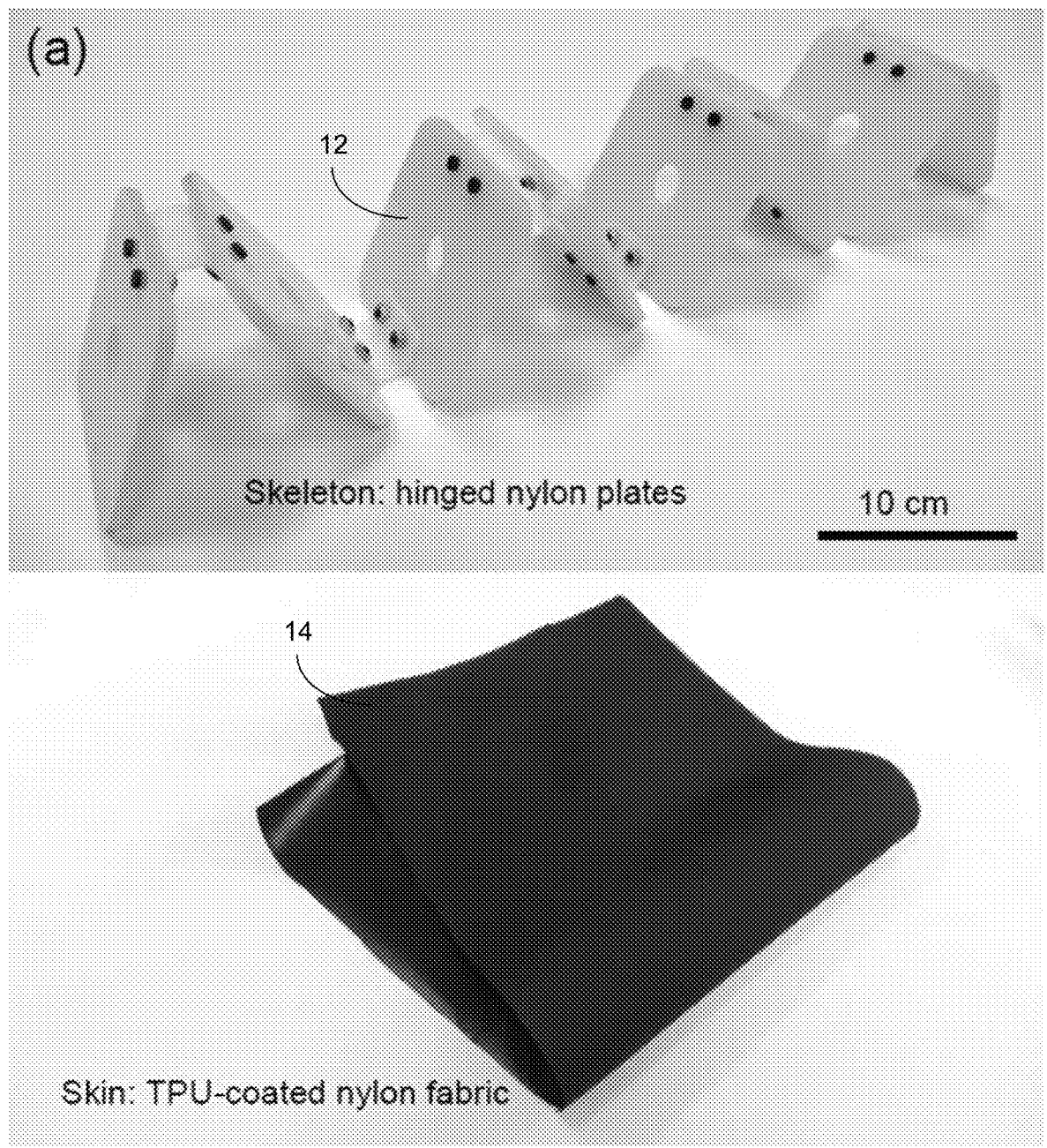

FIG. 49 shows photographic images of a skeleton 12 and skin 14 made from nylon materials for a large linear actuator.

Figure 50:
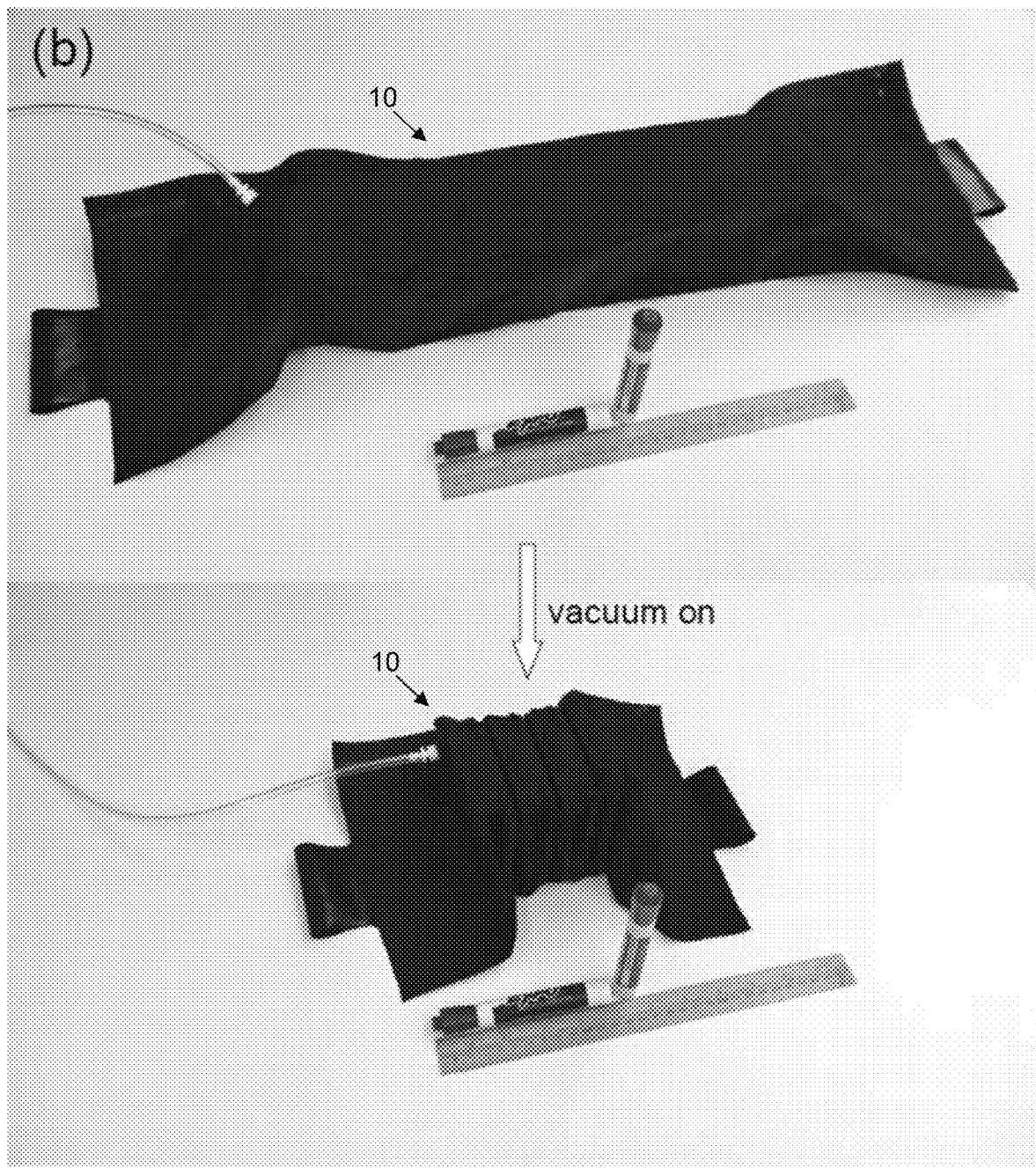

FIG. 50 shows vacuum-driven contraction of the actuator 10 formed of the skeleton and skin of FIG. 49.

Figure 51:
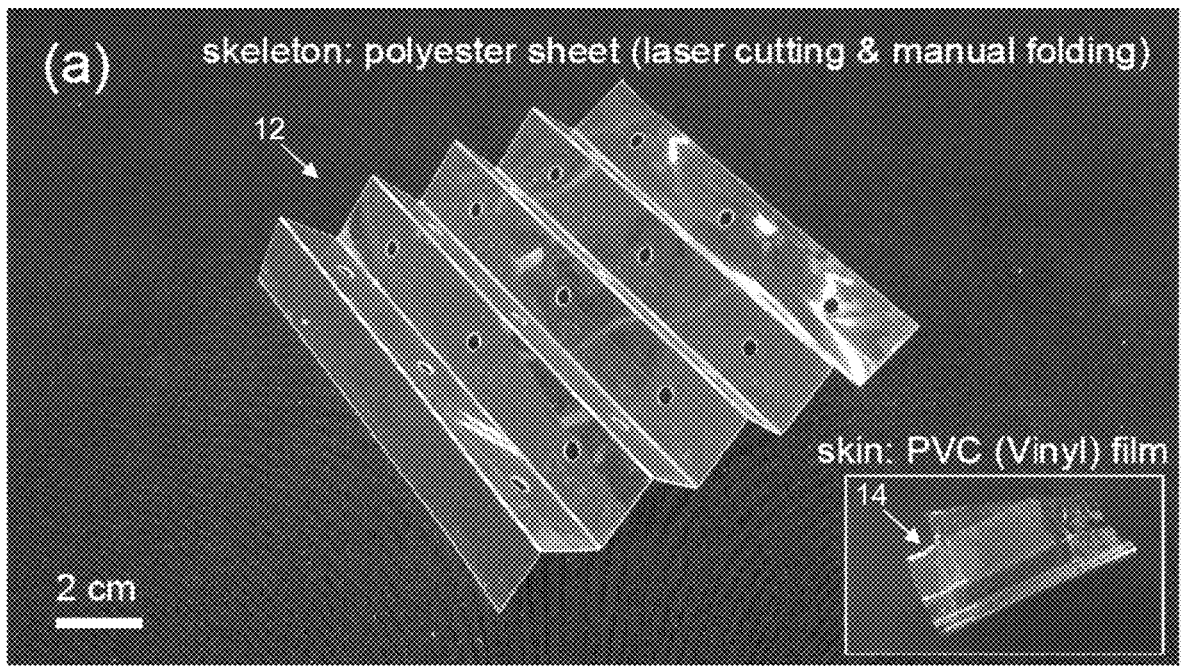

FIG. 51 shows the components of a transparent actuator, wherein the skeleton 12 is formed of a polyester sheet (laser cut and manually folded), and wherein the skin 14 is formed of a PVC (vinyl) film.

Figure 52:
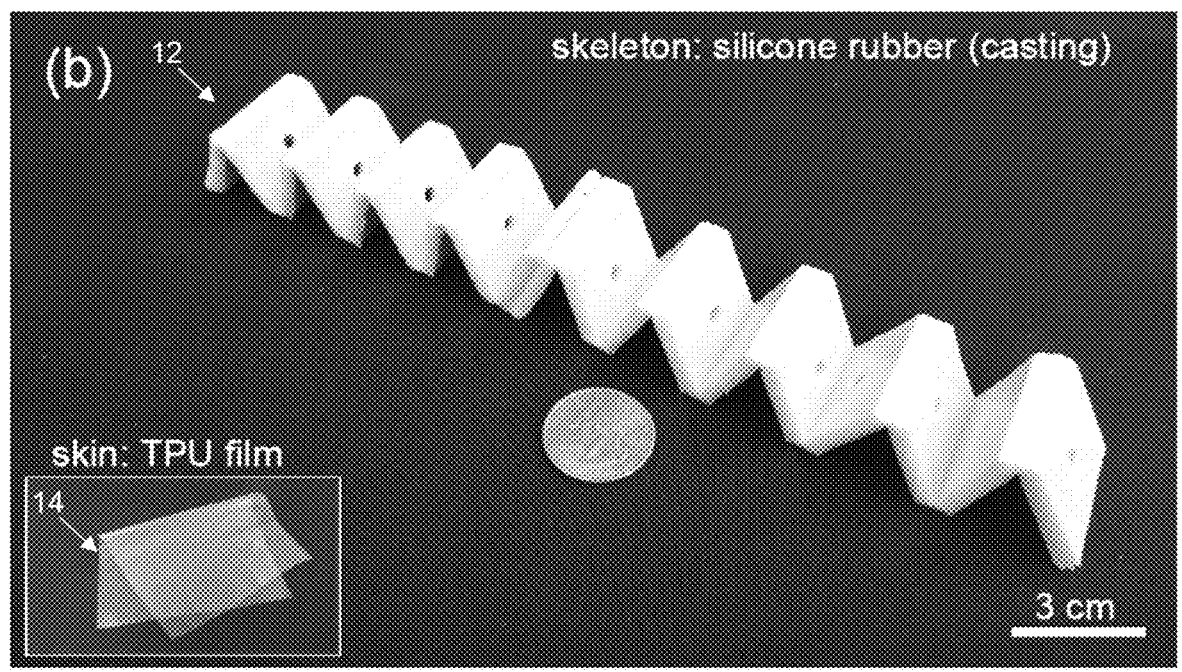

FIG. 52 shows the components of a soft actuator with a skeleton 12 formed of cast silicone rubber and a skin 14 formed of a TPU film.

Figure 53:
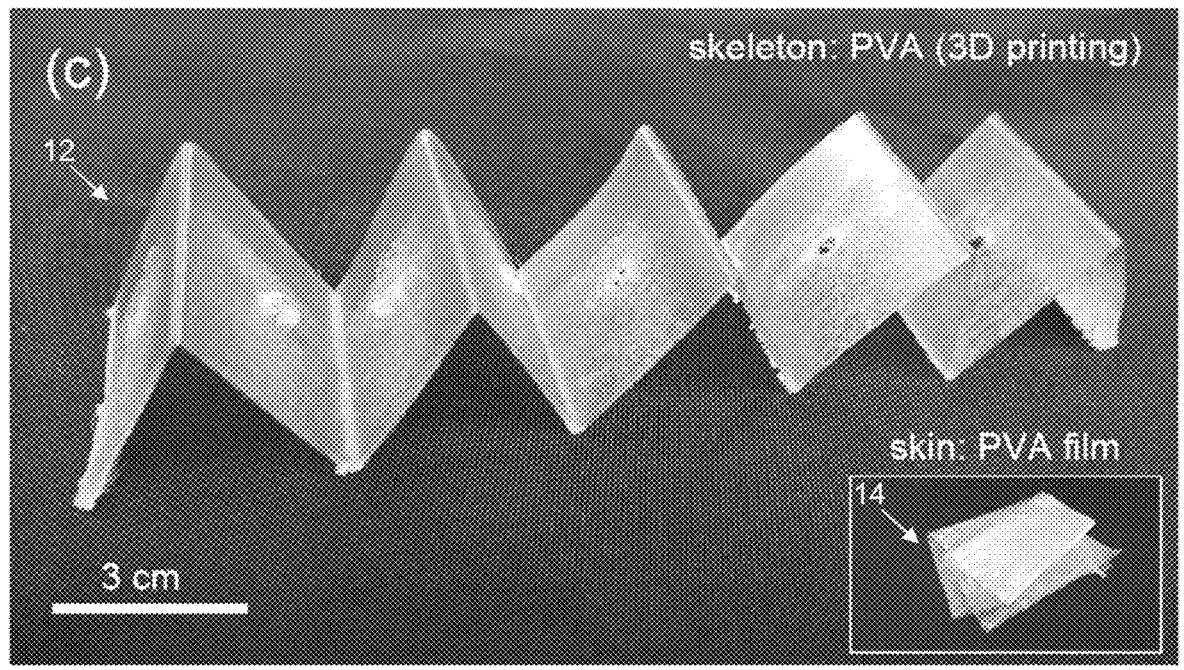

FIG. 53 shows the components of a water-soluble actuator with a 3D-printed skeleton 12 formed of polyvinyl alcohol (PVA) and a skin 14 formed of a PVA film.

Figure 54:
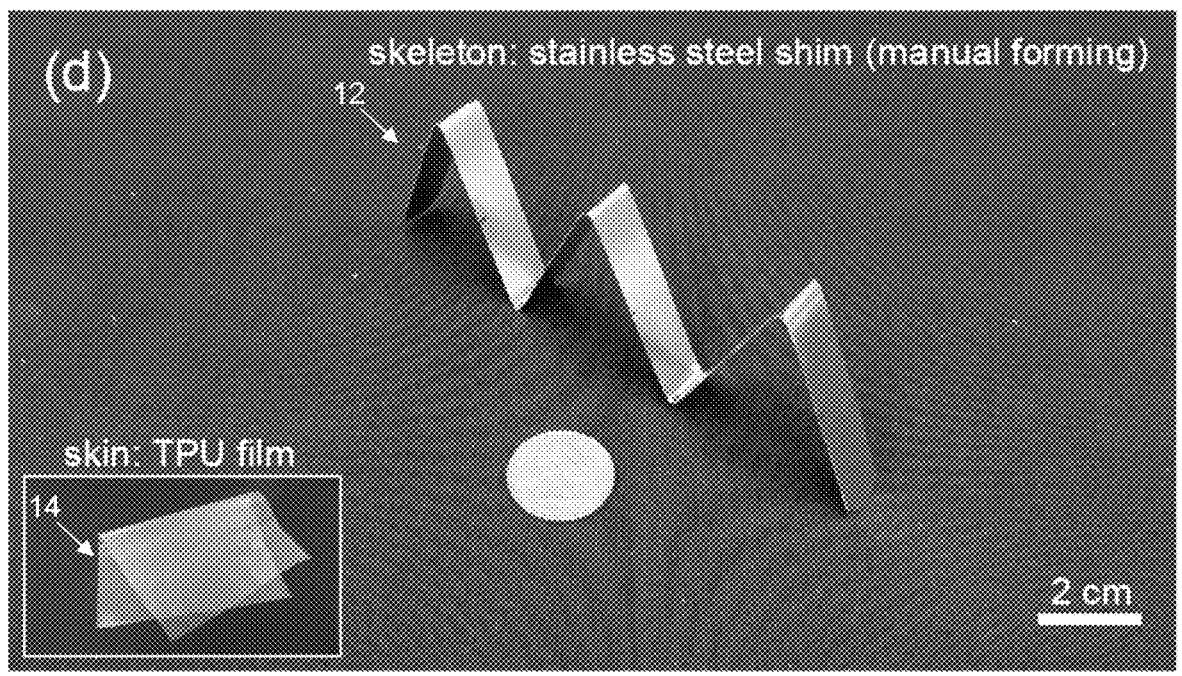

FIG. 54 shows the components of an under-water actuator with a skeleton 12 manually formed from a stainless steel shim and a skin 14 formed of a TPU film.

Figure 55:
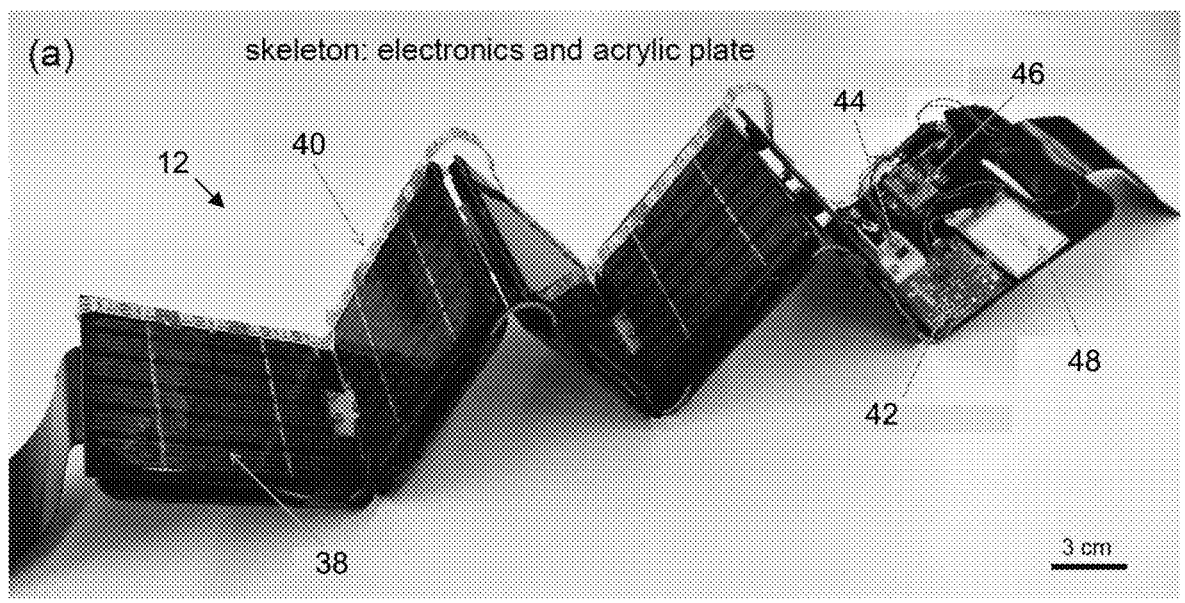

FIG. 55 is a photographic image showing an actuator skeleton 12 (here comprising acrylic plates) with various functional electronics, including a solar panel 38, LEDs 40, a power charging board 42, a folding sensor 44, a micro controller 46, and a rechargeable battery 48 embedded thereon.

Figure 56:
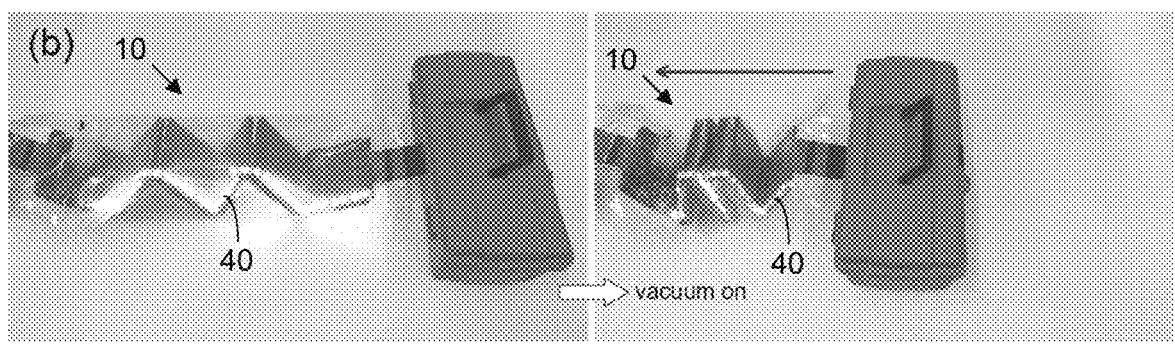

FIG. 56 is a photographic image showing vacuum-driven contraction of a skeleton with light-emitting diodes (LEDs) 40 mounted thereon.

Figure 57:
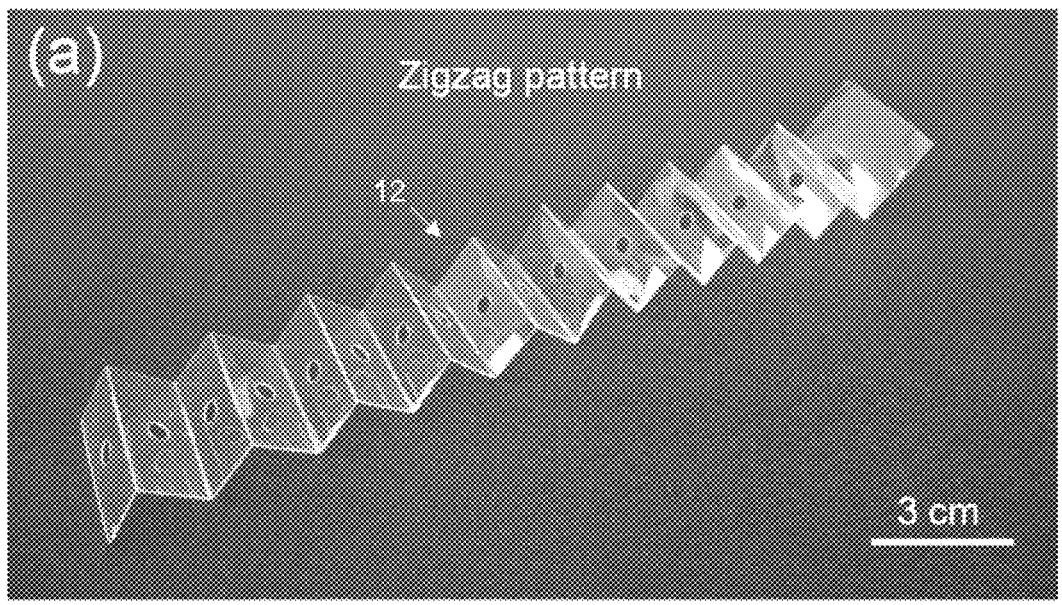

FIG. 57 is a photographic image showing a zigzag-pattern skeleton 12 geometry for 1D contraction.

Figure 58:
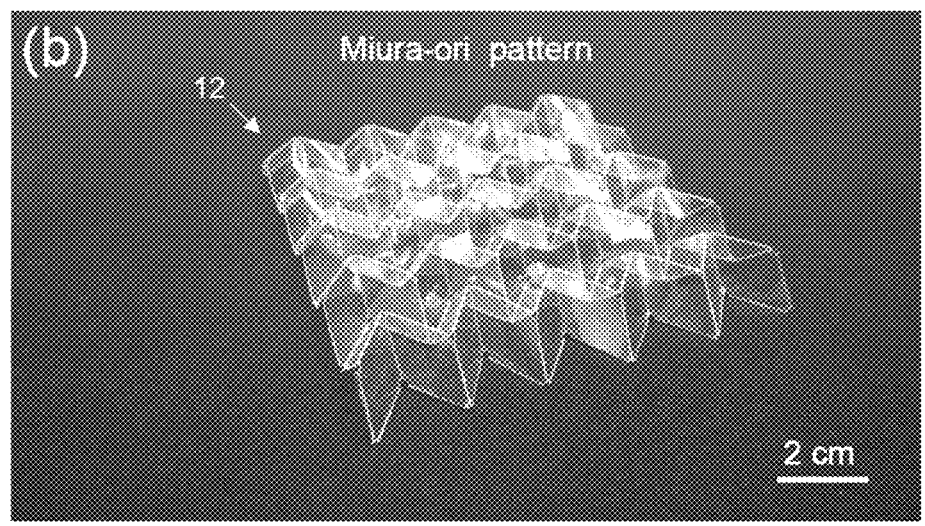

FIG. 58 is a photographic image showing a Miura-ori-pattern skeleton 12 geometry for 2D contraction.

Figure 59:
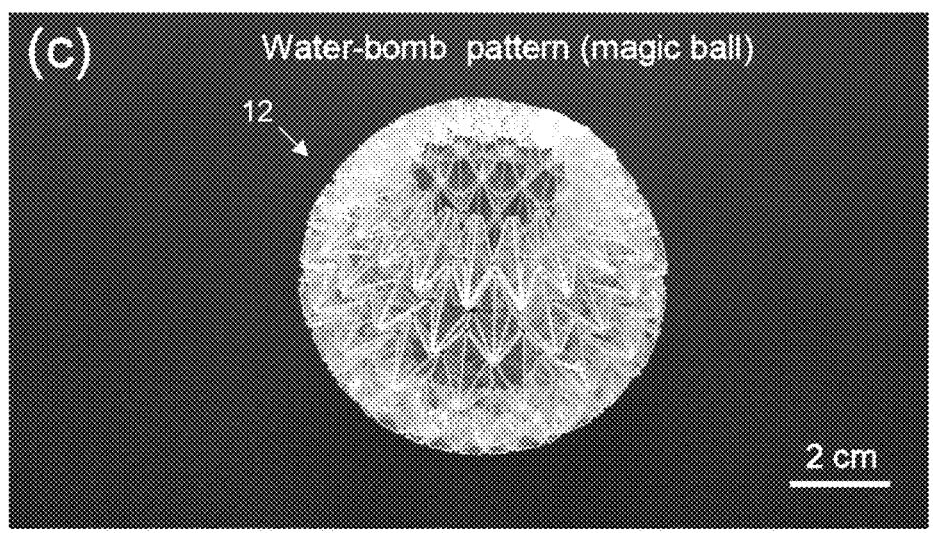

FIG. 59 is a photographic image showing a water-bomb (magic ball) pattern skeleton 12 geometry for 3D contraction.

Figure 60:
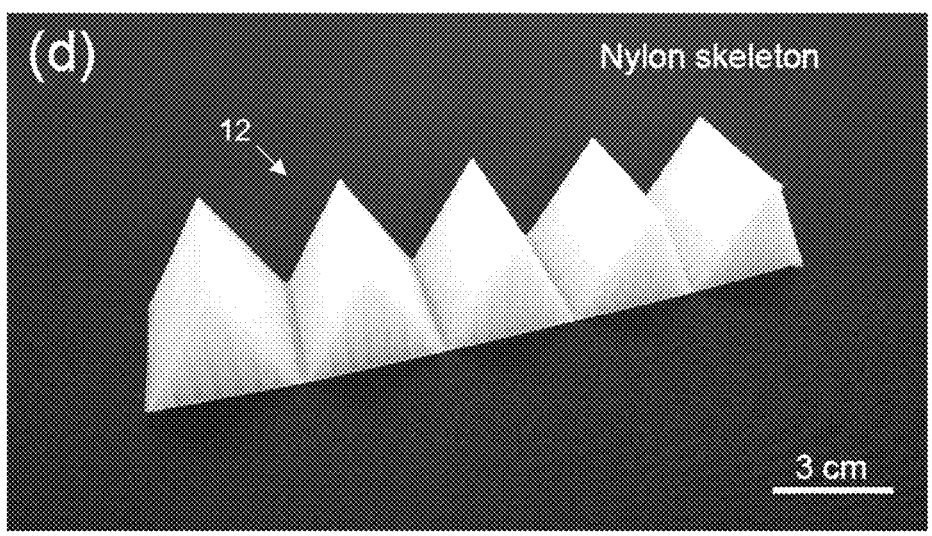

FIG. 60 is a photographic image showing a nylon skeleton 12 geometry for generating a bending motion.

Figure 61:
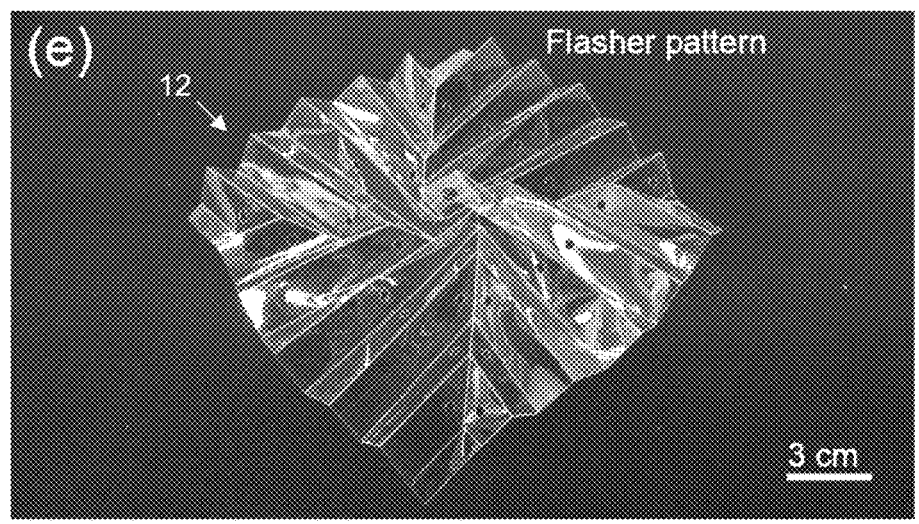

FIG. 61 is a photographic image showing a flasher-pattern skeleton 12 geometry for combined contraction and rotation.

Figure 62:
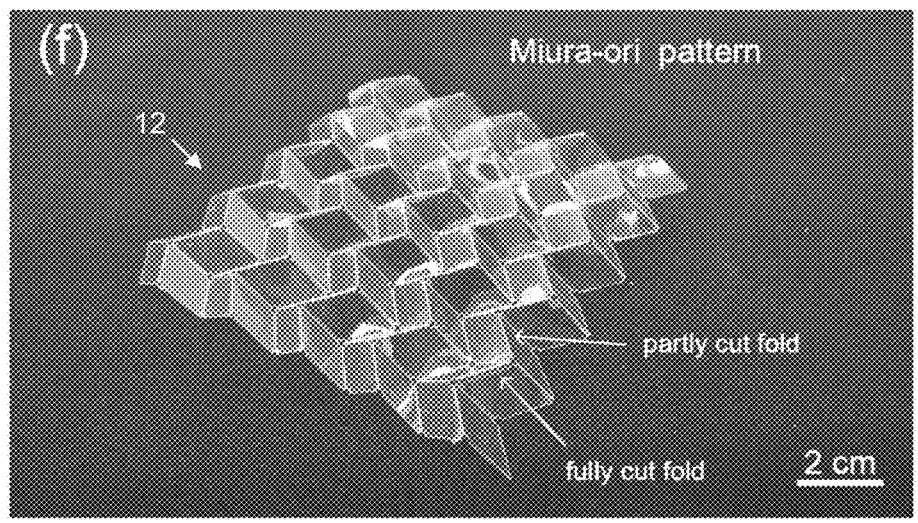

FIG. 62 is a photographic image showing a Miuri-ori-pattern skeleton 12 geometry for combined contraction and torsion.

Figure 63:
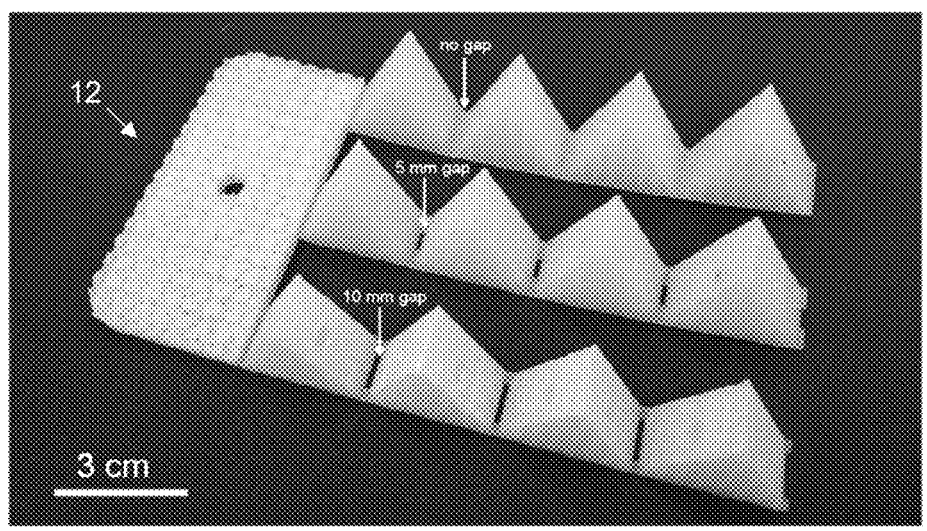

FIG. 63 is a photographic image of a skeleton 12 for a three-finger robotic hand.

Figure 64:
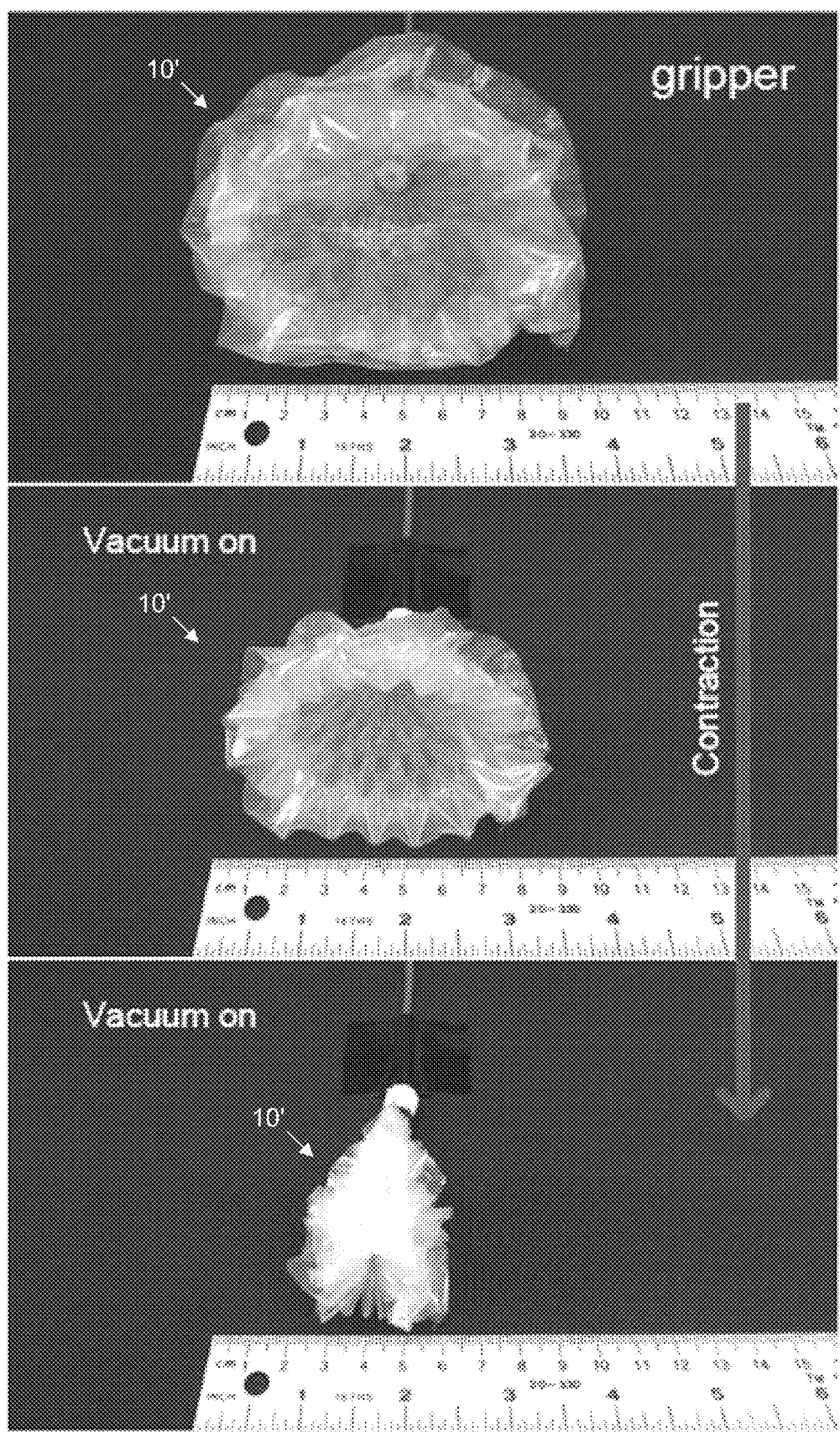

FIG. 64 includes photographic images showing an actuated gripper 10' for a robotic arm.

Figure 65:
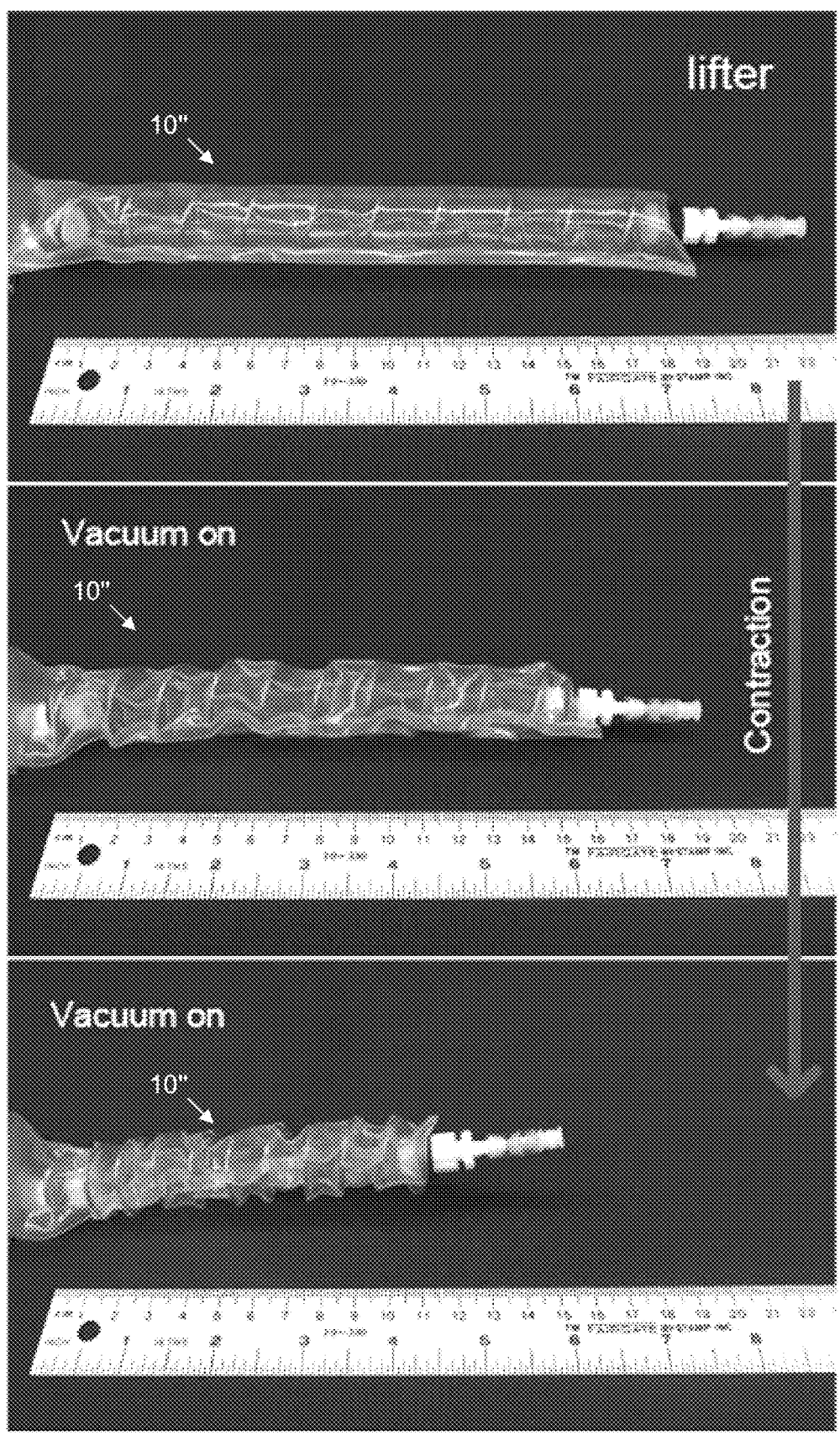

FIG. 65 includes photographic images showing an actuated lifter 10" for a robotic arm.

Figure 66:
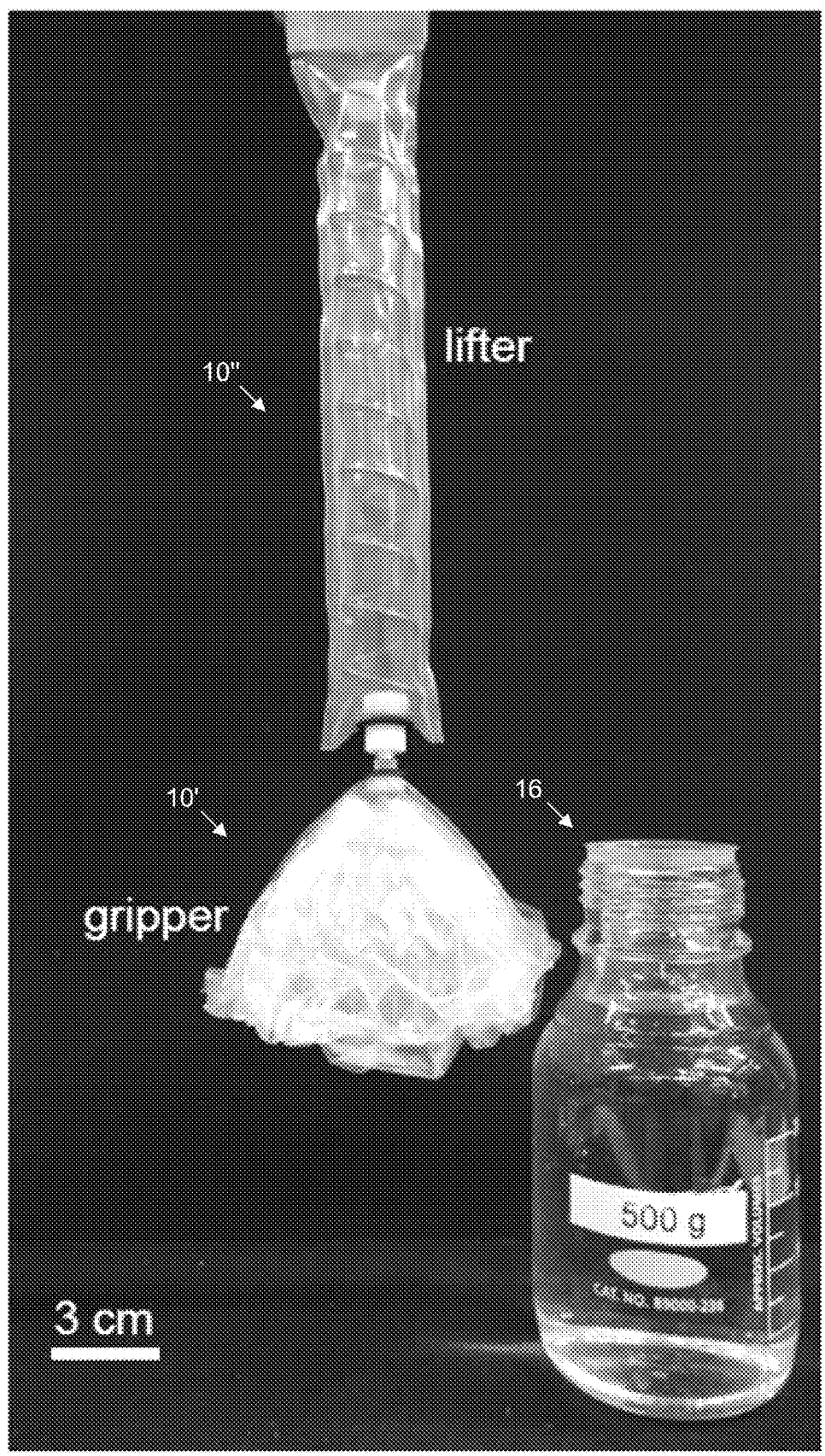

FIG. 66 is a photographic image of an assembled robotic arm including the gripper 10' of FIG. 64 and the lifter 10" of FIG. 65.

Figure 67:
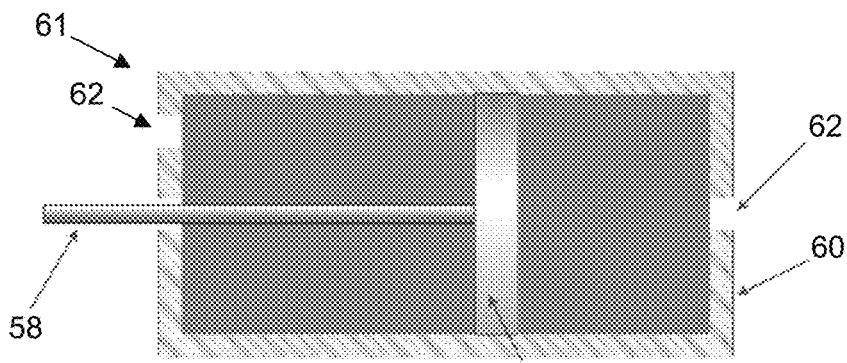
Figure 68:
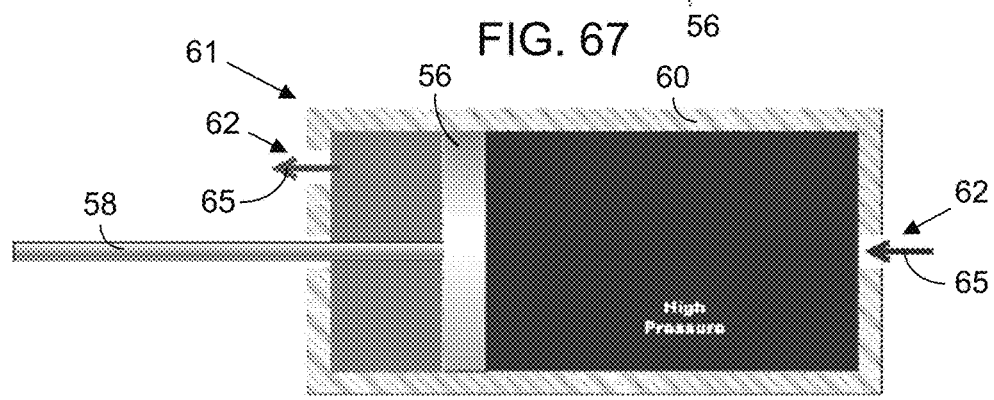

FIGS. 67 and 68 illustrate the basic structure of a conventional piston system 61.

Figure 69:
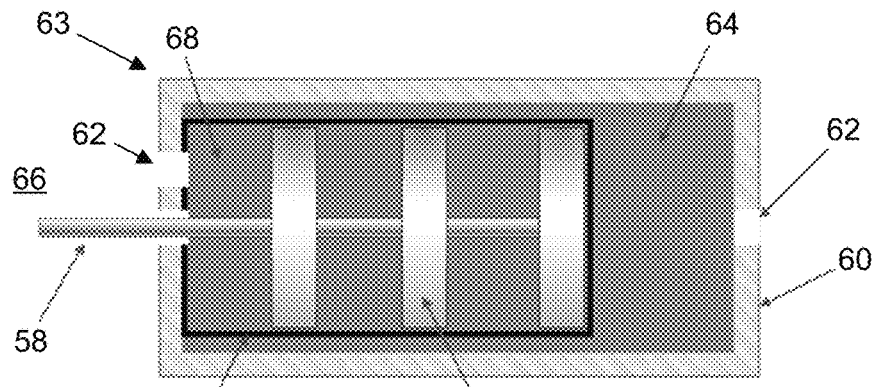
Figure 70:
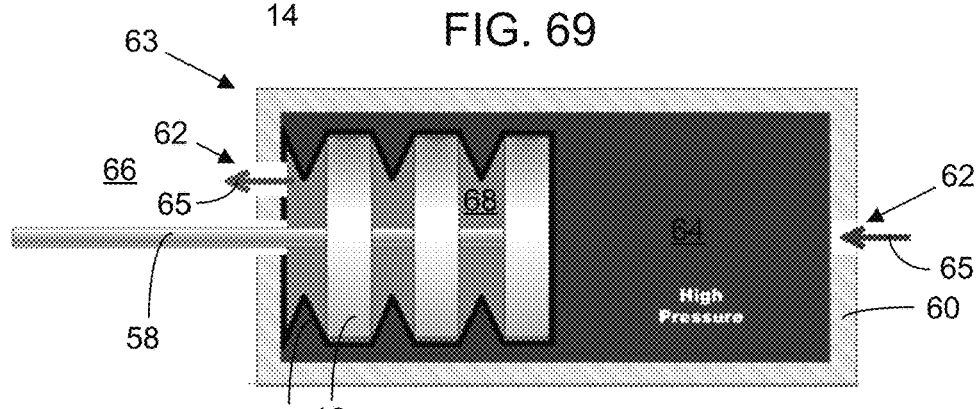

FIGS. 69 and 70 illustrate the basic structure of a linear tension piston system 63.

Figure 71:
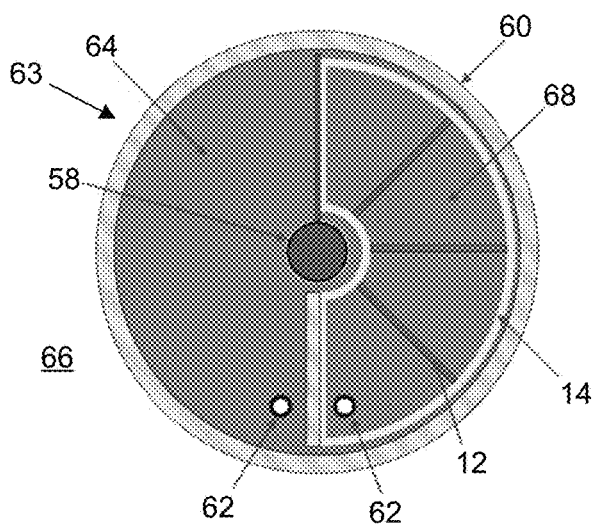
Figure 72:
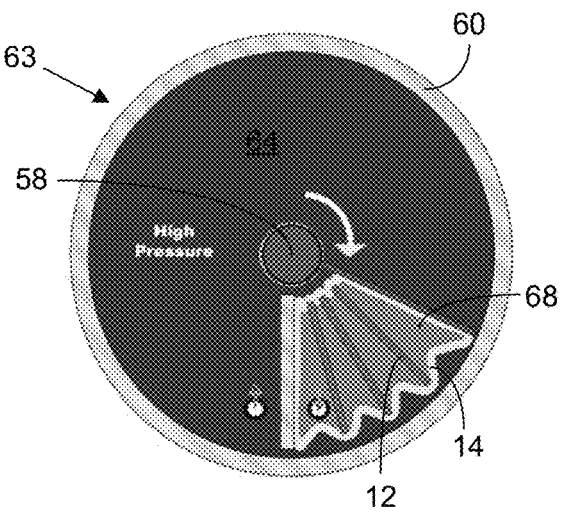

FIGS. 71 and 72 illustrate the basic structure of a rotational tension piston system 63.

Figure 73:
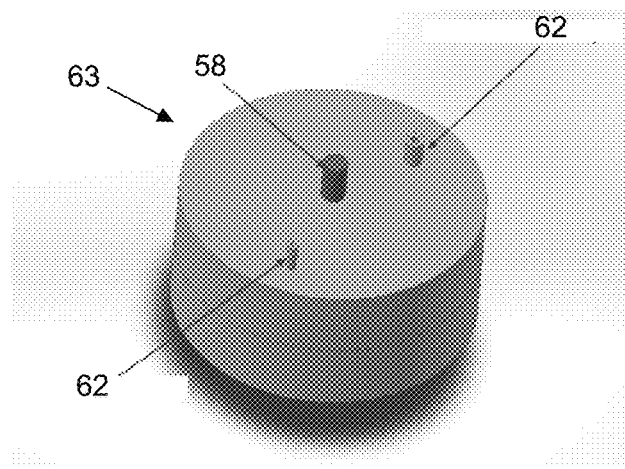
Figure 74:
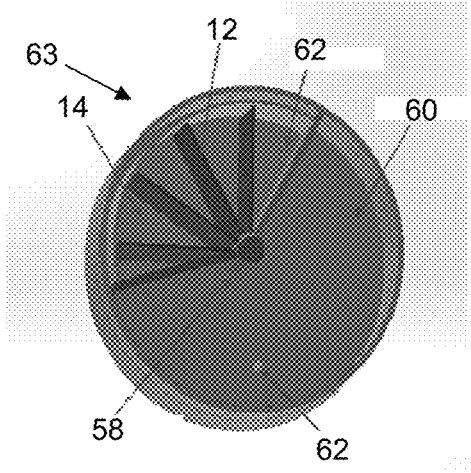

FIGS. 73 and 74 illustrate a cylinder-shaped rotational tension piston system 63.

Figure 75:
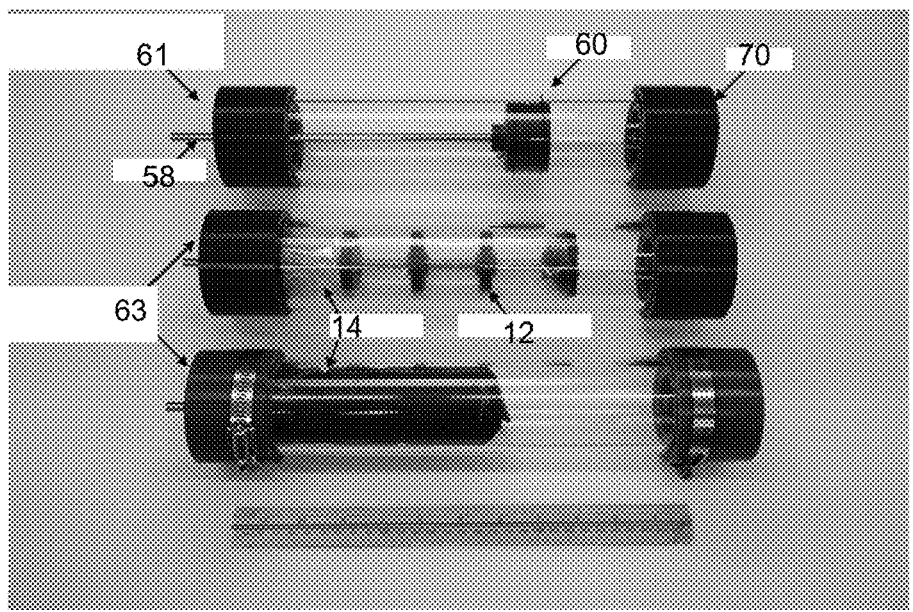

FIG. 75 is a photographic image of prototypes of a conventional piston system 61 and tension piston systems 63.

Figure 76:
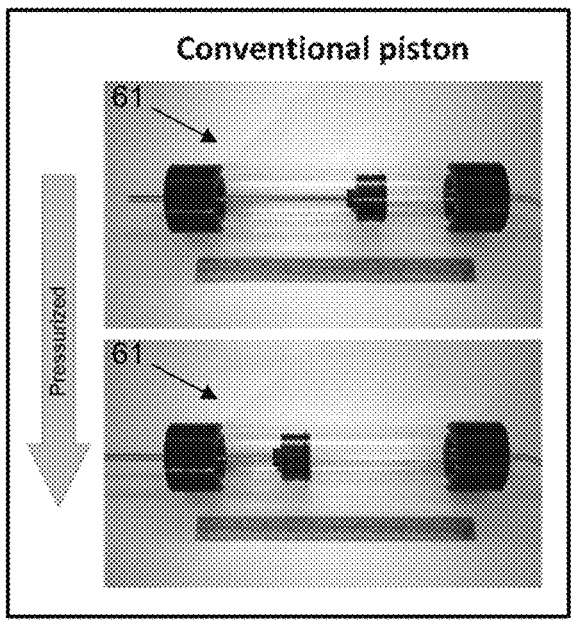
Figure 77:
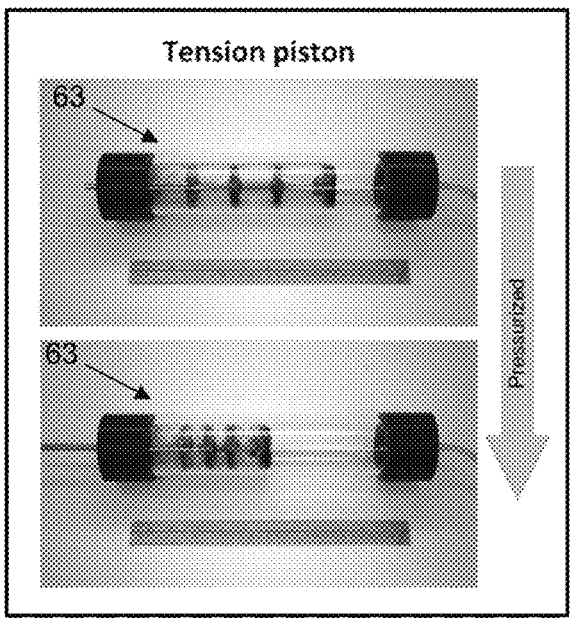

FIGS. 76 and 77 provide a comparison of actions between a conventional piston system 61 (FIG. 76) and a tension piston system 63 (FIG. 77).

Figure 78:
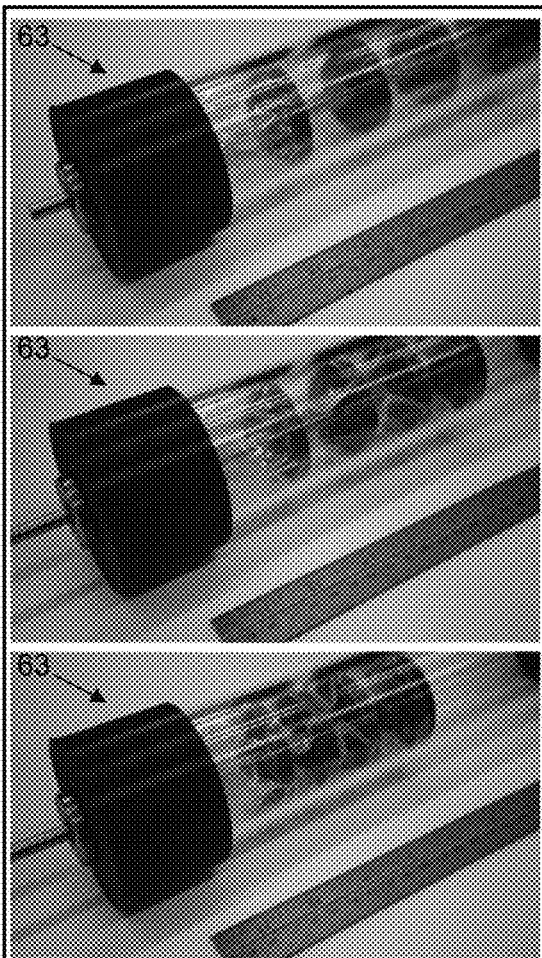
Figure 78:
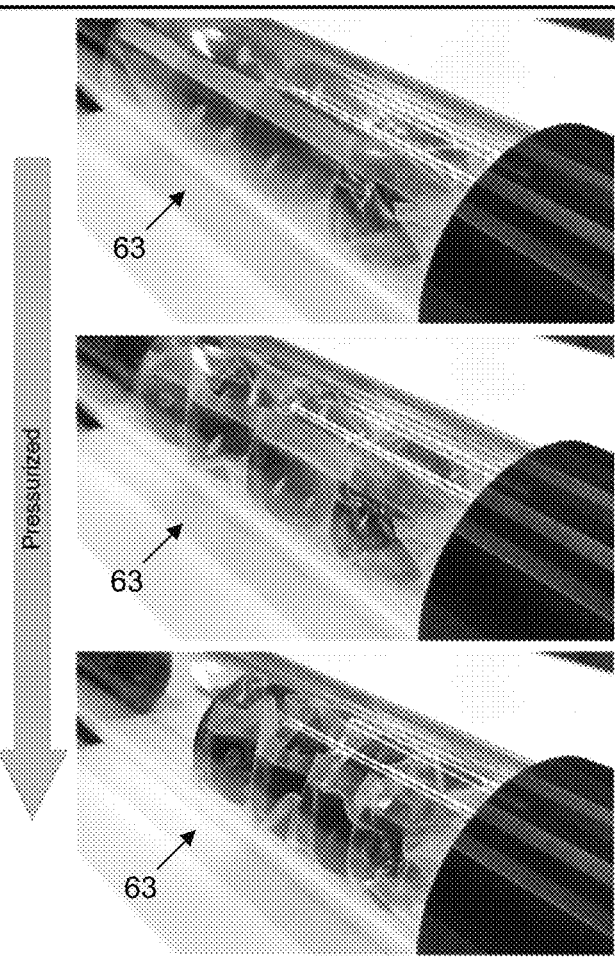

FIG. 78 includes photographic images providing perspective views of a linear tension piston system 63.

Figure 79:
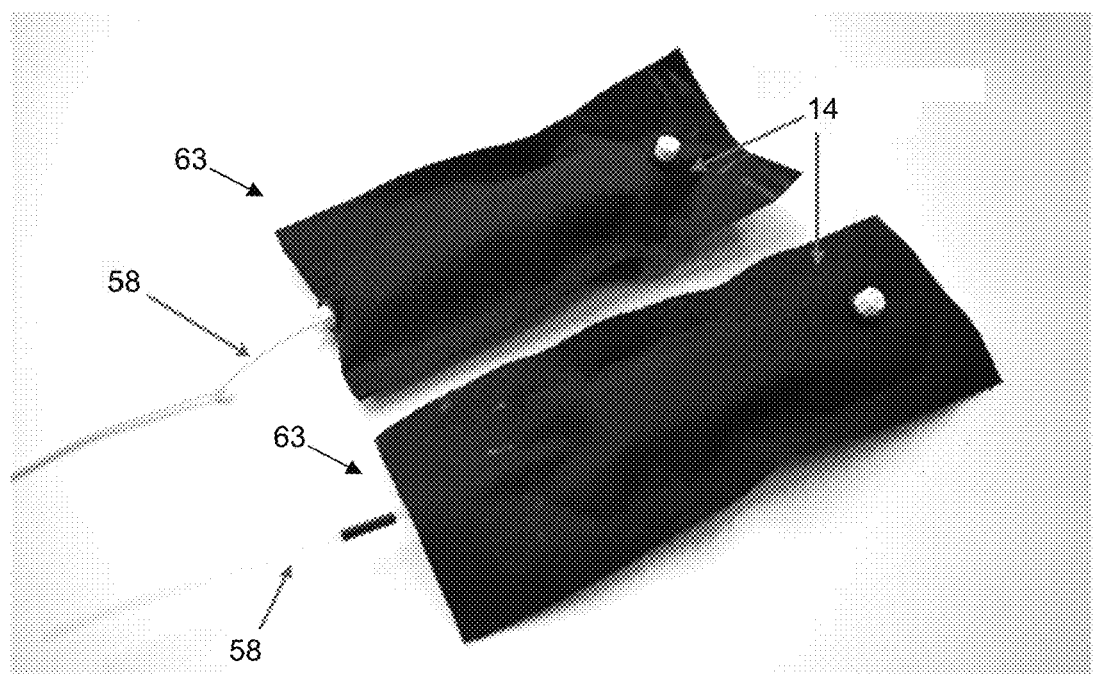

FIG. 79 include a photographic image of linear tension pistons 63 with soft nylon fabric skins 14.

Figure 80:
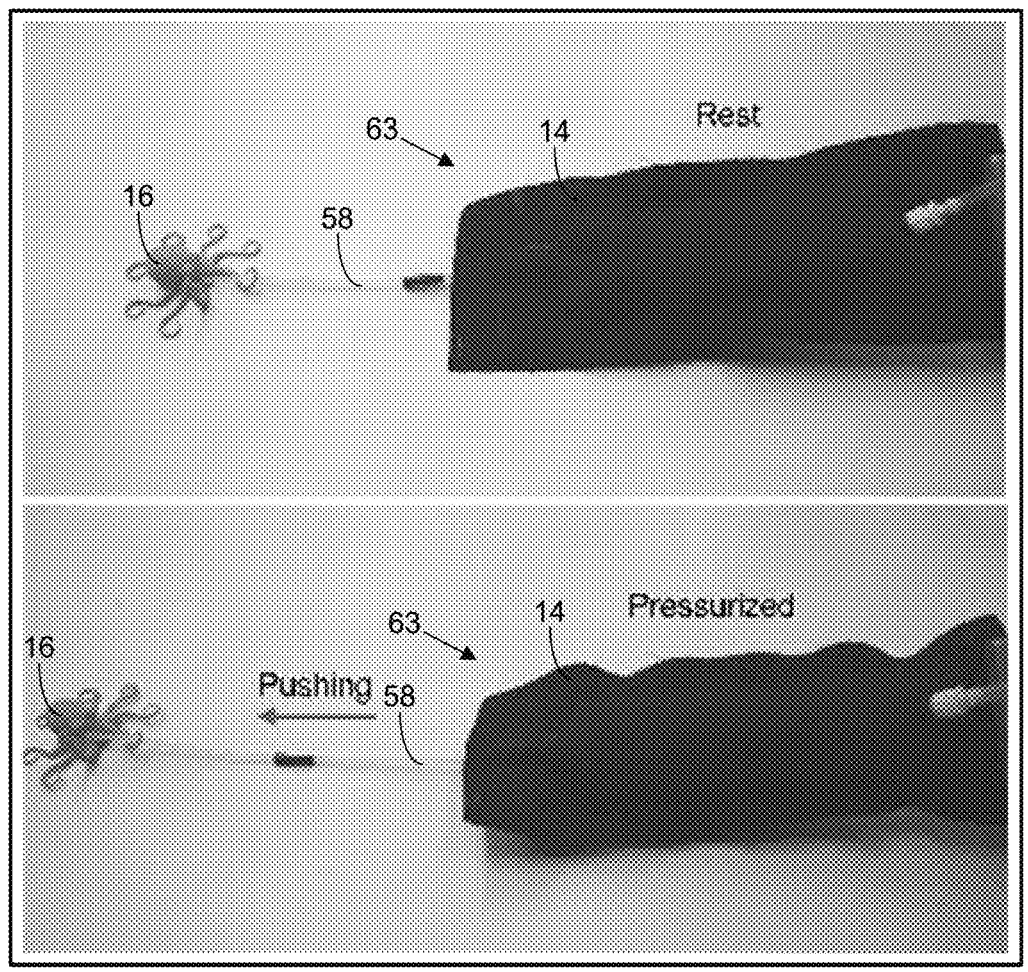

FIG. 80 includes photographic images of one of the linear tension pistons 63 of FIG. 79 at rest (top) and pressurized (bottom) to produce a pushing force.

Figure 81:
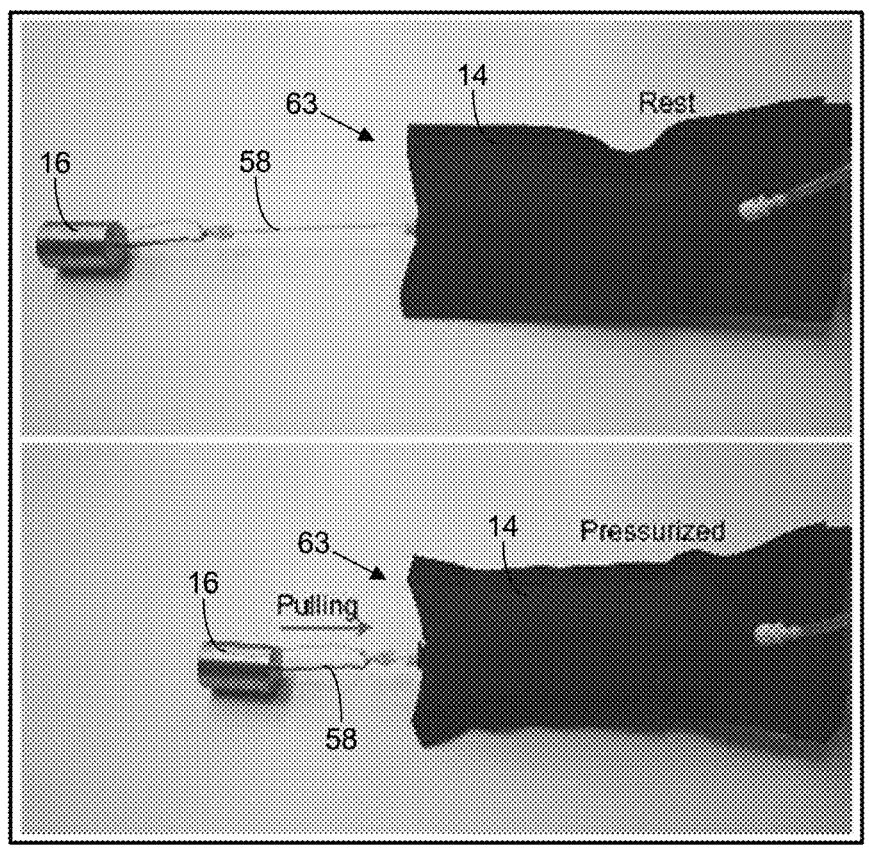

FIG. 81 includes photographic images of the other linear tension piston 63 of FIG. 79 at rest (top) and pressurized (bottom) to produce a pulling force.

Figure 82:
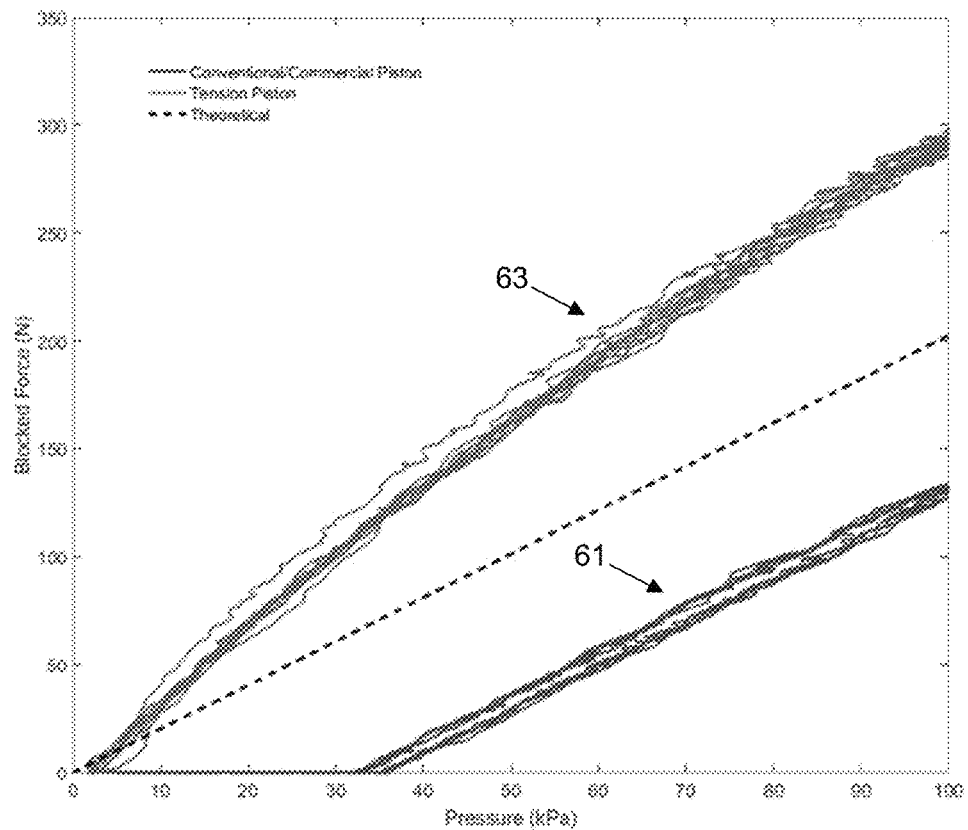

FIG. 82 is a plot providing a blocked-force comparison between a conventional air cylinder piston 61 and a tension piston 63.

Figure 83:
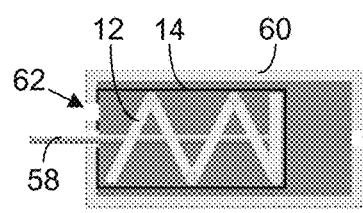

FIG. 83 shows a sectional view of a tension piston system with a hinged structure for the skeleton 12.

Figure 84:
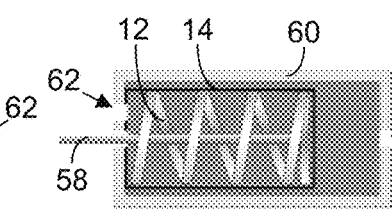

FIG. 84 shows a sectional view of a tension piston system with a spring structure for the skeleton 12.

Figure 85:
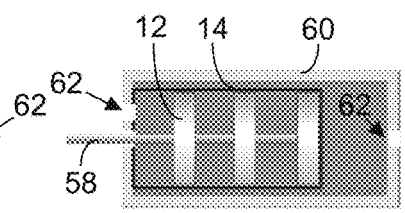

FIG. 85 shows a sectional view of a tension piston system with a parallel structure for the skeleton 12.

Figure 86:
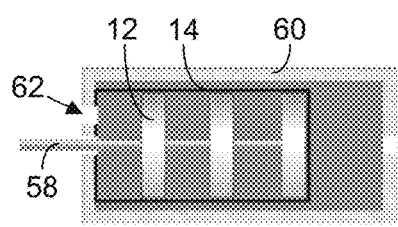

FIG. 86 shows a sectional view of a tension piston system with a connector rod or cable 58 extending inside the skin 14.

Figure 87:
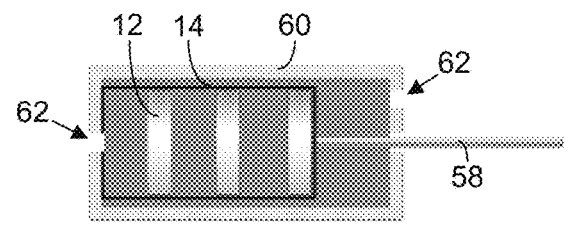

FIG. 87 shows a sectional view of a tension piston system with a connector rod or cable 58 extending outside the skin 14.

Figure 88:
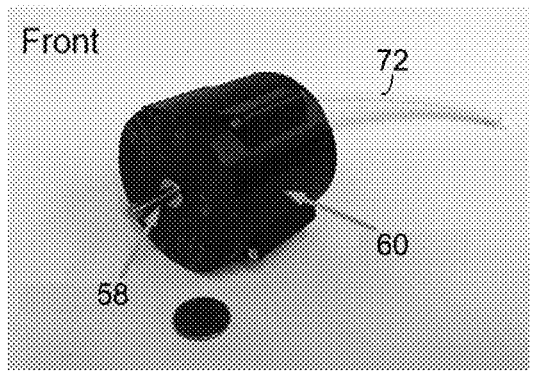

FIG. 88 is a photographic image of a front side view of a rotary tension piston system with a US quarter for scale.

Figure 89:
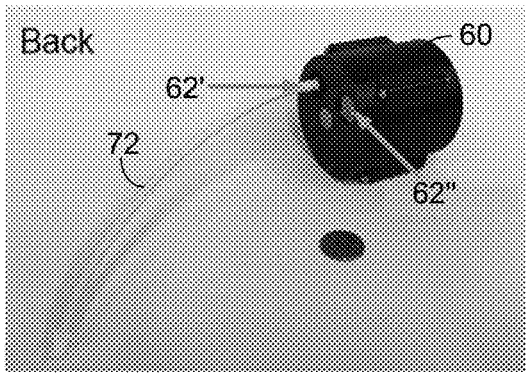

FIG. 89 is a photographic image of a back side view of the rotary tension piston system of FIG. 88.

Figure 90:
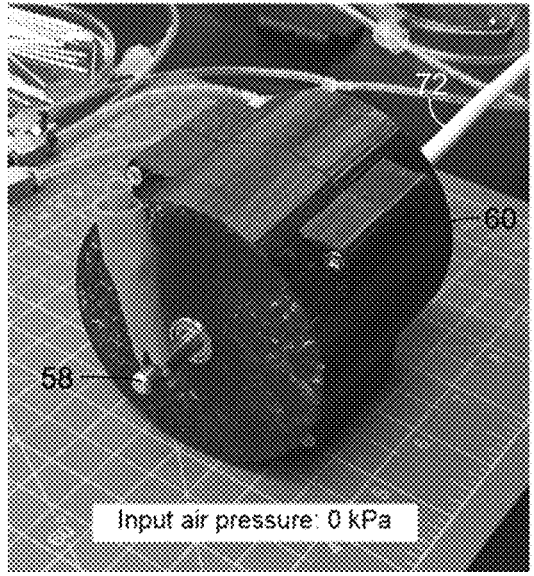

FIG. 90 is a photographic image of the rotary tension piston system of FIGS. 88 and 89 without an input air pressure (unactuated).

Figure 91:
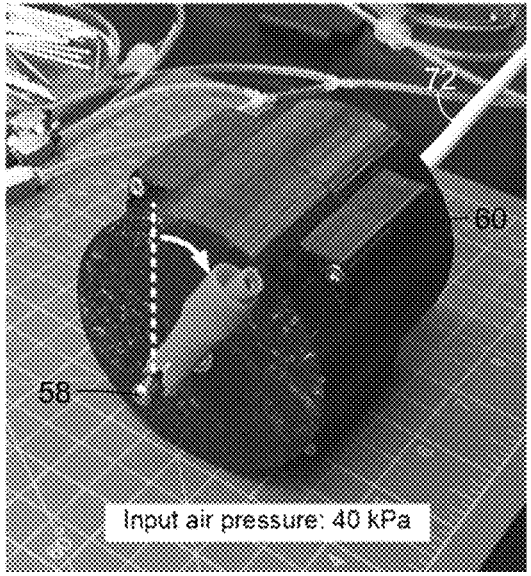

FIG. 91 is a photographic image of the rotary tension piston system of FIGS. 88-90 with an input air pressure of 40 kPa (applied through conduit 72).

In the accompanying drawings, like reference characters refer to the same or similar parts throughout the different views; and apostrophes are used to differentiate multiple instances of the same item or different embodiments of items sharing the same reference numeral. The drawings are not necessarily to scale; instead, an emphasis is placed upon illustrating particular principles in the exemplifications discussed below. For any drawings that include text (words, reference characters, and/or numbers), alternative versions of the drawings without the text are to be understood as being part of this disclosure; and formal replacement drawings without such text may be substituted therefor.

DETAILED DESCRIPTION

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

Unless otherwise herein defined, used or characterized, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially (though not perfectly) pure, as practical and imperfect realities may apply; e.g., the potential presence of at least trace impurities (e.g., at less than 1 or 2%) can be understood as being within the scope of the description. Likewise, if a particular shape is referenced, the shape is intended to include imperfect variations from ideal shapes, e.g., due to manufacturing tolerances. Percentages or concentrations expressed herein can be in terms of weight or volume. Processes, procedures and phenomena described below can occur at ambient pressure (e.g., about 50-120 kPa—for example, about 90-110 kPa) and temperature (e.g., −20 to 50° C.—for example, about 10-35° C.) unless otherwise specified.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments.

Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly.

Further still, in this disclosure, when an element is referred to as being "on," "connected to," "coupled to," "in contact with," etc., another element, it may be directly on, connected to, coupled to, or in contact with the other element or intervening elements may be present unless otherwise specified.

The terminology used herein is for the purpose of describing particular embodiments and is not intended to be limiting of exemplary embodiments. As used herein, singular forms, such as "a" and "an," are intended to include the plural forms as well, unless the context indicates otherwise. Additionally, the terms, "includes," "including," "comprises" and "comprising," specify the presence of the stated elements or steps but do not preclude the presence or addition of one or more other elements or steps.

Additionally, the various components identified herein can be provided in an assembled and finished form; or some or all of the components can be packaged together and marketed as a kit with instructions (e.g., in written, video or audio form) for assembly and/or modification by a customer to produce a finished product.

Described, below, and illustrated in the Drawings is an architecture for fluid-driven, programmable, multi-scale artificial muscles. The architecture may include no more than a collapsible skeleton, a flexible skin, and a fluid medium. A mechanical model is developed to explain the interaction of the three components. A fabrication method is introduced to rapidly manufacture low-cost artificial muscles using various materials and at multiple scales. The artificial muscles can be programmed to achieve multi-axial motions including, but not limited to, contraction, bending, and torsion. These motions can be aggregated into systems with multiple degrees of freedom, which are able to produce controllable sequential motions. Experiments reveal that these muscles can contract over 90% of their initial length, generate stresses of approximately 600 kPa, produce peak power densities over 2 kW/kg, and achieve efficiencies of 59%—all equal to, or in excess of, natural muscle.

This new architecture allows for the mechanical programming of artificial muscles with multi-axial complex motions as well as controllable sequential motions. These artificial muscles can be fast, powerful, and energy efficient, and they can be fabricated at multiple scales using a variety of materials at very low costs.

Principle of Operation

Figure 3:
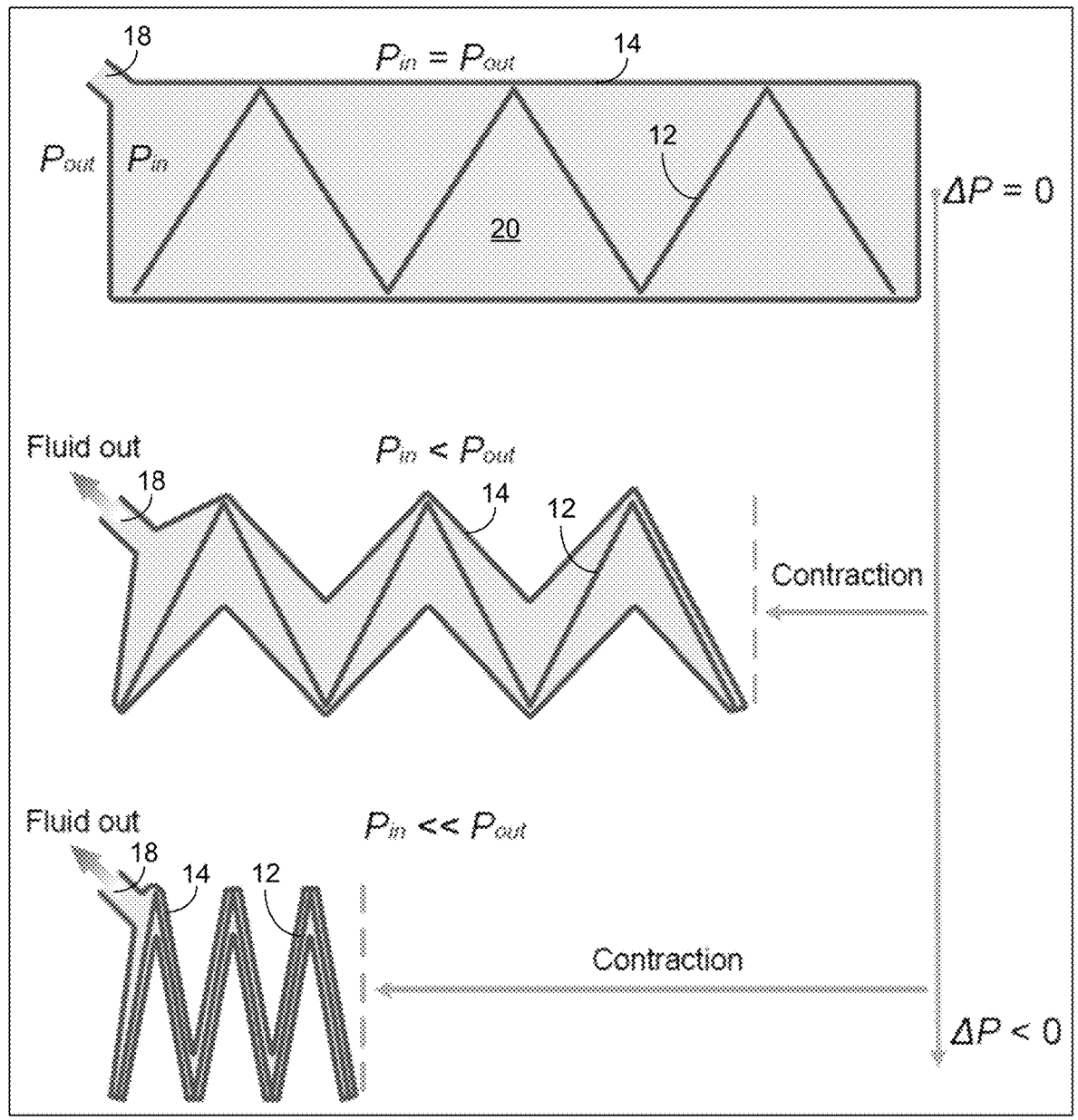
FIG. 3 shows a principle operation of the actuators 10. Contraction is mainly driven by the tension force of the skin 14. This force is produced by the pressure difference between the internal and the external fluids. Removing fluid from the actuator 10 to an external environment (i.e., outside the volume 20 contained within the sleeve) via a port 18 (at upper left) will temporarily decrease the internal pressure; alternatively, pressure can be increased or decreased in the fluid (e.g., air or liquid water) to create the pressure differential inside and outside the sealed volume 20.

The artificial muscle (actuator) system includes the following three fundamental components: a collapsible, solid skeletal structure; a flexible, fluid-tight skin; and a fluid medium. In particular embodiments, the skin is sealed as a bag covering the internal components. The fluid medium fills the internal space between the skeleton and the skin. In the initial equilibrium state, the pressures of the internal fluid and the external fluid are equal. However, as the volume of the internal fluid is changed, a new equilibrium is achieved. A pressure difference between the internal and external fluids induces tension in the flexible skin. This tension acts on the skeleton, driving a transformation that is regulated by its structural geometry, as shown in FIG. 3.

Modeling and Validation

A simplified mechanical model has been developed to predict the force production of the artificial muscle. In this model, a linear zigzag actuator can be abstracted as a chain of triangular-cylinder-shaped units. Each of these units can be modeled as two hinged rigid beams with an initial opening angle, $2\theta$, and the hinge can be modeled as two cantilever springs (see FIG. 21). As used herein, the term, "hinge," can also refer to a flexure that bends/pivots over an arc rather than strictly pivoting about an axis, as is the case with an "ideal" hinge. For the artificial muscles with parallel skeleton walls, each structural void can be modeled as two parallel plates connected by a compression spring (see FIG. 22). This modeling method can be used to describe our artificial muscles with other skeleton structures. In addition, the skin of each artificial muscle unit is modeled as a mass-less, flexible, and non-stretchable membrane between two beams, forming a void. This membrane's geometry can be approximated as a parabolic arc, and the skin's elongation and bending deformation are both neglected in this model. If the internal pressure, $P_{in}$, is lower than the external pressure $P_{out}$ (a negative pressure difference, $\Delta P<0$), the membrane deforms inwards towards the void. Under tension, the void will be driven to contract.

In this study, the focus is primarily on negative-pressure-driven artificial muscles due to their large contracting ratios and ease of fabrication. The membrane's tension force, T, is produced by the pressure difference, $\Delta P$. This force is estimated based on the Laplace Law as $T=\Delta P \cdot R \cdot W$, where R is the radius of curvature of the membrane, and where W is the width of the void. Based on our model, the void's force-contraction interaction can be predicted using the principle of virtual work. The details for the theoretical modeling and the experimental validations are described, below.

For the blocked force estimation on a zigzag actuator, we used a force balancing method to describe the static forces at equilibrium. As written in equation (1), the output force, $F_{output}$, equals the sum of the horizontal tension forces, $T_x$, from the skin and the pushing force, $F_p$, applied on the cross-section area of the actuator when there is a pressure difference, $\Delta P$, between the inside and outside fluids of the muscle.

$$F_{output}=2T_x+F_p \qquad (1)$$

The force, $F_p$, in this model can be calculated as follows:

$$F_p=\Delta P \cdot \Delta A = \Delta PHW, \qquad (2)$$

where A is the actuator's cross-section area, and where W and H represent the width and height of the actuator, respectively. The force, $T_x$, is the horizontal part of the skin's tension force, T; and it can be calculated as follows:

$$T_x=T\cos\beta \qquad (3)$$

The tension force, T, can be estimated based on the Laplace Law as follows:

$$T=\Delta P \times R \times W; \qquad (4)$$

and its angle to the horizontal direction, $\beta$, is:

$$\beta=\cos^{-1}\left(\frac{L}{R}\right), \qquad (5)$$

where R is the radius of curvature of the skin at the contact point, O. Using a parabolic curve to approximate the skin's curve, R, can be estimated as follows:

$$R = \frac{\left(1+\left(\frac{4h}{c}\right)^2\right)^{\frac{3}{2}}}{\frac{8h}{c^2}} = \frac{L^2\left(1+\left(\frac{2h}{L}\right)^2\right)^{\frac{3}{2}}}{2h}. \tag{6}$$

In this equation, c is the chord length of the parabolic curve at the void's top (c=2L), and h is the distance from the parabola's vertex to the void's top frame. Based on the experimental measurement of h and a given vacuum pressure, $\Delta P$, the output blocked force can be estimated.

To estimate the force-contraction relation, we built a model based on the principle of virtual work. The output force is a function of the hinge's angle at a constant pressure difference, $\Delta P$, and it can be written as follows:

$$F(\theta) \times 2\delta L(\theta) = -\Delta P \times \delta V(\theta); \tag{7}$$

$$F(\theta) = -\frac{\Delta P}{2}\left(\frac{\delta V(\theta)/\delta \theta}{\delta L(\theta)/\delta \theta}\right), \tag{8}$$

where $\delta L$ and $\delta T$ represent the small virtual changes of the unit void's opening length and the internal fluid's volume, respectively. L is a function of $\theta$, and it can be written as follows:

$$L(\theta) = D\sin\theta; \tag{9}$$

$$\frac{\delta L(\theta)}{\delta \theta} = D\cos\theta, \tag{10}$$

where D is the wall's length. The internal fluid's volume, V, can be approximated by subtracting a small triangular volume, $V_{triangle}$, from the void's volume, $V_{void}$, as follows:

$$V(\theta) = V_{void} - V_{triangle}; \tag{11}$$

$$V_{void} = W \times A_{void} = WLH = WD^2 \sin\theta\cos\theta; \text{ and} \tag{12}$$

$$V_{triangle} = W \times A_{triangle} = WLh = WD \sin\theta(L_0^2 - (D\sin\theta)^2)^{1/2}, \tag{13}$$

where h is the subtracted triangular portion's height, and where $L_0$ is half the void's opening length. We assume that the skin's total length in one void stays constant during the contraction; then h can be calculated as follows:

$$h = \sqrt{(L_0^2 - L^2)} = (S_0^2 - (D\sin\theta)^2)^{1/2}; \tag{14}$$

$$L_0 = D\sin\theta_0, \tag{15}$$

where $S_0$ represents one half of the arc length from the original parabola approximation and can be estimated as follows:

$$S_0 = \frac{1}{2}\left((L_0^2 + 4h_0^2)^{\frac{1}{2}} + \frac{L_0^2}{2h_0}\sinh^{-1}\left(\frac{2h_0}{L_0}\right)\right), \tag{16}$$

where $h_0$ is the measured depth of the parabolic approximation curve for the skin's initial deformation before contraction. We should note that the skin's length across each void can be estimated based on the void's geometry. However, the estimation accuracy highly depends on the stiffness of the skin material and on the sealing compactness between the skin and the skeleton. The fluid volume can then be written as follows:

$$V(\theta) = WD(D\sin\theta\cos\theta - \sin\theta(S_0^2 - D^2\sin^2\theta)^{1/2}) \tag{17}$$

Letting $\mu = S_0^2 - D^2\sin^2\theta$, we obtain:

$$\frac{\delta V}{\delta \theta} = WD\left(D(\cos^2\theta - \sin^2\theta) - \mu^{\frac{1}{2}}\cos\theta + \mu^{-\frac{1}{2}}D^2\theta\cos\theta\right). \tag{18}$$

Based on equations (10) and (18), we can obtain the following complete expression for equation (8):

$$F(\theta) = -\frac{\Delta PW}{2}\left(\frac{D(\cos^2\theta - \sin^2\theta) - \mu^{\frac{1}{2}}\cos\theta + \mu^{-\frac{1}{2}}D^2\sin^2\theta\cos\theta}{\cos\theta}\right). \tag{19}$$

This force function, $F(\theta)$, should equal zero when the voids are completely closed ($\theta=0$) in practice. However, due to the inaccurate approximation of the fluid volume, this force estimation does not approach zero.

$$F(0) = -\frac{\Delta PW}{2}(D - S_0). \tag{20}$$

To correct this force estimation, we introduced a linear correction term, $\lambda(\theta)$, into the model, as shown in equation (21). The force function, $F(\theta)$, can then be rewritten in equation (22) with the linear correction term, $\lambda(\theta)$.

$$\lambda(\theta) = 1 + \frac{(\theta_0 - \theta)\left(\frac{D}{S_0} - 1\right)}{\theta_0}. \tag{21}$$

$$F(\theta) = -\frac{\Delta PW}{2}\left(\frac{D(\cos^2\theta - \sin^2\theta) - \lambda(\theta)\left(\mu^{\frac{1}{2}}\cos\theta - \mu^{-\frac{1}{2}}D^2\sin^2\theta\cos\theta\right)}{\cos\theta}\right). \tag{22}$$

The skeleton's elastic force, $F_e(\theta)$ can be estimated using a linear cantilever-spring model as follows:

$$F_e(\theta) = k_s\Delta L = k_s(L_0 - D\sin\theta), \tag{23}$$

where $k_s$ is the bending stiffness of the void's walls. Given the skeleton material's tensile modulus, $k_s$ can be calculated by the following equation:

$$k_s = \frac{EWt^3}{4D^3}. \tag{24}$$

The net output force, $F_{output}$, can be estimated using equation (25), and the total contraction, $C(\theta)$, of a linear zigzag actuator with N units can be calculated using equation (26).

$$F_{output}(\theta) = 2(F(\theta) - F_e(\theta)) \tag{25}$$

$$C(\theta) = N \times 2(L_0 - L(\theta)) = 2ND(\sin\theta_0 - \sin\theta) \tag{26}$$

To validate the model prediction, we performed experiments using three linear actuators with zigzag skeletons (see FIG. 25). A laser-based measurement was used to estimate the skin deformation, which is plotted in FIG. 26. As shown in the comparison in FIGS. 27 and 28, our model successfully predicts the blocked force and the force-contraction relationships for the linear zigzag actuators with three different configurations using 30-degree, 60-degree, and 90-degree folds. The maximum prediction errors were approximately 8% for the blocked force, and 12% for the free contraction, respectively. Given this accuracy of prediction, this model can be used to design the artificial muscles with desired outputs.

Fabrication Method

Three-Step Fabrication

Figure 4:
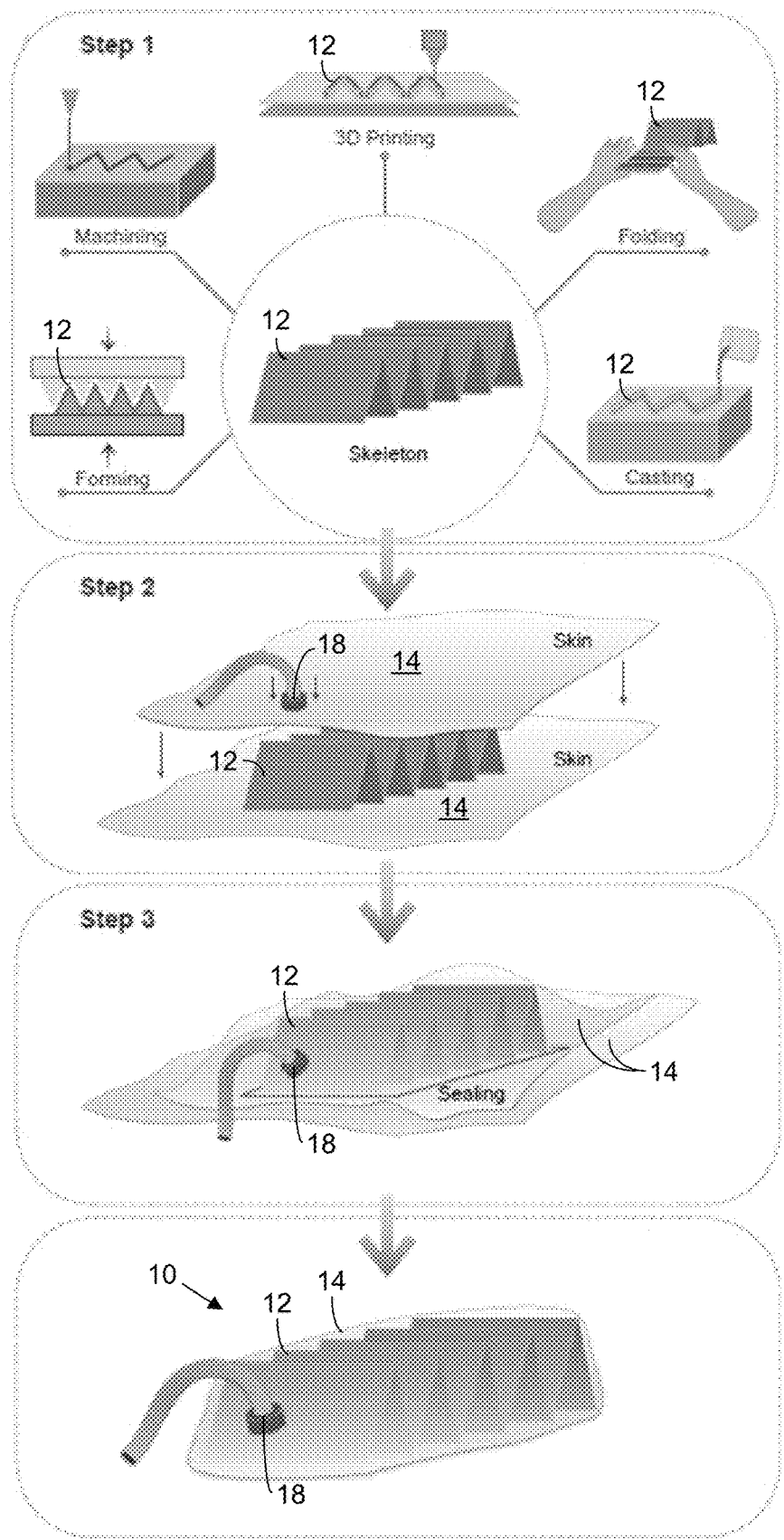
FIG. 4 shows a fabrication process for the actuators 10. A standard actuator 10 can be quickly fabricated in the following three simple steps: (1) skeleton 12 construction using any of a number of techniques, (2) skin 14 preparation, and (3) fluid-tight sealing.
Figure 5:
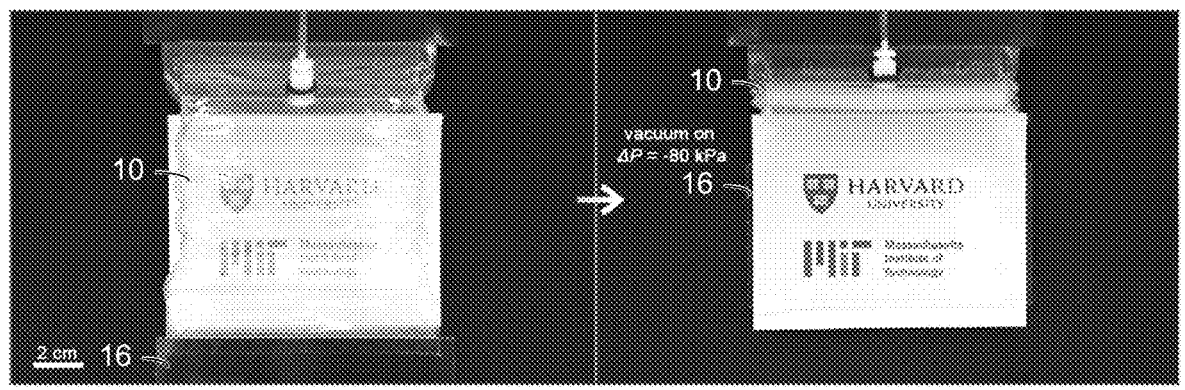
FIG. 5 illustrates a transparent zigzag actuator 10 lifting a clear acrylic plate as the load 16. The skeleton material in this embodiment is a 0.254-mm-thick (along its shortest dimension) transparent polyester sheet fabricated via laser cutting and manual folding, and the skin material is a 0.102-mm-thick transparent polyvinyl chloride (PVC) film (vinyl). The driving fluid is air in this embodiment.
Figure 6:
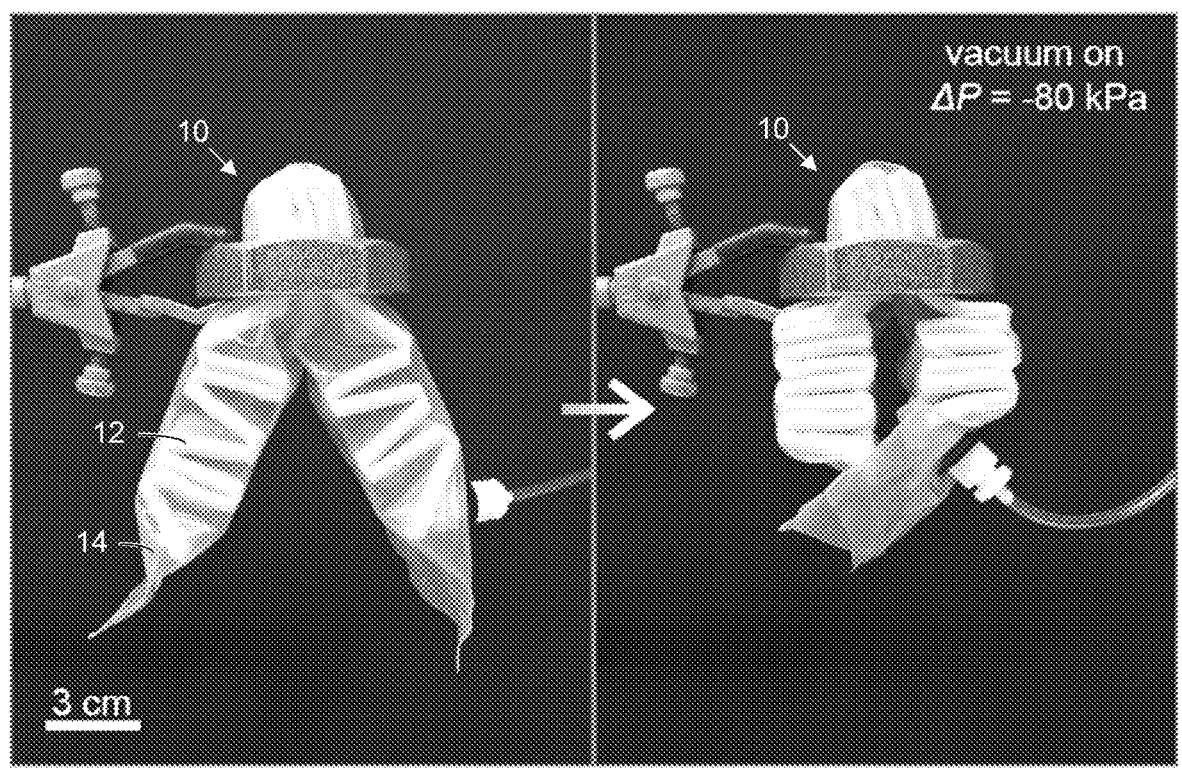
FIG. 6 illustrates a zigzag soft linear actuator 10 contracting well, even when it is confined into a metal screw nut. The material of the skeleton 12 in this embodiment is silicone rubber (M4601) fabricated via casting, and the material of the skin 14 is a 0.318-mm-thick TPU film. The driving fluid is air in this embodiment.
Figure 7:
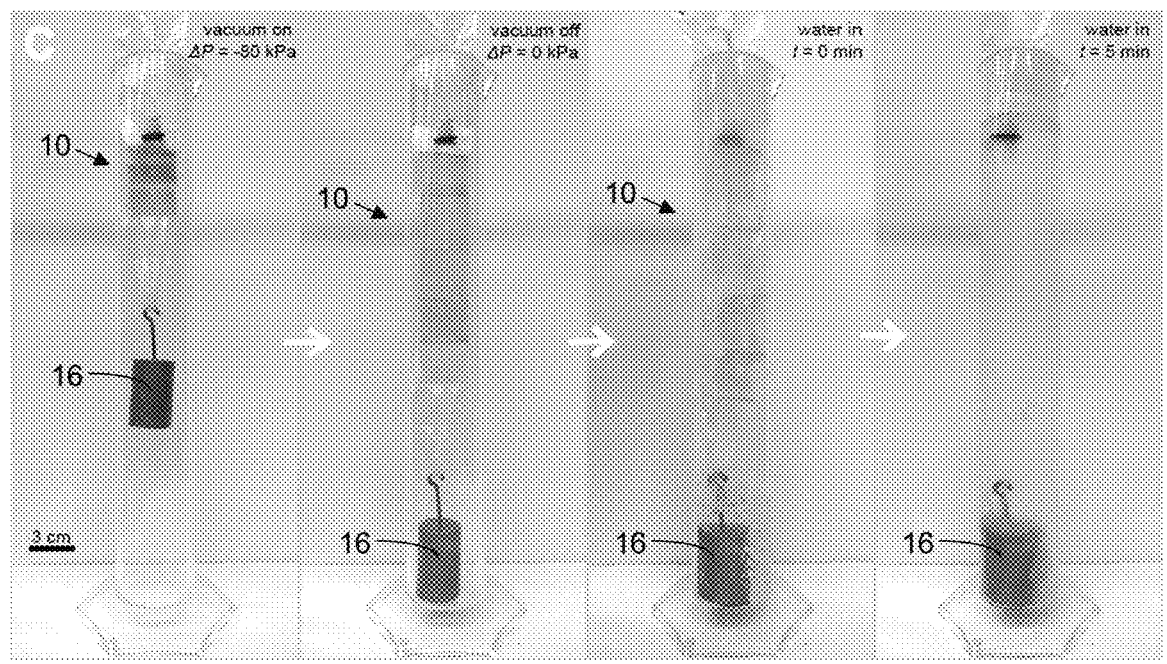
FIG. 7 illustrates a vacuum-driven, water-soluble, linear zigzag actuator 10 dissolved in hot water (≈70° C.) within 5 minutes. The skeleton material in this embodiment is polyvinyl acetate (PVA) fabricated via 3D printing, and the skin material is 0.025-mm-thick polyvinyl acetate (PVA) film. The driving fluid is air in this embodiment.
Figure 8:
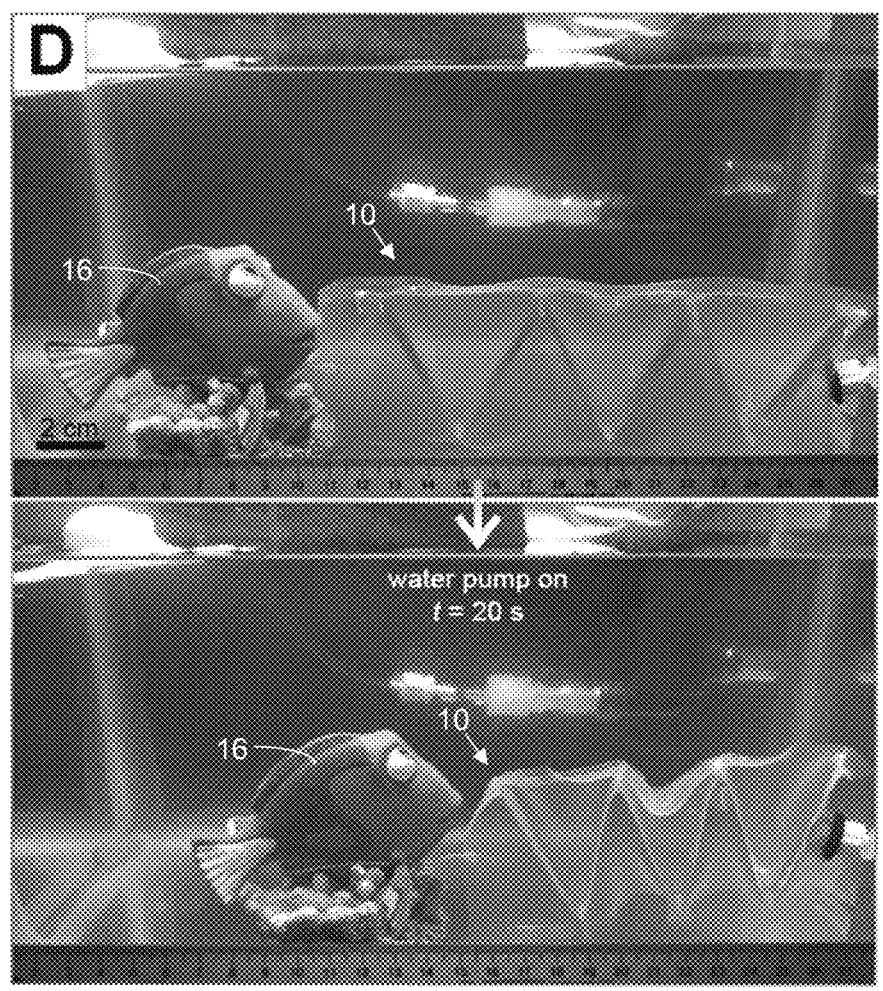
FIG. 8 illustrates a water-pump-driven, hydraulic, linear zigzag actuator 10 pulling an underwater object 16 for 3.5 cm in 20 seconds. The skeleton material in this embodiment is 0.254-mm-thick stainless steel (316) fabricated via manual forming, and the skin material is 0.318-mm-thick TPU film. The driving fluid is water in this embodiment.

As shown in FIG. 4, fabrication of the proposed artificial muscles 10 can follow the following three basic steps: (1) construction of a deformable skeletal structure 12, (2) preparation of an outer skin 14, and then (3) assembly and sealing. The skeleton 12 can be a spring, an origami-like folded structure, or any solid structure with hinged or elastic voids. To construct the skeleton 12 with a given design, a number of different fabrication techniques can be used, such as 3D printing, machining, molding, forming, and even manual folding. Once the skeleton 12 and skin 14 are prepared, the skeleton 12 is enclosed by sealing the skin 14. The sealing process is dictated by the skin material and can include heat pressing, gluing, welding, zippering, and/or sewing. It should be noted that if a positive pressure is used to drive the artificial muscle 10, then the skin 12 is fixed at specific locations on the skeleton 12 to produce tension to deform the skeleton 12 (see FIGS. 29 and 30). For the negative pressure case, the skin-skeleton fixation step is not necessary, as the skin 14 will be tightly confined onto the skeleton's surface.

Material Selection and Design Rules

For the Skeleton

Using this fabrication method, a wide variety of materials can be used to construct artificial muscles for particular applications, deformation patterns, and force-displacement requirements (e.g., as seen in FIGS. 5-8). The material used for constructing the skeleton 12 advantageously has a certain rigidity to support the axial compressive force from the skin tension. Although an artificial muscle 10 can still work even after its skeleton 12 is buckled, the contraction ratio and force production will be substantially reduced. Experiments were conducted with two vacuum-driven muscles 10 with different wall thicknesses of their skeletons 12 (1 mm and 3 mm, respectively, as shown in FIG. 32). A 20% reduction in blocked force and a 50% decrease in free contraction were observed after the thinner skeleton 12' was buckled at −70 kPa (see FIGS. 33-36). For the case of discrete folds, the skeleton's hinges are compliant to allow the desired structural transformation. For repeatable actuation, designing the skeleton 12 to have sufficiently elasticity also enables the skeleton 12 to return back to its initial configuration after each actuation. To enhance fluid circulation and to avoid jamming, the skeleton 12 can be provided with several channels for fluid flow through its structure.

For the skeleton design and fabrication, two common failures are wall buckling and skeleton sliding. To characterize the performance of the actuator with a buckled skeleton 12, we fabricated two linear actuators 10 with different wall thicknesses for comparison. The skins 14 were made of the same nylon fabric sheet (thickness: 0.34 mm), and the skeletons 12 were 3D-printed using the same zigzag pattern (45 degree angle for each fold). However, the wall thickness of a thicker actuator 12" is 3 mm, and the wall thickness of a thinner actuator 12' is only 1 mm, as shown in FIG. 32. According to Euler's critical load formula for buckling, the 1-mm-thick skeleton 12' has a lower critical compressive force than the 3-mm-thick skeleton 12" for the skeleton buckling. In these experiments, the actuator 10 with the thinner skeleton 12' buckled when the internal pressure was reduced lower than −40 kPa, whereas the actuator 10 with the thicker skeleton 12" performed normally without buckling (as seen in FIGS. 33 and 34).

As can be seen in FIG. 35, once the actuator's skeleton 12' buckled, its blocked force increased more slowly than the unbuckled actuator, as the internal pressure decreased from −40 kPa to −70 kPa. The buckled actuator produced a peak force of approximately 80 N at −70 kPa—20% less than the force produced by the unbuckled actuator at the same pressure. The maximum hysteresis of the buckled actuator increased to 10 kPa, twice that of the unbuckled actuator. This reduced performance can be attributed to the dramatically changed structural geometry and the input energy lost to the elastic deformation of the buckled skeleton 12'. From FIG. 36, we also observed a more than 50% decrease in the contraction of the buckled actuator compared to the unbuckled actuator at the same driving pressure (−70 kPa) mainly due to the incomplete folding contraction of the buckled skeleton 12'. In order to prevent skeleton buckling, the critical load requirement is considered in the skeleton's structural design and material selection.

To investigate the sliding effect on the skeleton 12, we compared two linear zigzag skeleton performances. As shown in FIG. 37, these two zigzag-shaped skeletons 12 are made of 3D-printed nylon. One actuator (including skeleton 12') has nine identical voids (60-degree angle for each void), the other actuator (including skeleton 12") has two sizes of the voids (three 30-degree voids and six 60-degree voids). These unequal voids can cause unequal tension forces, and the contraction speeds will also differ for the unequal voids. The unequal force and contraction will induce sliding motions between the skin 14 and skeleton 12 (see FIGS. 38 and 39). In our experiments, the sliding motion happened on the actuator 10 with the skeleton 12" defining unequal voids, shown in FIG. 39 when the internal pressure decreased to around −10 kPa. As the results show in FIG. 40, the blocked force increased more slowly compared to the actuator with identical skeleton voids. The blocked force approached approximately 85 N (at −70 kPa)—approximately 25% less than the actuator that did not exhibit sliding (115 N at −70 kPa). The maximum hysteresis of the sliding actuator was approximately 15 kPa (i.e., three times greater than the normal level of 5 kPa). In addition, the variation among five trials for the actuator that experienced sliding is much greater than that of the normal actuator. These performance reductions are due to the unexpected compression motion of the skeleton, as well as the energy loss caused by friction in the sliding motion.

Similar to contraction of the buckled actuator, the contraction of the sliding actuator was also significantly reduced from 75 mm to 30 mm (FIG. 41). This large reduction (approximately 60%) of the contraction is due to the incomplete compressive folding of the zigzag skeleton and the motion separation between the skin and the skeleton. There are two solutions for avoiding the undesired sliding motion—first, designing and fabricating the skeleton voids with identical sizes; second, fixing the skin to the skeleton to prevent sliding.

For the Skin

In general, the skin 14 is designed to be resistant to both the fluids inside and outside of the skin 14. However, to demonstrate the flexibility in materials choices for these artificial muscles, a polyvinyl alcohol (PVA)-based actuator 10 can be fully dissolved in hot water (~70° C.) within five minutes (see FIG. 7). Providing the skin 14 with flexibility also allows for easy bending during actuation. An ideal inextensible thin-film material can avoid undesired elongating and bending deformations on the skin 14 when a pressure is applied. Such skin deformations will reduce the system's performance and make the actuation difficult to control. In the comparison shown in FIGS. 42-44, a linear actuator with 0.24-mm-thick thermoplastic polyurethane (TPU)-based skin 14' (tensile modulus: 2.7 MPa) produced approximately 60% less pulling force compared to using an actuator 10 with 0.34-mm-thick nylon fabric skin 14" (tensile modulus: 320 MPa). Sufficient skin tensile strength is maintained in order to effectively transfer the tension force induced by the fluidic pressure. In addition, the skin material is selected to be amenable to a convenient sealing method.

To explore the effect of the skin material selection, we created (a) actuators with a TPU skin 14" (thickness: 0.24 mm, Young's modulus: 2.7 MPa) and actuators with a TPU-coated nylon fabric skin 14' (thickness: 0.34 mm, Young's modulus: 320 MPa). Both actuators 10 incorporated 3D-printed nylon zigzag skeletons 12 (see FIG. 42). As seen in FIG. 43, both the actuators showed approximately linear force-pressure relations. The actuator with the TPU skin 14", however, produced approximately 60% less force compared to the actuator with the nylon-fabric skin 14' at the same pressure difference. This difference in output force reveals that the actuator with the softer skin produces less force than the actuator with the stiffer skin. The primary reason for this force reduction is that the softer skin is elongated more than the stiffer skin at the same level of pressure difference. The skin length over each void becomes longer, and this elongation reduces the radius of curvature at the contact points of each void. As predicted in our model using the parabolic approximation in equations (4) and (6), the generated tension force will be reduced at the contact points of each void as the skin length is increased.

The maximum contractions of the two actuators (with the nylon skin 14' and the TPU skin 14") both approached approximately 60 mm, as shown in FIG. 44. This similarity is due to the same skeleton structures being used in these two actuators, as the maximum contraction range is only determined by the skeleton's geometry if there is no buckling and sliding motion on the skeleton. In addition, we also found that the force contraction curve for the TPU-skin actuator is more linear than that for the nylon-fabric actuator. This difference indicates that using a softer skin can potentially offer a more linear contraction motion compared to using a stiffer skin, despite the reduction in force production.

For the Fluids

The choice of the fluid depends on the working environment and performance requirements. In addition, the fluid medium is selected to be compatible with the materials used in the skeleton 12, skin 14, and sealing process. In our current study, we focus on using the available fluid surrounding the artificial muscle (actuator) 10. In this case, the internal fluid and the external fluid are homogenous, although using a different internal fluid is also possible for this artificial muscle 10. A fluid with low viscosity is ideal for achieving a rapid and energy-efficient actuation. In most contexts, air is the most accessible fluid for making a light-weight artificial muscle; and the surrounding water can be directly used for the actuation fluid in an underwater environment (see FIG. 8).

To demonstrate actuation when driven by two different fluids inside and outside of the skin 14, a load-lifting experiment was carried out, as shown in FIGS. 31 and 33. In a hydraulically driven actuator 10 (driven by a pump 32), a metal compression spring was used as the skeleton 12; and the skin 14 was made of a transparent thermoplastic polyurethane (TPU) film (thickness: 0.24 mm); then, the inside of the skin 14 was fully filled with blue-colored water without air bubbles. In this demonstration, the actuator 10 was vertically clamped to a metal stand, and a 1-kg load 16 was attached to its end. A syringe pump 32 was connected to the actuator via a transparent plastic tube. As shown in FIG. 31, when the water was slowly removed from the actuator 10 ($\Delta V=80$ mL/min.), the attached weight 16 was lifted and the actuator 10 contracted. This demonstration shows that the artificial muscle can still work using water as the internal fluid and air as the external fluid.

Actuator Driven by Pressure

The actuator 10 can also be driven by a positive internal pressure difference. In this case, the skin 14 is fixed on the skeleton 12. This fixation process can be achieved by gluing, bonding, tying, riveting, welding, etc. Once the internal pressure inside the skin 14 becomes higher than the external pressure, the skin 14 will be driven to deform outwards by this pressure difference. The tension force produced on the skin 14 will then actuate the skeleton structure 12 to contract.

As shown in FIG. 29, a linear actuator 10 rests in a flat-strip structure. Its skin 12 is adhered to the joints of a polyester-based unfolded zigzag skeleton. When this actuator 10 is inflated with air using a syringe, the flat skeleton 12 will be driven to fold to a zigzag structure while generating a contraction and a pulling force along its axial direction. We characterized the force-contraction relation on another linear actuator 10 made with stronger materials. In this actuator 10, a nylon fabric skin 14 is zip-tied on a 3D-printed nylon skeleton 12, as shown in the inset images of FIG. 30. This actuator 10 can generate a contraction of approximately 10 mm and produce a pulling force of approximately 70 N at a very low pressure (30 kPa). This kind of actuator 10 has a working principle similar to the one used in pouch motors and Peano muscles; however, using the transformable skeletons 12 offers a greater capacity for programmability of the actuators 10.

Programmable Actuation Motions

Figure 9:
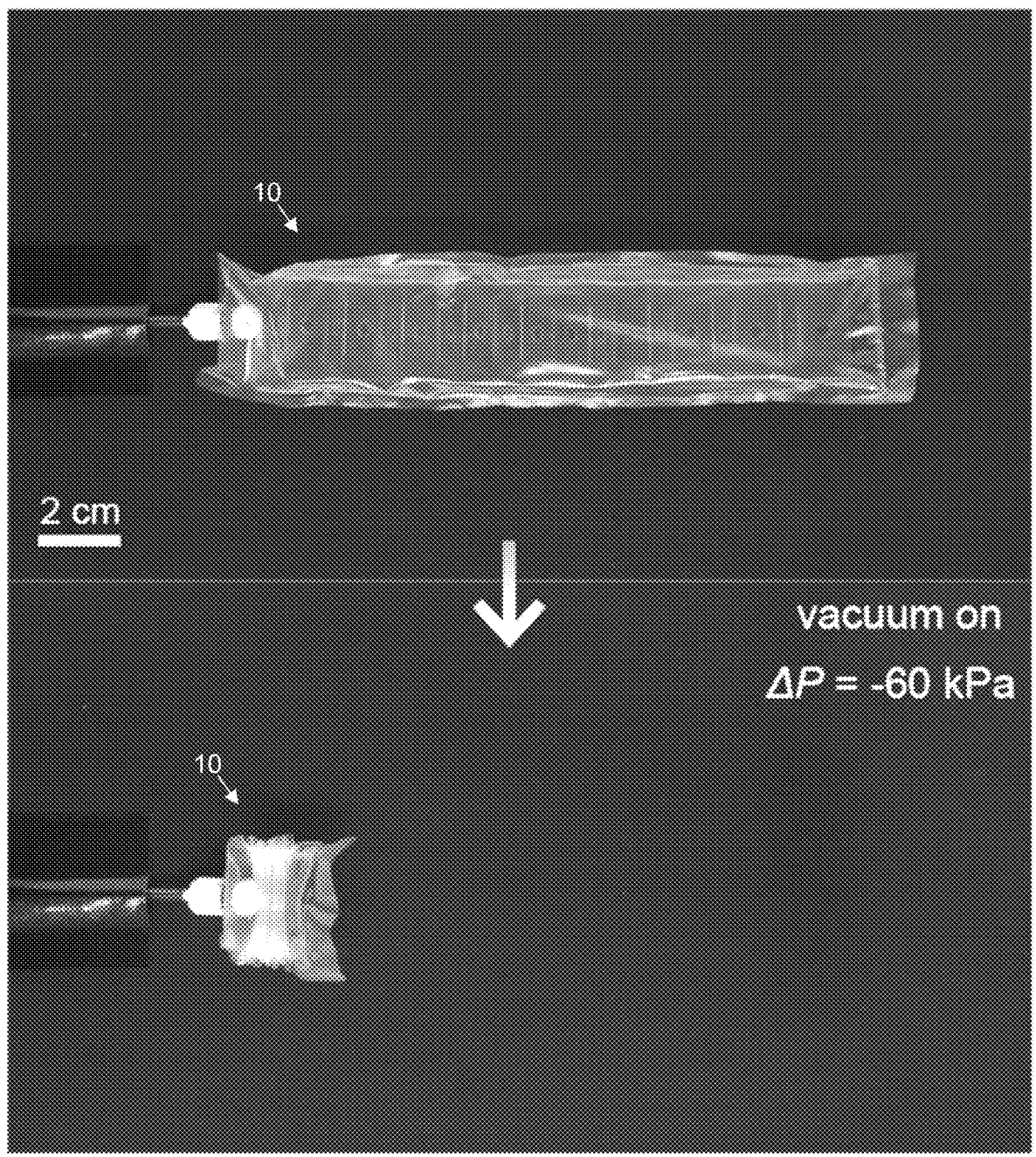
FIG. 9 shows a 19-cm-long linear zigzag actuator 10 contracting to a compressed structure shorter than 2 cm. The one-dimensional (1D) contraction ratio is approximately 90%.

A variety of motions can be achieved by programming the geometry of the skeleton 12. Assuming the fluid pressure is constant everywhere within the skin 12, the skeleton's shape transformation is determined by a combination of the contractions from each individual structural void. Identical voids can be distributed over the skeleton 12 using different arrangements for generating various synchronous contractions. A 90% linear contraction can be produced by an origami skeleton using a symmetrical zigzag geometry (see FIG. 9). A skeleton using a standard Miura-ori origami pattern is able to generate a two-dimensional surface contraction (92%) when a vacuum is applied (see FIG. 10). A three-dimensional skeleton using the water-bomb origami pattern can transform a spherical structure to a cylindrical structure (91% contraction ratio) (see FIG. 11). Using an asymmetrical arrangement of the voids, a bending motion can be produced on a beam-shaped skeleton (see FIG. 12). A flasher origami skeleton can generate a rotation (>90°) and a 54% contraction simultaneously using a single vacuum supply (see FIG. 13).

Figure 14:
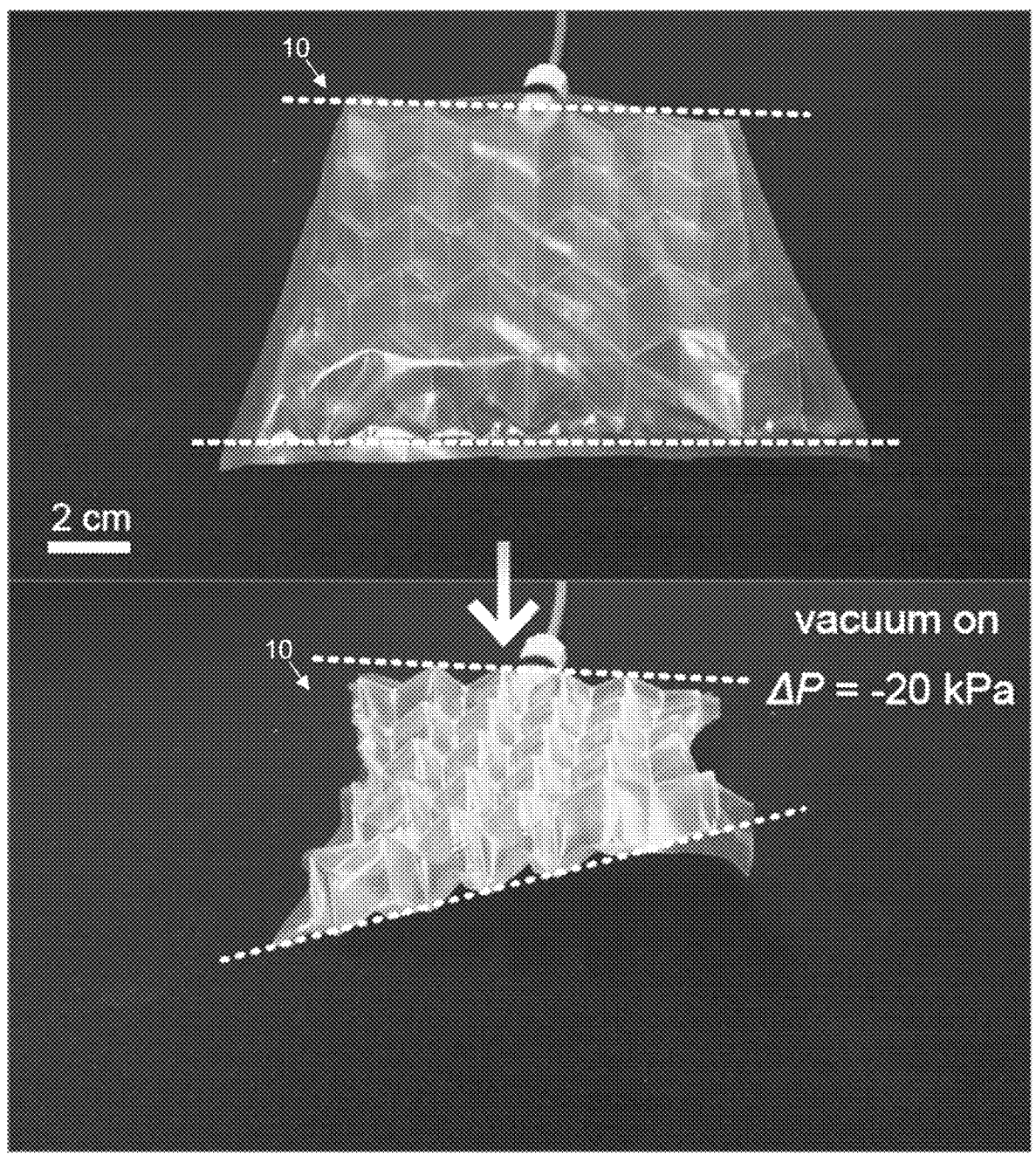
FIG. 14 shows an actuator 10 utilizing complex out-of-plane motion combining torsion and contraction; the actuator 10 can be programmed through a 2D Miura-ori origami pattern with select folds weakened.
Figure 15:
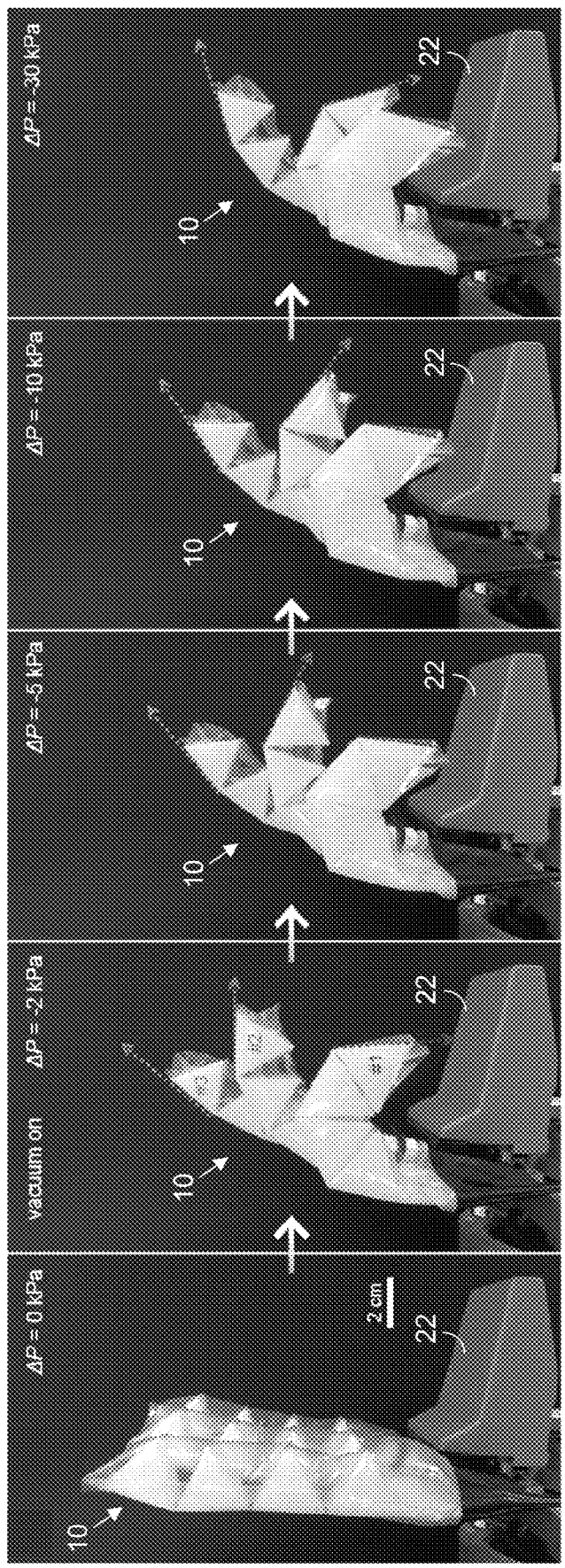
FIG. 15 shows three fingers (each an actuator 10) of a robotic hand that are mounted to a base 22 and sequentially actuated using a single control of the internal fluid (e.g., air) pressure. The skeletal structure of this robotic hand is 3D printed from nylon. Different hinge strengths inside the structural voids are designed for these three fingers, which produce significantly different bending stiffnesses: $k_{s1}$(#1, bottom)<$k_{s2}$(#2, middle)<$k_{s3}$(#3, top). The different hinge strengths can be produced by cutting out different-sized sections from the different hinges (or by varying the thickness at the different hinges), and the bending stiffness of each finger determines its own bending angle at a certain internal pressure level.
Figure 16:
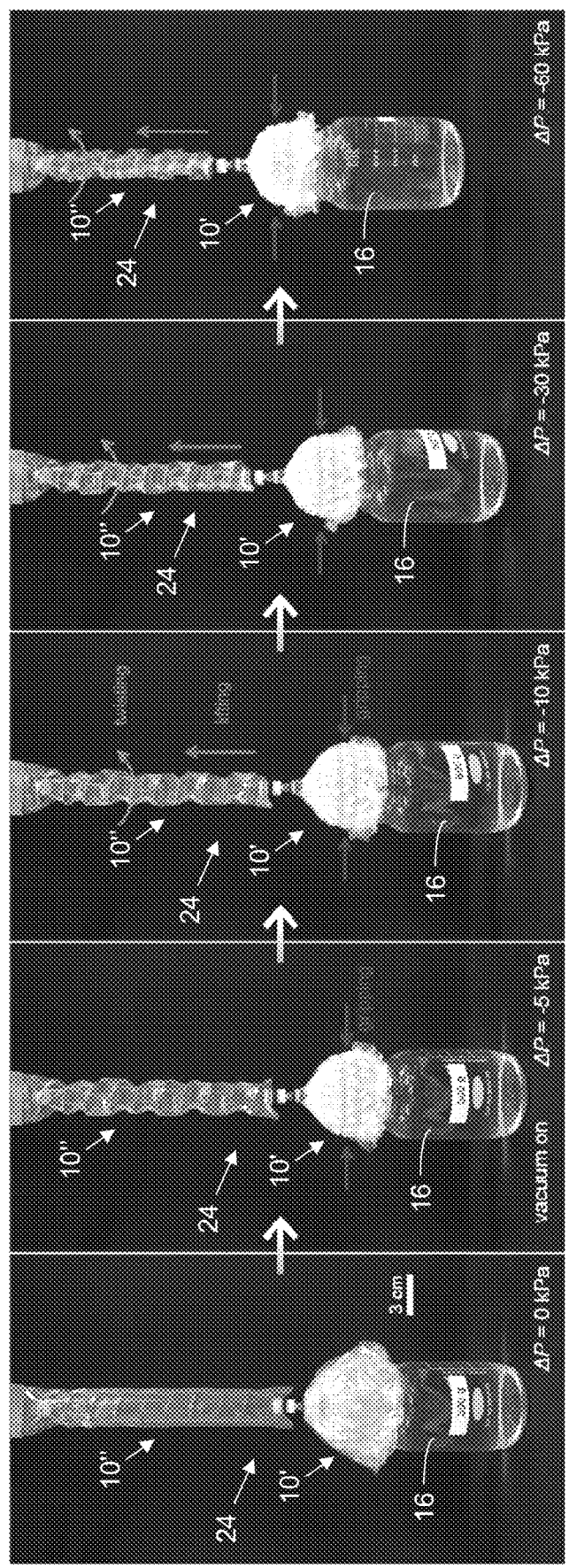
FIG. 16 shows a bottle of water being gripped, lifted, and twisted by a single-channel, vacuum-driven robotic arm 24 comprising a plurality of actuators 10. The robotic arm 12 has a modular structure including a cup-shaped gripper 10' and a cylindrical lifter 10". The gripper 10' uses a polyester "magic-ball" origami structure as its skeleton, while a much stiffer compression spring (formed of 302 stainless steel) is used as the skeleton for the lifter 10". When the internal pressure decreases smoothly, the gripping motion on the load 16 starts first; then, the lifting and twisting motions start later as the internal pressure in the sealed volume is further reduced.

In addition to the programmable arrangement for identical voids, voids with different hinge stiffnesses can also be used to achieve differential contractions. This principle can generate asymmetrical out-of-plane motions. For example, a 2D Miura-ori origami skeleton with some hinges weakened can realize a complex motion that combines both torsion and contraction (see FIG. 14). Furthermore, if the hinge or connection stiffnesses, $k_s$, are significantly distinct, a controllable sequential motion can then be generated by the artificial muscle. For example, three fingers on a robotic hand formed of bending actuators 10 fixed to a base 22 (see FIGS. 15 and 63), with a bending-stiffness ratio of $k_{s1}:k_{s2}:k_{s3} \approx 1:2:3$, can be sequentially actuated using a single pressure control. In a second example, a pneumatic robotic arm including a gripping actuator 10' and a lifting and twisting actuator 10" can first grip an object, then lift and twist the gripped object, as shown in FIGS. 16 and 64-66. This sequential multi-axial manipulation is achieved by a single control pressure. In this case, the plastic skeleton of the gripper 10' (formed of polyester with an elastic modulus ≈5 GPa) is much more compliant than the metal skeleton (formed of 302 stainless steel with an elastic modulus ≈190 GPa) in the arm 10".

Performance Characterization

The performance of a group of linear actuators 10 using simple zigzag skeletons 12 was characterized. As shown in FIGS. 45 and 46, a nylon-fabric skin actuator (skin thickness: 0.34 mm, skeleton dimensions: 120×60×13 mm³) produced a maximum contraction of approximately 65 mm at −70 kPa, which is a contraction ratio of approximately 50%. A repeatable static pulling force of approximately 230 N (at −80 kPa) was also obtained from this actuator. In addition, it is shown that the hysteresis on this actuator is relatively small (5 kPa in FIG. 45). A 30,000-cycle load lifting test was then performed on this actuator. The results 36 following this continuous 50-hour test showed no observable performance reduction in either the blocked force or the contraction compared to the performance results 34 obtained before this test (see FIGS. 45 and 46). A maximum blocked force of approximately 355 N at −80 kPa was obtained from another nylon-fabric skin actuator (skin thickness: 0.56 mm, skeleton dimension: 20×40×14.5 mm³). This force corresponds to an actuation stress of approximately 600 kPa that is roughly six times greater than the sustainable stress of mammalian skeletal muscle (100 kPa).

The energy conversion efficiency and the power density of the artificial muscles were both measured on a miniature zigzag actuator made from polyester sheets. This lightweight actuator—similar in mass to a ping-pong ball—can be easily blown away by a small computer fan. In the power density measurement (see FIG. 20), the 2.6-g actuator can lift a 3-kg object (more than 1,000 times heavier than the actuator itself) within 0.2 seconds using a −80 kPa vacuum. A peak power density of 2.08 kW/kg was obtained during the 2-kg load lifting tests 28, and the peak power densities calculated from the 1-kg load tests 26 and the 3-kg load tests 30 are 1.85 kW/kg and 1.80 kW/kg, respectively. All of these peak power densities are more than six times the peak power density (0.28 kW/kg) of mammalian skeletal muscles. To measure the energy efficiency, we conducted load-lifting experiments with different weights. As shown in Table 2, below, the averaged energy efficiency from the tests approached 23% (1-kg load, pneumatically driven) and 59% (0.5-kg load, hydraulically driven), comparable to natural muscle (40% energy efficiency).

Materials and Methods

Blocked-Force Measurement

The blocked forces were obtained using a universal testing machine (INSTRON 5544A, Instron Corporation of Norwood, Mass., USA). Each sample was preloaded with a 50-N tension force in order to flatten the skin. To ensure a static test condition, the vacuum pressure was manually tuned through a vacuum regulator (Squire-Cogswell vacuum regulator from Ohio Medical of Gurnee, Ill.) with a very slow rotational speed. The pressure difference, $\Delta P$, was increased to −80 kPa, held for 3 seconds, and then decreased back to 0 kPa in each trial. This actuation-return trial was repeated five times on each actuator sample. A vacuum pressure sensor (MPXV4115VC6U, Freescale Semiconductor, Inc., of Austin, Tex., USA) was used to detect the pressure inside of the actuation system. The generated force was recorded at 10 Hz from the INSTRON machine, and the signal from the vacuum sensor was recorded through a data acquisition device (BNC-2111, National Instruments of Austin, Tex., USA).

Force-Contraction Experiment

To obtain the force-contraction relationship for each actuator, a constant vacuum pressure was applied to the actuator. The actuator was allowed to freely contract at a very low constant speed (1 mm/s) until the load decreased to 0 N. Then, the INSTRON machine started to pull the actuator back to its original body length using the same speed in the contraction phase. This contraction-returning test was performed five times for each actuator, and both the contraction and force data were recorded at 10 Hz.

Cycle Test

In the actuation cycle test, a linear zigzag actuator was vertically clamped to a metal stand, and a 1-kg load was attached to it. In each cycle, the actuator was powered for three seconds to lift up the attached load; then the vacuum supply was blocked; and then air was filled into the actuator for another three seconds to release the contraction. This actuation-resting cycle was controlled using a miniature 12-V DC-powered solenoid valve (from Parker Hannifin Corporation of Cleveland, Ohio, USA) with a micro-controller (Arduino Nano, https://www.arduino.cc/), and this process was continuously repeated for 30,000 cycles over 50 hours.

Power Density Calculation

To estimate the actuator's power density, dynamic load-lifting tests were performed. A polyester-based light-weight actuator (mass: $m_a$=2.7 g) was used in these tests. A vacuum (−80 kPa) was directly supplied to the actuator to quickly lift an object with mass $m_{load}$. In each test, the lifting process was recorded using a camera at 60 frames per second; and the lifting height, $h_{load}$, and time, $\Delta t$, were both obtained using an open source image analyzing software (Tracker, http://physlets.org/tracker/). The power density, ρ, was estimated using the following equation:

$$\rho = \frac{W_a}{m_a} = \frac{E_t/\Delta t}{m_a} = \frac{m_{load} \times g \times h_{load}}{m_a \Delta t}, \quad (27)$$

where $W_a$ represents the mechanical power of the load-lifting process, $E_t$ is the final potential energy of the system, and g is the gravitational acceleration. This estimation was repeated five times for each lifting case, and the results were averaged in the table, below.

TABLE 1

Power density

| Load | Average power density | Peak power density |
| --- | --- | --- |
| 1 kg | 1.04 kW/kg | 1.85 kW/kg |
| 2 kg | 1.32 kW/kg | 2.08 kW/kg |
| 3 kg | 1.19 kW/kg | 1.80 kW/kg |

Energy Efficiency Measurement

To measure energy efficiency, the ratio between the input energy, $E_{in}$, and the work done by the system, $E_{out}$, was empirically measured. Water and air were both used as the internal fluids. In each trial, the fluid was slowly removed from the actuator using a syringe pump (PUMP 11 ELITE from Harvard Apparatus of Holliston, Mass., USA) at a constant low speed ($\Delta V_{air}$=80 mL/min, $\Delta V_{water}$=10 mL/min), while the pressure data was recorded. A vacuum sensor (MPXV4115V, Freescale Semiconductor) was used in the pneumatic tests, and a pressure transmitter (G2VAC from Ashcroft Inc. of Stratford, Conn., USA) was used in the hydraulic tests. The output energy was estimated by calculating the potential energy increase of the system. An object with known weight, $m_{load}$, was attached to the bottom of a vertically clamped actuator in each trial. The load-lifting height, $h_{load}$, was measured using Tracker software. The energy efficiency can be written as follows:

$$\eta = \frac{E_{out}}{E_{in}} = \frac{m_{load} \times g \times h_{load}}{P\Delta V} = \frac{m_{load} \times g \times h_{load}}{\Sigma(P_t V_t)}, \quad (28)$$

where g is the gravitational acceleration (9.81 m/s²), and $V_t$ is the volume change during each sampling step (0.1 s). This measurement was repeated five times for each lifting case, and the results were averaged, as shown in Table 2.

TABLE 2

Energy efficiency

| Load | Air-driven | Water-driven |
| --- | --- | --- |
| 200 g | 13.08% | 44.58% |
| 500 g | 20.26% | 59.48% |
| 1,000 g | 22.73% | 51.72% |

Measurement of Skin Deformation

To characterize skin deformation during actuation, the depth of the geometrical vertex of the deformed skin 14 within a void defined by the skeleton 12 (along with the skin 14) was measured at different air-pressure levels. A laser displacement sensor (LK-031 laser head and LK-2001 controller from Keyence Corporation of Osaka, Japan) was used to measure the displacement of the middle region of the local skin 14 within a void. The sensor was vertically fixed on the INSTRON tester with a 25-mm-thick reference distance to the actuator's skin surface. The flat skin surface before actuation (ΔP=0) was chosen as the reference plane for the displacement measurement. A laser beam was pointed perpendicularly to the skin's surface at the center of the void. Three linear zigzag actuators with different folds angles (30°, 60°, and 90°) were used for the skin deformation measurement. For each actuator, we performed the measurement for five loops (including both the actuation and the release processes) using the same setting as was used in the blocked-force experiments; and each actuator's displacement data was averaged over these five loops, as shown in FIG. 26, which plots (a) the vertex depth 50 for the 30°-folds actuator, (b) the vertex depth 52 for the 60°-folds actuator, and (c) the vertex depth 54 for the 90°-folds actuator.

Actuator Fabrication

Different methods and materials were used to fabricate the actuators described herein. The skeletons for the bending actuator, the three-fingered hand, and all the actuators for static characterization were made of nylon materials using a desktop 3D printer (in this case, The Mark One 3D printer from Markforged, Inc., of Cambridge, Mass., USA). Another 3D printer (LulzBot TAZ 5 3D printer from Aleph Objects, Inc., of Loveland, Colo., USA) was used to print the polyvinyl alcohol (PVA)-based skeleton for the water-soluble actuator 10 (shown in FIGS. 7 and 53). A laser cutter (from Universal Laser Systems, Inc., of Scottsdale, Ariz., USA) was also used for fabricating the skeletons. The skeletons for the miniature bio-compatible actuators were manually folded using crease patterns that were laser cut from a polyetheretherketone (PEEK) sheet (thickness: 0.254 mm).

Similarly, all of the skeletons for the contraction, twisting, and gripping demonstrations, as well as the 2.6-g light-weight actuator, were laser cut and manually folded using polyester sheets (a 0.127-mm-thick sheet for the gripper, and a 0.254-mm-thick sheet for the others). The skeletons for the large-scale lifter and the electronics-embedded actuator were both hinged from several laser-cut nylon and acrylic blocks (thickness: 3.175 mm), respectively. A stainless steel (316) shim (thickness: 0.254 mm) was manually formed to a zigzag-shaped skeleton for the underwater actuator. The skeleton of the cylindrical lifter was based on a compression spring made of 302 stainless steel (outside diameter: 22.5 mm, wire diameter: 1.25 mm). The skeleton of the fully soft actuator was cast from a silicone rubber (ELASTOSIL M4601 silicone from Wacker Chemie AG, of Munich, Germany) using 3D-printed molds.

Figure 1:
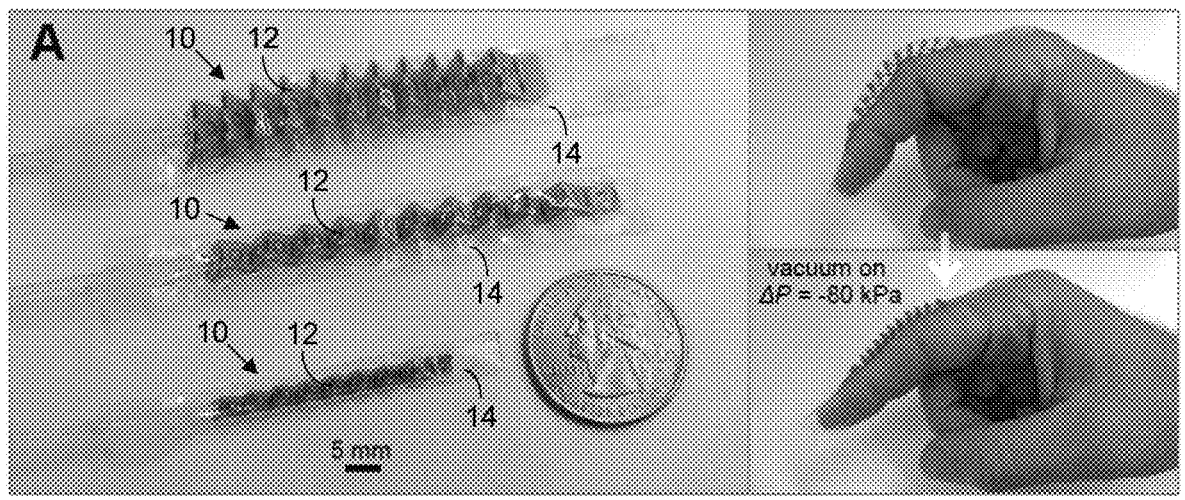
FIG. 1 shows miniature linear actuators 10 using polyether ether ketone (PEEK) zigzag origami structures as the skeletons 12 and PVC films as the skins 14. These biocompatible materials make the actuators 10 suitable for medical and wearable applications.
Figure 2:
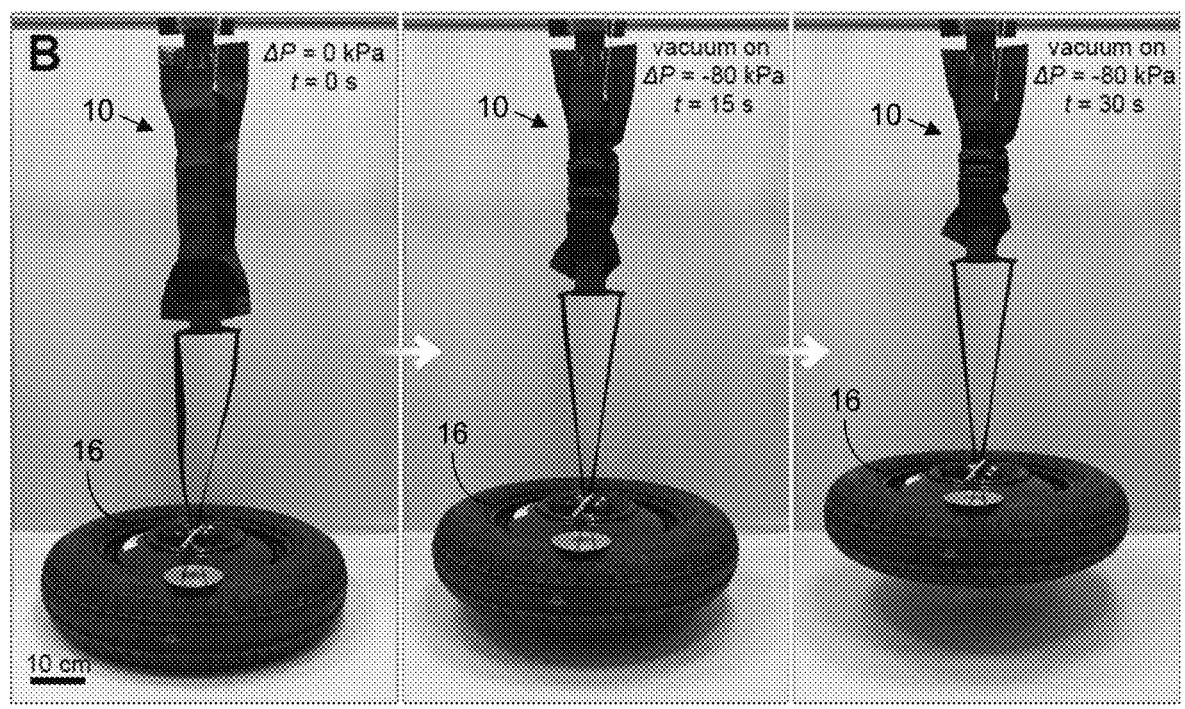
FIG. 2 shows a large-scale, high-power actuator 10 assembled using a zigzag skeleton composed of nylon plates (fold width: 10 cm). The skin is made of nylon fabric coated with thermoplastic urethane (TPU). A car wheel (diameter≈75 cm, weight≈22 kg), used as a load 16, is lifted up to 20 cm within 30 seconds using this actuator.
Figure 10:
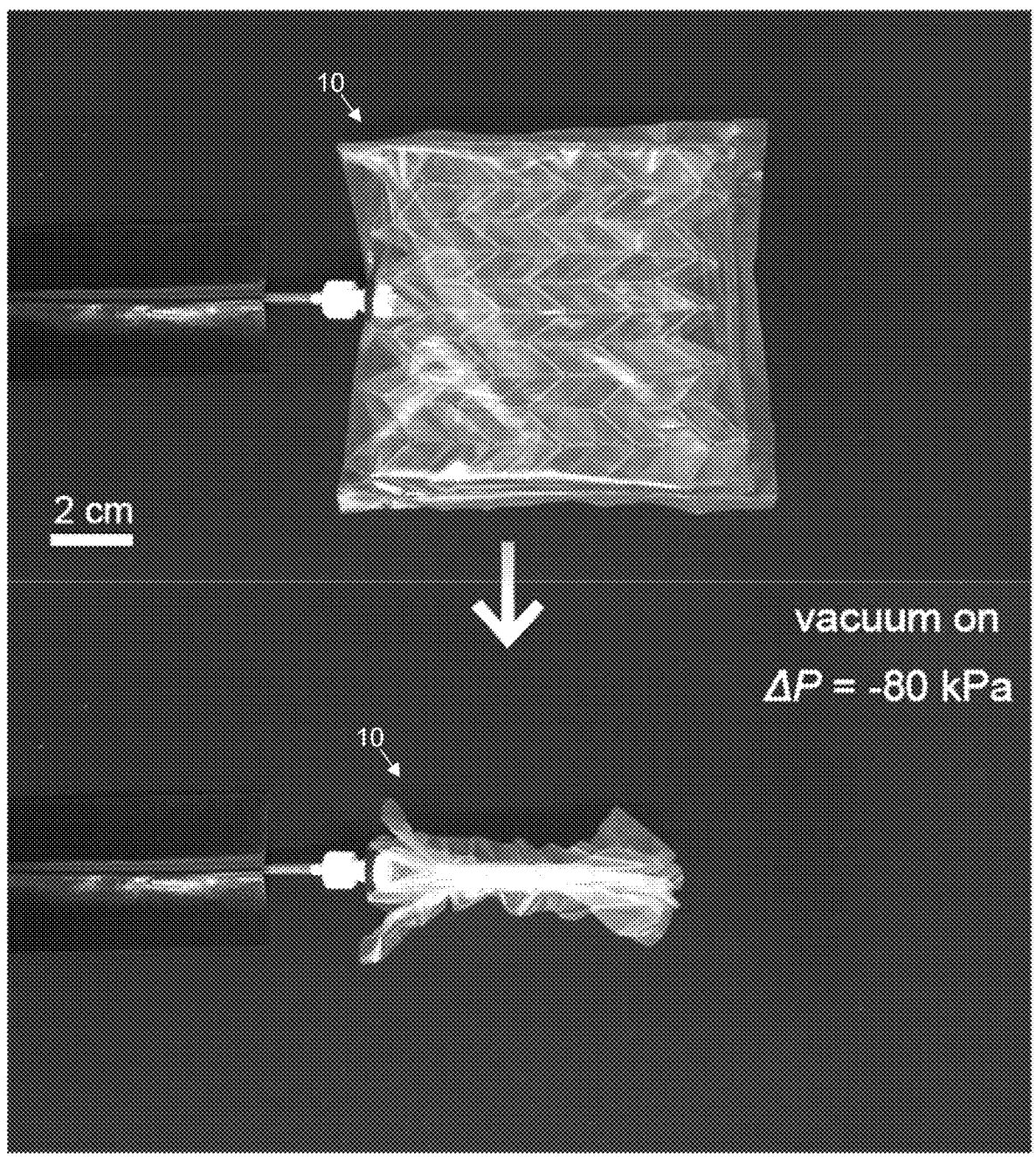
FIG. 10 shows an actuator 10 including a two-dimensional (2D) origami skeleton using Miura-ori patterns (area: 11×10 cm$^2$) that contracts to a dense bar-shaped structure (area: 9×1 cm$^2$). The 2D area contraction ratio approaches 92%.
Figure 11:
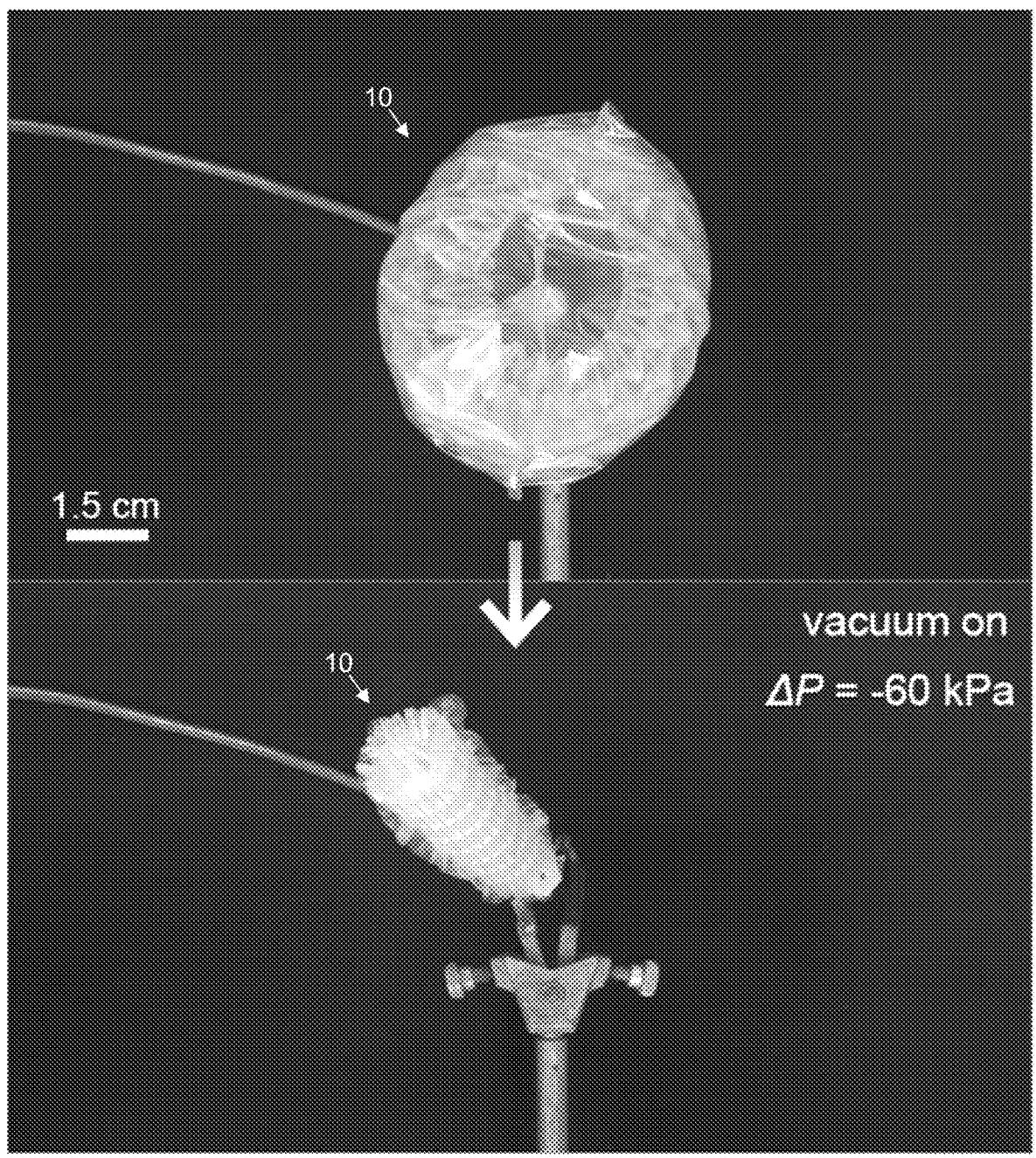
FIG. 11 shows an actuator 10 including a three-dimensional (3D) "magicball" origami structure using the waterbomb pattern (radius: 3.5 cm) contracting to a compacted cylindrical structure (radius: 0.9 cm, height: 6.5 cm). The 3D volume decreases 91% after this contraction.
Figure 12:
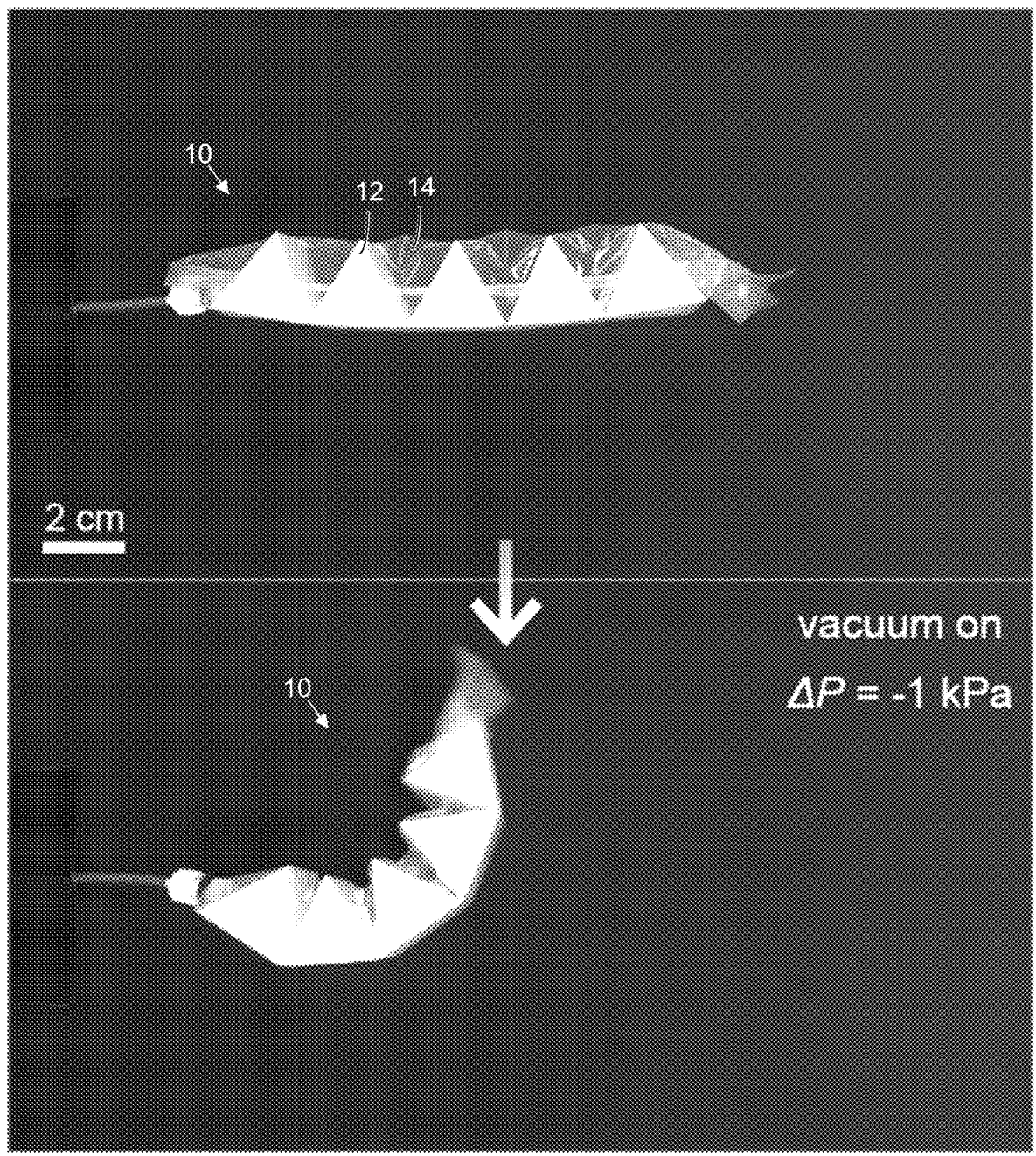
FIG. 12 shows a bending motion achieved by using an actuator 10 including an asymmetrical beam structure as the skeleton.
Figure 13:
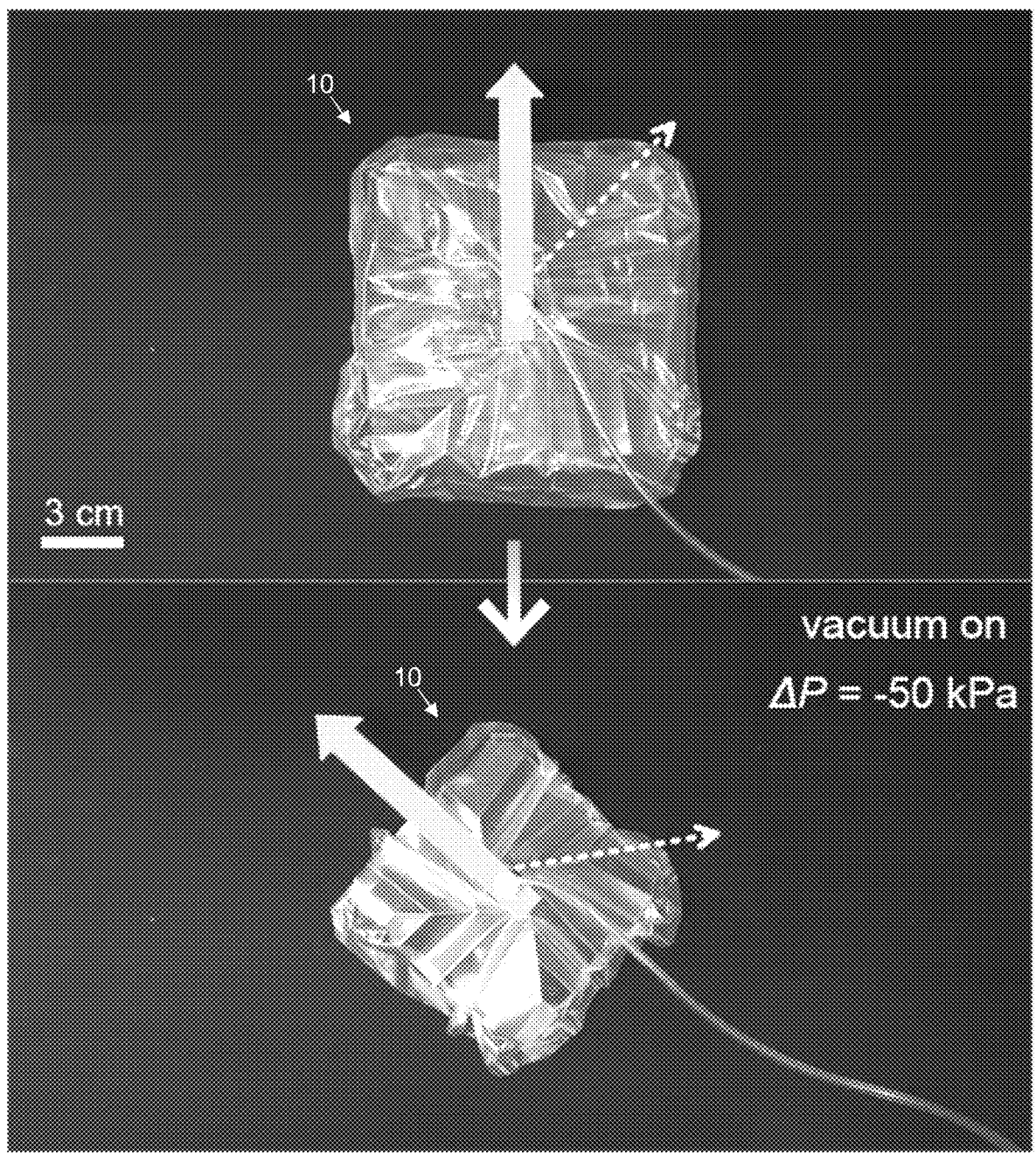
FIG. 13 shows an actuator 10 that uses a flasher origami pattern as the skeleton; the actuator 10 rotates more than 90 degrees around its center, and its 2D surface simultaneously contracts by 54%.
Figure 17:
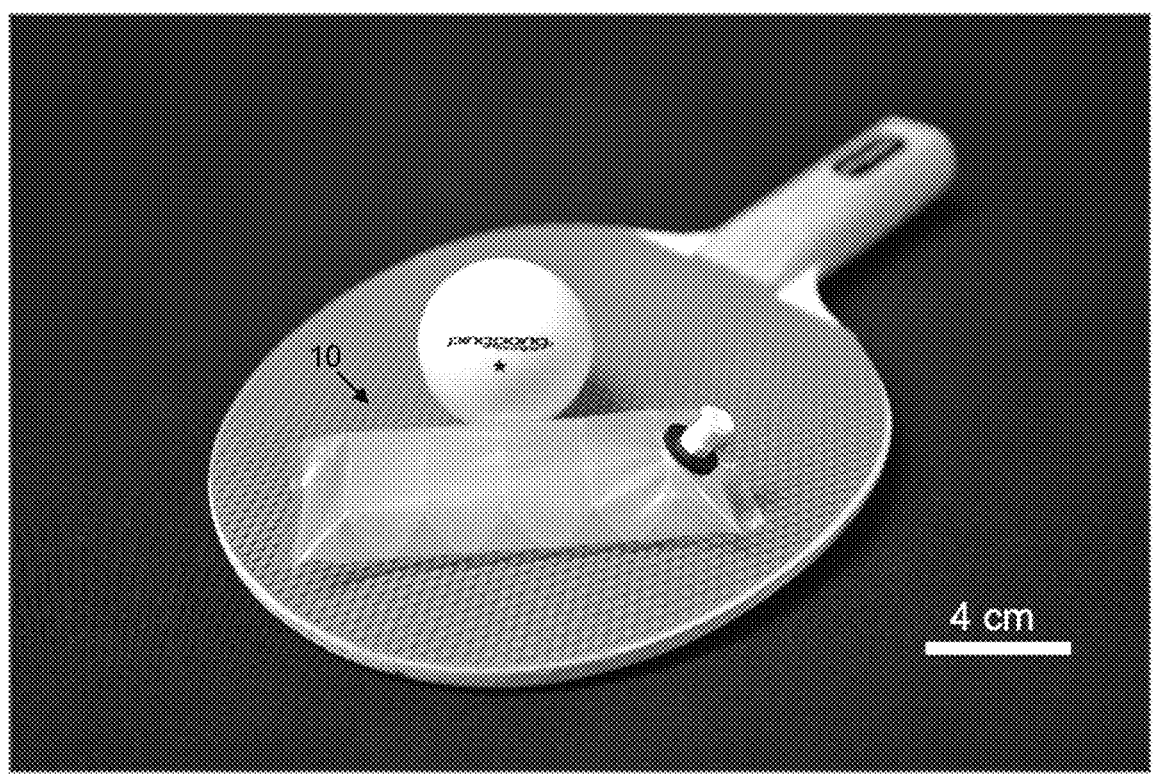
FIG. 17 illustrates a miniature, light-weight linear zigzag actuator 10 (weight≈2.6 g, volume≈32 cm$^3$) and a common ping-pong ball (weight≈2.5 g, volume≈33.5 cm$^3$). This actuator 10 is mainly made of polyester sheets (skeleton thickness: 0.254 mm, skin thickness: 0.038 mm).
Figure 18:
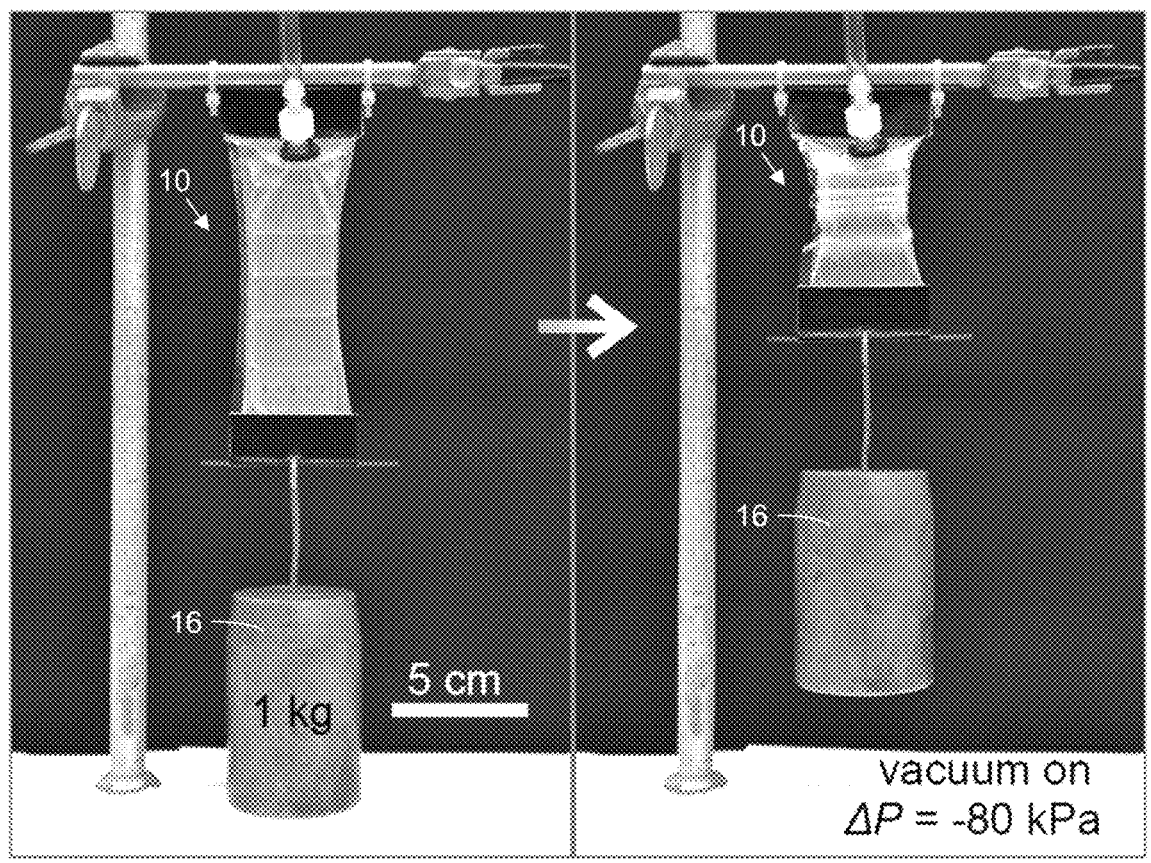
FIG. 18 shows the actuator 10 of FIG. 17 lifting an object (load) 16 that is several orders of magnitude more massive than the actuator 10 using a negative internal air pressure (−80 kPa).

For the skin materials, a 0.318-mm-thick TPU sheet (from American Polyfilm Inc. of Branford, Conn., USA) was used as the skin 14 for the soft linear actuator (seen in FIGS. 6 and FIG. 52), the underwater hydraulic actuator (seen in FIGS. 8 and 54), the electrics-embedded actuator (seen in FIG. 55), and the cylindrical lifter (seen in FIGS. 10, 31, and 65). A thinner TPU sheet (thickness: 0.04 mm) was used for all of the artificial muscles 10 in the contraction, bending, and twisting demonstrations (as shown in FIGS. 9-16), as well as for the cup-shaped gripper 10' (as seen in FIG. 64). A 0.102-mm-thick transparent PVC (vinyl) film was used to make the transparent actuator and the miniature bio-compatible actuators (as seen in FIGS. 1 and 47). A 0.025-mm-thick PVA film was used as the skin for the water-soluble actuator (seen in FIGS. 7 and 53), and the 2.6-g light-weight actuator's skin is made of a 0.038-mm-thick polyester sheet (as seen in FIG. 17). A 0.56-mm-thick polyurethane-coated nylon fabric sheet (from McMaster-Carr Supply Company of Elmhurst, Ill., USA) was used to make the actuator for the maximum-force production. A 0.34-mm-thick TPU-coated nylon fabric sheet (from Seattle Fabrics Inc. of Seattle, Wash., USA) was used to make the skins for the large lifter (seen in FIGS. 2, 49, and 50) and for most of the actuators used for static characterization.

The majority of the skins were directly sealed by an impulse heat sealer (AIE-410FL sealer from American International Electric, Inc., of City of Industry, Calif., USA) using proper sealing times for the different skin materials. For the miniature bio-compatible actuators shown in FIGS. 47 and 48, double-coated medical tape (1552 tape from 3M of St. Paul, Minn., USA) was also used to adhere the skin materials together before applying heat sealing. This process ensures the sealing quality of the artificial muscles at small scales.

Conclusion

The artificial muscles described above can offer a compliant and powerful way to drive various devices and machines with advantageous material costs, working conditions, scalabilities, and multiple-degrees-of-freedom actuations. These muscles can be easily made from a large variety of materials, and they are able to generate powerful, efficient, and programmable multi-dimensional actuation. This technique allows for quick programming, fabrication, and implementation of actuation systems for very specific working environments at multiple scales, such as active meta-materials [see J. T. Overvelde, et al, "A three-dimensional actuated origami-inspired transformable metamaterial with multiple degrees of freedom", 7 Nature Communications 10929 (11 Mar. 2016)], miniature surgical devices [see V. Vittiello, et al., "Emerging Robotic Platforms for Minimally Invasive Surgery", 6 IEEE Reviews in biomedical engineering 111-126 (2013)], wearable robotic exoskeletons [see A. T. Asbeck, et al., "A biologically-inspired soft exosuit for walking assistance", The International Journal of Robotics Research 0278364914562476 (2015)], transformable architecture, as well as deep-sea manipulators [see K. Galloway, et al., "Soft Robotic Grippers for Biological Sampling on Deep Reefs", 3 Soft Robotics 23-33 (2010], and large deployable structures in space exploration [see S. A. Zirbel, et al., "HanaFlex: a large solar array for space applications", SPIE Defense+Security 94671C (2015); S. Guest, et al., "A new concept for solid surface deployable antennas", 38 Acta Astronautica 103-113 (January 1996); and M. Schenk, et al., "Review of Inflatable Booms for Deployable Space Structures: Packing and Rigidization", 51 Journal of Spacecraft and Rockets 762-778 (2014)].

Tension Piston System

The artificial muscle system described and illustrated in the preceding pages can be used in a tension piston system, as described and illustrated, below.

Introduction

The piston is one of the most important inventions in engineering field over the past several centuries. It is a simple and classic device that can convert fluidic pressure to force and torque and then to produce useful motions. It has been widely used in numerous applications that need force generations or transmissions.

A classic piston 61, including a piston head 56 and a connector rod 58 mounted thereto (shown in FIGS. 67 and 68), is usually tightly contained in a rigid chamber 60 (e.g., a cylinder). A sealing device or material is used at the interface between the piston and the chamber wall; thus, the chamber 60 is separated into two isolated spaces by the piston. These two spaces are connected to different fluid sources (or an ambient fluid, such as air) through respective fluid ports 62 for fluid flow 65 into and out of the chamber 60. If the fluids (e.g., gas, liquid, etc.) in these two spaces have two different pressures, then the piston will be driven to slide or rotate closely along and inside the chamber wall by a compressive force due to this pressure difference. A connector 58 in the form, e.g., of a rigid rod or shaft or a flexible cable is attached to the piston head 56; thus, this sliding or rotating motion can be transmitted to the outside of the chamber 60. The conventional piston system, however, can face the serious problems of friction and leakage due to the tight contacts and frequent sliding motions between the piston and the chamber walls.

A rolling diaphragm seal has been developed to overcome these drawbacks of the classic piston-chamber structure. This kind of fluid-tight diaphragm is both flexible and strong, and it is usually made of fiber-reinforced elastomer. The diaphragm connects and seals the piston and the chamber wall, and it can roll within a small gap between them when the piston slides inside the chamber. The rolling diaphragm piston can have negligible friction, zero-leakage, and very low hysteresis. The force produced from this kind of piston is close to the force produced by a classic piston 61 with the same size.

Furthermore, a linear fluid-driven actuator can be created without an internal piston, such as an air spring and bellow-shaped actuator. In this actuator, the chamber is made of flexible materials, and the piston head 56 (rigid end) is attached to one end of the chamber 60. This flexible-wall actuator can generate axial expanding or contracting motions if the chamber's internal fluid pressure comes to differ from the external pressure. Similar to the rolling diaphragm piston, the friction and leakage of this kind of actuation can be neglected; however, the output axial force of this flexible-wall cylinder is limited by the area of its rigid end, and its stroke is relatively short.

The piston-based actuator relies on the fluid pressure acting on its piston head (or the flexible chamber's rigid end) to push or pull it to move. There is another kind of mechanism that uses fluid-induced tension force to produce the actuation. In this structure, a fiber-reinforced elastic diaphragm is housed inside a rigid vessel (container), and it is connected to the ambient atmosphere through an orifice in the vessel. A rigid rod is attached to the far end of the diaphragm from inside, and it is used to transmit force and motion. This rod can be driven to slide along the axial direction through the orifice by the membrane's tension force, once the fluid is pressurized inside the vessel. These kinds of mechanisms usually have a shorter stroke compared with the classic piston-cylinder devices, although the output stress can be very high.

Tension Piston

Here, we propose a new architecture, named, "tension piston," for fluid-driven piston devices. As shown in FIGS.

69-79, the tension piston 63 uses fluid-pressure-induced tension force in a flexible membrane to drive a compressible rigid piston. This tension-driven piston architecture can be used to produce both translational actuation and rotational actuation with large output force/torque and significant stroke/rotation. The basic tension-piston system includes the following five kinds of components: a fluid-tight pressure chamber/container, a flexible and fluid-tight piston skin, a piston output connector, a compressible piston skeleton, and a fluid medium.

In the tension-piston system, the chamber houses the components and separates the fluids as inside-chamber fluid 64 and outside-chamber fluid 66 (if existent), which may be ambient air. This chamber 60 can be made of either rigid materials or flexible materials, however it should have sufficient strength to contain other components under a certain fluid pressure. The shape of the chamber 60 can be any 3D geometry that allows the internal components to move, such as a cylinder-shaped, or cuboid-shaped, or prism-shaped chamber 60 for translational piston motions; a cylinder-shaped (or partially cylinder-shaped), or sphere-shaped (or partially sphere-shaped) chamber 60 for rotational piston motions (as shown in FIGS. 71-74 and FIGS. 88-91); a chamber 60 with non-identical cross sections along the piston's moving direction, such as a cone-shaped or pyramid-shaped chamber, etc.; or a cylinder- or prism-based chamber with a curved shape along the piston's moving direction.

The tension piston 63 in this system usually includes a fluid-tight skin 14, a compressible skeleton 12, a fluid medium (if existent), fluid ports 62 for fluid flow 65 into and out of the chamber 60, a chamber 60, and a mechanical connector 58 coupled with the skeleton 12. The piston skin 14 is made of thin materials that are sufficiently flexible to allow compression, and strong enough to transfer the tension force. These materials are also resistant to both the fluids inside and outside of the piston. The piston skin 14 separates the inside-piston fluid 68 and inside-chamber fluid 64 by covering and sealing the piston skeleton 12 inside of the chamber 60. The piston skin 14 is fixed on the chamber 60 to enable an efficient tension-force generation.

The tension piston skeleton 12 is a compressible solid structure with multiple voids, and these voids allow the skeleton 12 to be compressed to produce desired transformation by the piston skin 14 under a fluid pressure. The piston skeleton 12 can be built from one piece of material or can be a composite, and the skeleton 12 can alternatively be assembled from discrete elements. Springs and elastic materials can be used to join those elements together. The structural voids can be arranged into different geometrical patterns (as shown in FIGS. 83-85), and the skeleton structure 12 can be made from different materials. These features allow the piston skeleton 12 to produce motions with tunable amplitudes in multiple directions, and even at different rates.

A rigid rod/shaft or flexible non-stretchable cable can be attached to a particular location on the piston skeleton as the connector 58. The attaching location can be either inside or outside of the piston skin 14, as shown in FIGS. 86 and 87. This connector 58 can transmit the skeleton's motion to the outside of the chamber 60. Multiple rods, shafts, or cables can be attached to a single piston skeleton 12 for multi-directional outputs.

The fluid medium inside of the piston skin 14 can be directly connected to ambient through a port 62, and it can also be connected to a separate fluid source. This fluid can be the same as the fluid inside the chamber 60, and it can alternatively be a different kind of fluid.

In this system, the piston skeleton 12 will be driven to contract to produce the desired motion, and this transformation primarily relies on the fluid-pressure-induced tension force on the piston skin 14. This fluid pressure can be generated by either pressurizing the inside-chamber fluid 64 or depressurizing the inside-piston fluid 68. For a single-acting piston motion, the springs and elastic materials can help the skeleton 12 to return to its original shape after the actuation, and the piston skin 14 need not be bonded on the piston skeleton 12. To achieve a double-acting piston motion, a reverse external force/torque can be applied to the system through the connectors 58, or the inside-piston fluid 68 can be pressurized, to drive the piston skeleton 12 to return to its original shape. The piston skin 14 can be bonded onto the skeleton 12 in either one of these two approaches. The reverse force/torque can be generated by either another unit of tension piston 63 or by a separate actuator or energy source. It should be noted that multiple tension pistons 63 can be installed inside a single chamber 60 to produce complex multiple motions using a single fluid power source.

Fabrication and Experiment of Linear Tension Piston

To validate our design, we first fabricated a classic cylinder-piston system 61 (top) and cylinder-shaped linear tension piston systems 63 (middle and bottom) with different skin materials, as shown in FIG. 75. For all of the cylinder-shaped pistons 61 and 63, rigid acrylic cylinders (inner diameter: 2.54 cm, wall thickness: 0.635 cm) sealed with end caps 70 were used as the rigid chambers 60 to house the pistons. 3D printers were used to build the plastic parts, such as the caps 70 for all of the acrylic cylinders, the piston head 56 for the classic piston, and the disc-shaped skeletons 12 for the tension pistons. Miniature compression springs were used to separate those plastic skeleton discs and also to provide the return forces for the piston skeletons 12. All of the piston connector rods 58 were linear motion shafts made of carbon steel (diameter: 0.635 cm). A linear ball bearing is installed on the top cap of each cylinder to hold its piston rod 58. To demonstrate the interaction between the skin 14 and skeleton 12 of a tension piston 63, a transparent thermoplastic polyurethane (TPU) sheet is used as the skin 14 for one of the tension pistons 63, as shown in FIGS. 75-78. TPU-coated nylon fabric sheets are used to build the skins for the other tension pistons 61 and 63.

We also fabricated two tension piston systems using flexible materials. As shown in the two prototypes of FIG. 79, their chambers 60 are made from a TPU-coated nylon fabric sheet, and their piston skins 14 are made from a TPU sheet. The piston skeletons 12 are 3D-printed linear zigzag structures using nylon material. A flexible polytetrafluoroethylene (TEFLON) rod (serving as the connector 58) is attached to the skeleton 12 of one of the tension pistons 63, and this piston 63 is able to produce a pushing force when the soft chamber 60 is pressurized, as shown in FIG. 80. In addition, a nylon rope (serving as the connector 58) is tethered to the skeleton 12 of the other soft tension piston 63, and this piston 63 is able to produce a pulling force when the volume between the inner chamber wall and the skin 14 inside the soft chamber 60 is pressurized, as shown in FIG. 81.

To compare the performance between the linear tension piston 63 and the conventional piston 61, we conducted static-force measurements on a linear tension piston 63 and on a metal air-cylinder 61 (BIMBA 314-XP) at different air pressures. These two piston system have the same inner diameter of 5.08 cm in their cylinder chamber 60. The result shows that the tension piston 63 can generate approximately two times higher blocked forces than does the conventional piston device 61, as shown in FIG. 82, which also plots theoretical values via the dashed line.

Advantages and Potential Applications

The tension piston system can offer several advantages compared with the conventional piston system. For example, it can produce a large force/torque at a low pressure, and the force/torque profile can be tuned by using different piston skeletons. A single tension piston can have multiple force/torque outputs in different directions/orientations with different amplitudes, and at different rates. Multiple tension pistons can be arranged into a single chamber and powered by a single fluid pressure. The friction between the tension piston, and the chamber wall can be very low (even close to zero), as the sealing of these two parts is not necessarily needed. Both rigid and flexible materials can be used in a tension piston system, and the system can be built with a compliant body and with various shapes-rather than a rigid cylindrical body.

The tension piston system has a very broad field of potential applications. It can be used as a device, such as a valve, a switch, an actuator, or an engine, etc., to convert fluid pressure/energy to forces/torques and motions. It can also be used as a device, such as a fluid pump, a fluid compressor, a fluidic damper, a shock-absorber, a vibration isolator, a fluidic suspension device, or a fluidic energy storage device, etc., to convert forces/torques to fluidic pressures/energy.

In describing embodiments of the invention, specific terminology is used for the sake of clarity. For the purpose of description, specific terms are intended to at least include technical and functional equivalents that operate in a similar manner to accomplish a similar result. Additionally, in some instances where a particular embodiment of the invention includes a plurality of system elements or method steps, those elements or steps may be replaced with a single element or step. Likewise, a single element or step may be replaced with a plurality of elements or steps that serve the same purpose. Further, where parameters for various properties or other values are specified herein for embodiments of the invention, those parameters or values can be adjusted up or down by $1/100^{th}$, $1/50^{th}$, $1/20^{th}$, $1/10^{th}$, $1/5^{th}$, $1/3^{rd}$, $1/2$, $2/3^{rd}$, $3/4^{th}$, $4/5^{th}$, $9/10^{th}$, $19/20^{th}$, $49/50^{th}$, $99/100^{th}$, etc. (or up by a factor of 1, 2, 3, 4, 5, 6, 8, 10, 20, 50, 100, etc.), or by rounded-off approximations thereof, unless otherwise specified. Moreover, while this invention has been shown and described with references to particular embodiments thereof, those skilled in the art will understand that various substitutions and alterations in form and details may be made therein without departing from the scope of the invention. Further still, other aspects, functions, and advantages are also within the scope of the invention; and all embodiments of the invention need not necessarily achieve all of the advantages or possess all of the characteristics described above. Additionally, steps, elements and features discussed herein in connection with one embodiment can likewise be used in conjunction with other embodiments. The contents of references, including reference texts, journal articles, patents, patent applications, etc., cited throughout the text are hereby incorporated by reference in their entirety for all purposes; and all appropriate combinations of embodiments, features, characterizations, and methods from these references and the present disclosure may be included in embodiments of this invention. Still further, the components and steps identified in the Background section are integral to this disclosure and can be used in conjunction with or substituted for components and steps described elsewhere in the disclosure within the scope of the invention. In method claims (or where methods are elsewhere recited), where stages are recited in a particular order—with or without sequenced prefacing characters added for ease of reference—the stages are not to be interpreted as being temporally limited to the order in which they are recited unless otherwise specified or implied by the terms and phrasing.

We claim:
1. A tension piston system, comprising:
a chamber;
a piston contained in the chamber, the piston comprising:
a) a collapsible skeleton;
b) a flexible skin in which the collapsible skeleton is contained and that, at least in part, defines (i) a volume inside the piston in which the collapsible skeleton is contained and (ii) a volume outside the piston yet inside the chamber, wherein the flexible skin seals the volume inside the piston from the volume outside the piston, and wherein the flexible skin and the collapsible skeleton are configured for the flexible skin to provide a pulling force on the collapsible skeleton with a pressure difference between the volume inside the piston and the volume outside the piston to change at least one of the dimensions and thus geometry of the collapsible skeleton; and
c) a connector mounted to the collapsible skeleton or the flexible skin, and configured to be displaced or rotated when the size or geometry of the skeleton changes and to convey that displacement or rotation outside the chamber,
wherein the chamber includes at least two fluid ports, one in fluid communication with the volume inside the piston and another in fluid communication with volume outside the piston.

2. The tension piston system of claim 1, wherein the collapsible skeleton comprises at least one of (a) hinges, (b) pin joints, and (c) rigid segments linked with flexures, wherein the rigid segments are more rigid than the flexures such that the rigid segments can pivot relative to one another at the flexures to change at least one of the size and geometry of the collapsible skeleton.

3. The tension piston system of claim 1, wherein the collapsible skeleton comprises a coil spring.

4. The tension piston system of claim 1, wherein the collapsible skeleton comprises a plurality of discontinuous segments mounted to the flexible skin.

5. The tension piston system of claim 1, further comprising a compressed fluid source or vacuum in fluid communication with at least one of the fluid ports.

6. The tension piston system of claim 1, wherein the chamber is shaped for translational piston motions.

7. The tension piston system of claim 6, wherein the chamber is cylinder-shaped, cuboid-shaped, or prism-shaped.

8. The tension piston system of claim 1, wherein the chamber is shaped for rotational piston motions.

9. The tension piston system of claim 8, wherein the chamber is at least partially cylinder-shaped or at least partially sphere-shaped.

10. The tension piston system of claim 1, wherein the chamber has a non-identical cross section along a displacement direction of the piston.

11. The tension piston system of claim 1, further comprising at least one spring or elastic material coupled with the skeleton to return the skeleton to its original shape after the size or geometry of the skeleton is changed.

12. A method for converting a pressure difference into a displacement or rotation using a tension piston, the method comprising:
providing a tension piston system, comprising:
A) a chamber;
B) a piston contained in the chamber, the piston comprising:
i) a collapsible skeleton;
ii) a flexible skin in which the collapsible skeleton is contained and that, at least in part, defines (a) a volume inside the piston in which the collapsible skeleton is contained and (b) a volume outside the piston yet inside the chamber, wherein the flexible skin seals the volume inside the piston from the volume outside the piston; and
iii) a connector mounted to the collapsible skeleton or the flexible skin, and configured to be displaced or rotated when at least one of the dimensions of the skeleton changes and to convey that displacement or rotation outside the chamber,
wherein the chamber includes at least two fluid ports, one in fluid communication with the volume inside the piston and another in fluid communication with volume outside the piston; and
pumping fluid into or out of the chamber via at least one of the fluid ports to collapse or expand the flexible skin and skeleton as the flexible skin provides a pulling force on the collapsible skeleton due to a pressure difference between the volume inside the piston and the volume outside the piston as a result of the pumped fluid.

13. The method of claim 12, wherein the collapse or expansion of the flexible skin and skeleton is a translational motion.

14. The method of claim 12, wherein the collapse or expansion of the flexible skin and skeleton is a rotational motion.

15. The method of claim 12, further comprising reversing the collapse or expansion of the flexible skin and skeleton by releasing tension or compression in at least one spring or elastic material coupled with the skeleton.

16. The method of claim 12, further comprising using the tension piston as a valve, a switch, an actuator, or an engine to convert fluid pressure or energy to force.

17. The method of claim 12, further comprising using the tension piston as a fluid pump, fluid compressor, fluidic damper, shock absorber, vibration insulator, fluidic suspension device, or fluidic energy storage device to convert force to pressure or energy.

* * * * *